United States Patent [19]
Hikoso et al.

[11] Patent Number: 5,400,359
[45] Date of Patent: Mar. 21, 1995

[54] SPREAD SPECTRUM COMMUNICATION SYSTEM AND AN APPARATUS FOR COMMUNICATION UTILIZING THIS SYSTEM

[75] Inventors: Keiji Hikoso; Naoki Okamoto, both of Nara; Takeshi Okamoto, Mie, all of Japan

[73] Assignee: Sharp Kabushiki Kaisha, Osaka, Japan

[21] Appl. No.: 35,919

[22] Filed: Mar. 22, 1993

[30] Foreign Application Priority Data

| Mar. 23, 1992 | [JP] | Japan | 4-064734 |
| Sep. 8, 1992 | [JP] | Japan | 4-239709 |
| Sep. 17, 1992 | [JP] | Japan | 4-247654 |
| Oct. 26, 1992 | [JP] | Japan | 4-287837 |
| Oct. 26, 1992 | [JP] | Japan | 4-287838 |

[51] Int. Cl.$^6$ .................................. H04B 7/216
[52] U.S. Cl. ............................. 375/1; 375/115
[58] Field of Search ..................... 375/1, 115

[56] References Cited

U.S. PATENT DOCUMENTS

| 3,099,795 | 7/1963 | Frank | 375/1 |
| 4,179,658 | 12/1979 | Bitzer | 375/1 |
| 4,455,662 | 6/1984 | Gutleber | 375/1 |
| 4,888,788 | 12/1989 | Teranishi et al. | 375/1 |
| 4,912,722 | 3/1990 | Carlin | 375/1 |
| 5,177,767 | 1/1993 | Kato | 375/1 |
| 5,193,101 | 3/1993 | McDonald et al. | 375/1 |
| 5,228,055 | 7/1993 | Uchida et al. | 375/1 |

OTHER PUBLICATIONS

"Hydrodyne-Typed Differential Correlator for Fast SS-FH Communications" vol. 73-B-11 No. 11, pp. 675-682m 1190.

"Theory of Spread-Spectrum Communications-A Tutorial", IEEE Transaction of Communications, vol. COM-30, No. 5, May 1982.

"Spread Spectrum Communication Systems Sending With Reference PN Signal for Power Line Data Transmission-Rapid Impedance Alteration Case", Tachikawa et al, Nov. 16, 1988.

*Primary Examiner*—Gilberto Barrón, Jr.
*Attorney, Agent, or Firm*—Nixon & Vanderhye

[57] ABSTRACT

The present invention relates to a spread spectrum communication system in which a PN code p(t) is generated from a PN generator, data d(t) is multiplied by the PN code p(t) by a multiplier, and multiplied output is subjected to BPSK modulation by a BPSK modulating block. The PN code p(t) is subjected to BPSK modulation at BPSK modulating block, the result is delayed by at least 1 chip of the PN code by a delay block, combined with a modulated signal from BPSK modulating block, converted to an RF signal, and then it is transmitted from an antenna. The signal received by an antenna is amplified by RF amplifier block, converted to an intermediate frequency signal by frequency converting block, split into two, one of the split signals is directly applied to a multiplier, the other is delayed by a delay block, and then these two split signals are multiplied by a multiplier and thus data d(t) is demodulated and output.

36 Claims, 58 Drawing Sheets

F I G. 3 (a) PRIOR ART
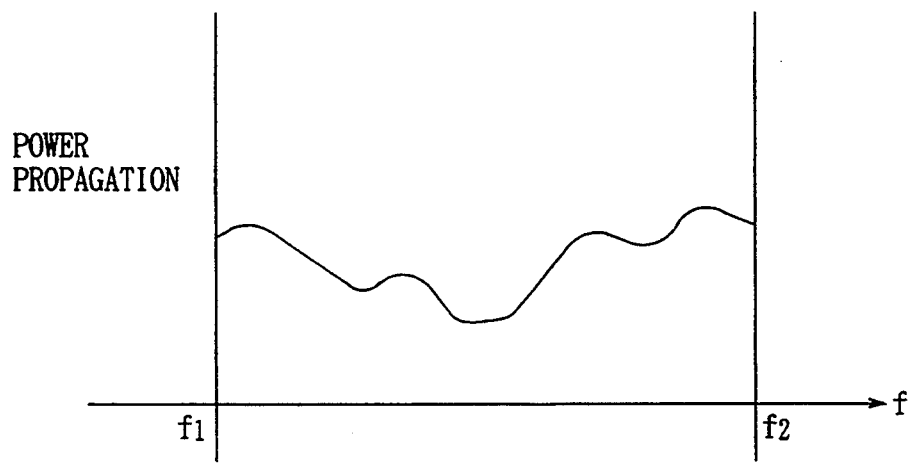
F I G. 3 (b) PRIOR ART
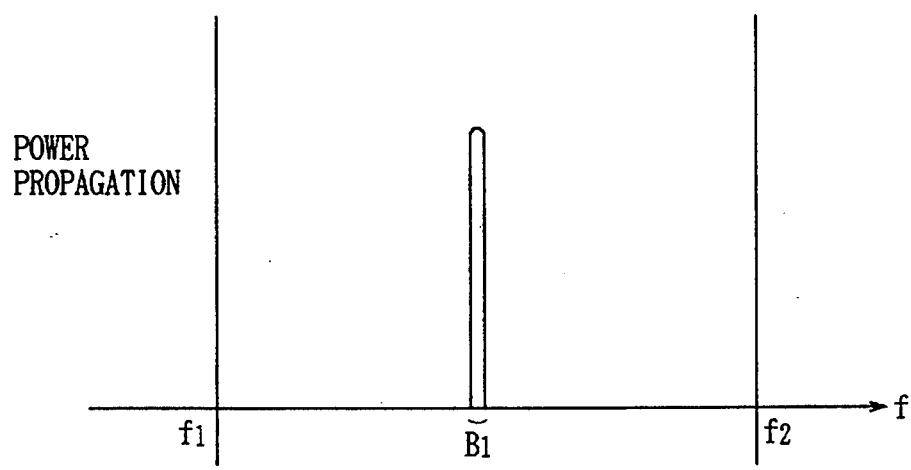
F I G. 3 (c) PRIOR ART
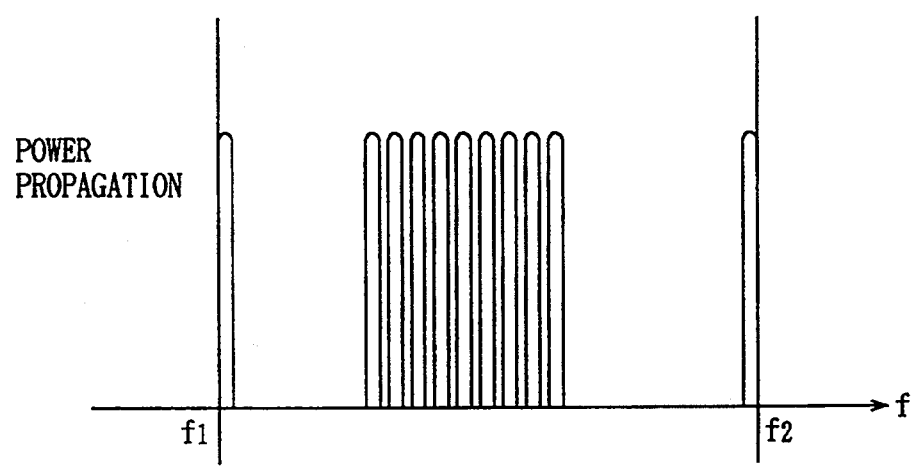

OUTPUT FROM PATH WITHOUT DELAY BLK

OUTPUT FROM PATH WITH DELAY BLK

MULTIPLIER OUTPUT

FIG. 53(c)

SPREAD SPECTRUM COMMUNICATION SYSTEM AND AN APPARATUS FOR COMMUNICATION UTILIZING THIS SYSTEM

BACKGROUND OF THE INVENTION

1. Field of the Invention

The present invention relates to spread spectrum communication system and to an apparatus for communication utilizing this system. More specifically, the present invention relates to spread spectrum communication system using direct sequence and/or frequency hopping, and to an apparatus for communication utilizing this system.

2. Description of the Background Art

Communication using narrow band modulation system (such as AM, FM, BPSK) has been conventionally used in the field of data communication. In such a system, demodulation at the receiver can be carried out by a relatively small circuitry. However, such a system is weak against multipath fading and narrow band noise.

By contrast, in spread spectrum communication system, data spectrum is spread by a PN code at the transmitter side, while the PN code and the data are synchronized on the receiver side, so that the influence of multipath fading and narrow band noise can be reduced, which system has attracting increasing attention as a promising technique.

The method of spread spectrum communication includes direct sequence, frequency hopping, time hopping and a hybrid combining two or more of these. Direct sequence spreads the spectrum by multiplying data and the PN code having a chip rate considerably higher than data rate, of which circuitry can be implemented relatively easily as compared with those used in other methods. Use of different PN codes allows multiple access in the same band. Such multiple access is called CDMA (Code Division Multiple Access) or SSMA (Spread Spectrum Multiple Access).

FIGS. 1 and 2 are schematic block diagrams of the spread spectrum communication system using direct sequence. FIG. 1 shows the transmitter side and FIG. 2 shows the receiver side.

On the transmitter side, referring to FIG. 1, information 1 represented as a(t) is modulated at an information modulating block 2 to be turned to a signal b(t), which in turn is multiplied by a PN code represented as c(t) generated in a PN code generator 4, at a spreading block (multiplier) 3. PN code generator 4 is driven by clocks from a reference clock oscillator 5. The chip rate of the PN code c(t) is much higher than the data rate of data a(t), and therefore spectrum band of the multiplied output signal s(t) is spread as compared with b(t). The spread multiplied output signal s(t) is converted to RF by a frequency converting block 6, amplified by a power amplifier block 7 and is transmitted through an antenna 8.

On the receiver side, the signal received by an antenna 9 is amplified by an RF amplifier block 10 and is converted to an intermediate frequency at a frequency converting block 11. The signal s(t) which has been converted to the intermediate frequency is multiplied by a PN code c(t) having the same sequence as the code c(t) generated at the transmitter side, in a PN code generator 13. The PN code generated by PN code generator 13 must be synchronized in time with the PN code included in the received signal provided as an input to a despreading block (multiplier) 12. For this purpose, a time discrimination control circuit 14 having a loop structure is prepared, which constitutes, together with the PN code generator 13, a synchronizing block S. With the PN code removed at the despreading block 12, the output b(t) from the despreading block 12 is returned to the narrow band signal modulated only by the data, which signal is passed through an information demodulating block 15 to provide information 16 as represented by a(t).

Since synchronization in time is provided at despreading block 12 on the receiver side, the influence of the multipath fading which comes delayed in time can be reduced. Since the received signal is multiplied by the PN code generated by PN code generator 13, the narrow band noise input to the receiving antenna can be spread, and therefore the influence thereof can be reduced.

As described above, spectrum spreading enables communication in wider bandwidth which is strong against multipath fading and narrow band noise, and thus more effective communication can be carried out.

Details of the spread spectrum communication system shown in FIGS. 1 and 2 are described in *Spread Spectrum Communication System*, pp. 10–16, published by Kagaku Gijutsu Shuppansha.

The direct sequence spread spectrum communication system is stronger against multipath fading and narrow band noise as compared with the conventional narrow band communication as described above. However, it requires circuits for spreading and despreading spectrum, and since circuits in the synchronizing block employed therein generally has a loop structure, the circuits inevitably becomes large and completed as compared with the receivers for narrow band communication.

As a method of confirming synchronization of the PN code, the PN code of the received signal is multiplied by the PN code generated in the receiver, and the result is integrated. The spreading is carried out dependent on whether the result of integration is at a certain level. In other words, it takes some time to confirm synchronization, which depends on the time of integration. For example, if synchronization is to be confirmed with the chip shifted by ½, the maximum time necessary for confirmation is $2n \times t(s)$, where t(s) represents the time (sec) of integration and n represents code length of n chips. Meanwhile, frequency hopping is considered promising as it is especially strong against multipath fading.

FIG. 3 shows a power spectrum, FIG. 3(a) shows frequency characteristic of propagation in a propagation path in a room, FIG. 3(b) shows an example of transmission of narrow band modulated wave having a band $B_1$, and FIG. 3(c) shows spectrum obtained by frequency hopping. As shown in FIG. 3(a) in a propagation path in a room, there are frequencies of which gain is made stronger and frequencies of which gain is made weaker because of multipaths. Assume that a narrow band modulated wave having the band $B_1$ shown in FIG. 3(b) is transmitted through the propagation path having such characteristic of propagation. This frequency is exactly in the frequency range of which gain is made weaker, and therefore C/N is degraded, causing significant degradation of bit error rate. In frequency hopping such as shown in FIG. 3(c), the frequencies $f_1$ to $f_2$ are divided into several slots each having at least the bandwidth of $B_1$. Several tens to several hundreds of such slots are prepared and the frequency used is changed several bits by several bits. In this case, even when C/N of some of the slots may be degraded, remaining slots have high C/N, and therefore only a small number of bits may cause an error statistically. Errors continuous over several slots can be corrected by employing a method of error correction strong against burst error or interleave. Consequently, stable communication is ensured even in such a propagation path as shown in FIG. 3(a) which is much varied.

As described above, frequency hopping is strong in propagation paths having multipath phasing. However, the circuitry, especially the circuitry in despreading system, is much complicated and large. Therefore, frequency hopping is not popularly used except in a few special systems.

FIG. 4 is a block diagram of an acquisition circuit used in conventional frequency hopping. The acquisition circuit is described in *Spread Spectrum Communication System*, by Mitsuteru Yokoyama, Kagaku Gijutsu Shuppansha. This is an acquisition circuit for tracking an initial signal at the start of connection of communication. Referring to FIG. 4, a frequency hopping synthesizer 21 generates a local oscillation signal of local frequency corresponding to the hopping frequency, which local oscillation signal is applied to a power combiner 22 to be combined with a reception signal received at an antenna 23, and is converted to an intermediate frequency signal. A prescribed band component of the intermediate frequency signal is taken out by a bandpass filter (BPF) 24, which is squared by a square law 25 and integrated by an integrator 26, so that the signal energy is detected.

A search control logic 27 is provided for eliminating uncertainty of time domain and frequency domain, and it controls oscillation frequency of a VCO 29 by applying a control signal to a frequency control circuit 28 and controls clock frequency from a clock generating circuit 31 by applying a control signal to a clock control circuit 30. Oscillation output from VCO 29 is applied to frequency hopping synthesizer 21 and clock signal from clock generating circuit 31 is applied to a PN sequence generator 32. PN sequence generator 32 applies a control signal to frequency hopping synthesizer 21 based on the clock signal from clock generating circuit 31.

In the acquisition circuit shown in FIG. 4, hopping frequency is determined corresponding to the pattern of the PN sequence. For this purpose, a control signal is applied to frequency hopping synthesizer 21 from PN sequence generator 32, and when synchronization can not be established and timings do not match, phase of the PN sequence is shifted ½ chip by ½ chip, switching of the hopping frequency is made faster and time domain is searched. If the frequency is deviated, an main oscillator of frequency hopping synthesizer 21 is offset to search the frequency domain.

FIG. 5 is a block diagram of a tracking circuit. The tracking circuit is provided for keeping synchronization after the communication is initially tracked by the acquisition circuit shown in FIG. 4. The tracking circuit includes a frequency correlating network 35 in which an advanced local oscillation signal $1_E(t)$ than the received signal r(t) and a retarded local oscillation signal $1_L(t)$ are applied from a frequency hopping synthesizer 43 to power combiners 36 and 37, and the received signal r(t) has its frequency converted. The signal having the frequency converted in this manner have their bands restricted by bandpass filters 38 and 40, squared in square laws 39 and 41, respectively, and these signals are added by an adder 42 to be applied to a loop filter 44. Loop filter 44 removes high harmonics having the period of the hopping frequency as fundamental component from the received signal, the resulting output is applied to a VCC circuit 45, and a control signal is applied to an FH sequence generator 46. FH sequence generator 46 applies a control signal to frequency hopping synthesizer 43 based on the control signal from VCC circuit 45. The tracking circuit shown in FIG. 5 is described in the aforementioned article together with the above described acquisition circuit, and therefore detailed description is not given.

As described above, in the conventional spread spectrum communication system, the acquisition circuit shown in FIG. 4 and the tracking circuit shown in FIG. 5 are necessary, which requires large scale circuitry and makes it difficult to change the frequency at high speed. Although it is strong against multipath fading and suitable for use in a room, synchronization is lost when the communication is disconnected, and in that case, it is necessary to re-track from the start. This takes a long period of time during which the signal can not be demodulated.

Further, for despreading in the spread spectrum communication system, there are active methods of correlation such as sliding correlation and passive methods such as those using a matched filter or a correlator. In the active methods of correlation, synchronization is tracked, and thereafter synchronization is maintained by using a tracking loop such as a DLL loop.

However, in this method, the chip of the code is shifted little by little to find a timing at which codes coincide with each other for synchronization tracking, and therefore it takes long to track synchronization. Therefore, though it is suitable for communication with a fixed propagation path, it could not be applied for communication, in which propagation path changes frequently (as in residence or room), since it takes time to establish synchronization again once synchronization is lost.

FIG. 6 is a block diagram of a demodulator employing a positive despreading system used in such communication. Referring to FIG. 6, input intermediate frequency (IF) signal 1 is applied to a multiplying circuit 50 and has its frequency converted by I and Q components of a local signal generated from a local oscillator 61 and turned into baseband I component 51 and Q component 52. These two inputs are applied to an I channel correlator 53 and a Q channel correlator 54, respectively, and these are corelated by these correlators. The correlated output 55 is input to a data demodulating circuit 56, and data 57 is provided as an output.

Meanwhile, correlated outputs 55 and 58 from I and Q channels are applied to a loop control circuit 59 in which a control voltage for local oscillation signal generator 61 is determined, and the local oscillation signal generator 61 is controlled such that the local oscillation signal and the intermediate frequency carrier wave have their phases synchronized. The example shown in FIG. 6 is similar to a Costas loop.

FIG. 7 shows an output waveform from the correlator 53 shown in FIG. 6. In the demodulating circuit shown in FIG. 6, a correlated output is generated when the PN codes are matched perfectly, and at other portions, the output waveform assumes approximately 0. When the PN code has 127 chips, for example, the correlated output is provided for the time 1/127, and as the loop control circuit 59 provides a loop by using a phase difference read from this 1/127 time, a circuitry somewhat different from the general analog type Costas (PLL) loop is necessary. In the data demodulating circuit 56, determination as to whether the data is 1 or 0 is carried out based on this pulse-like signal, and data is obtained by recovering clocks.

As described above, in the passive type circuitry, demodulation can be carried out in the similar manner as in the general narrow band digital demodulation. However, there are following problems.

More specifically, since the receiver includes a carrier recovery circuit, it takes time to until the synchronization of the carrier is established. Though the necessary time is much shorter than that in the active type, data can not be demodulated for this time necessary for synchronization when carrier synchronization is frequently lost because of the frequent change of paths.

FIG. 8 is a diagram of a signal waveform showing correlator output when there is much multipath fading. As shown in the figure, there are several correlator outputs corresponding to the difference in time of propagation of the multiple paths. In such a case, it is difficult to determine which of the outputs is to be used for obtaining data. In addition, if wave detection is to be done by using total power, it is necessary to provide a window on the time axis for integration. However, in such a case as shown in the figure, it is difficult to determine how and when a window is to be provided, since the optimal values differ path by path.

Further, the output data has two stable points, that is 0 and $\pi$ because of the carrier phase, and since data is inverted, it is necessary to employ differential coding or to carry out discrimination using a preamble signal of the data.

For multiple access by a large number of users, different PN codes are used for discrimination. However, the m sequence of 127 chips, for example, has only 18 codes, and therefore it is not available for larger number of users.

SUMMARY OF THE INVENTION

An object of the present invention is to provide a spread spectrum communication system and an apparatus for communication using this system which does not necessitates synchronization, which is compact and inexpensive and capable of effective communication against multipath fading and narrow band noise.

Another object of the present invention is to provide spread spectrum communication method and an apparatus for communication using the same employing frequency hopping which can also be applied to phase space.

A still further object of the present invention is to provide a spread spectrum communication system and an apparatus for communication using the same in which it is not necessary to generate carriers.

Briefly stated, in the present invention, a signal modulated by data and a PN code which assumes either 1 or −1 and a signal modulated only by the PN code and delayed from the aforementioned signal by a prescribed time period (longer than 1 chip of the PN code) are combined for transmission on the side of transmitter, a delay circuit having the same amount of delay as in the transmitter side is provided, and a signal received through the delay circuit and a signal received not through the delay circuit are multiplied for despreading on the receiver side.

Therefore, according to the present invention, despreading can be done easily on the receiver side, the circuit can be reduced in size and the cost can be reduced. Further, it has an advantage that the time for synchronization is not necessary at all. The spread spectrum communication system can be easily added to the conventional communication system, and communication more effective against multipath fading and narrow band noise is enabled.

According to another aspect of the present invention, a signal obtained by modulating a carrier wave with a data or a carrier wave signal is transmitted with a delay from the transmitter side, the received signal is divided into two, one of the divided signal is delayed again and multiplied with the other one of the divided signals on the receiver side, so that the carrier wave which has been subjected to frequency hopping is completely despread as a baseband signal.

Therefore, according to this aspect, the frequency hopping can be realized by a relatively simple circuit structure, and the problem of long time necessary for synchronization in the conventional frequency hopping and the problem of discontinuous phase can be solved, and stable communication in room propagation having multiple paths can be provided.

According to still further aspect, two waves of signals, that is, a signal modulated by binary digital data and a first PN code and a signal having its phase modulated only by a second PN code which has the same chip rate and the same code length as but a sequence different from the first PN code are generated, these two waves are combined and transmitted, a signal received through a matched filter corresponding to the first PN code and a signal received through a matched filter corresponding to the second PN code are multiplied by each other, whereby the PN code synchronizing circuit and the carrier wave removing circuit on the receiver side can be simplified and reduced in size, and at the same time, the number of multiple accesses can be increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a power spectrum of frequency hopping.

DESCRIPTION OF THE PREFERRED EMBODIMENTS

Figure 1:
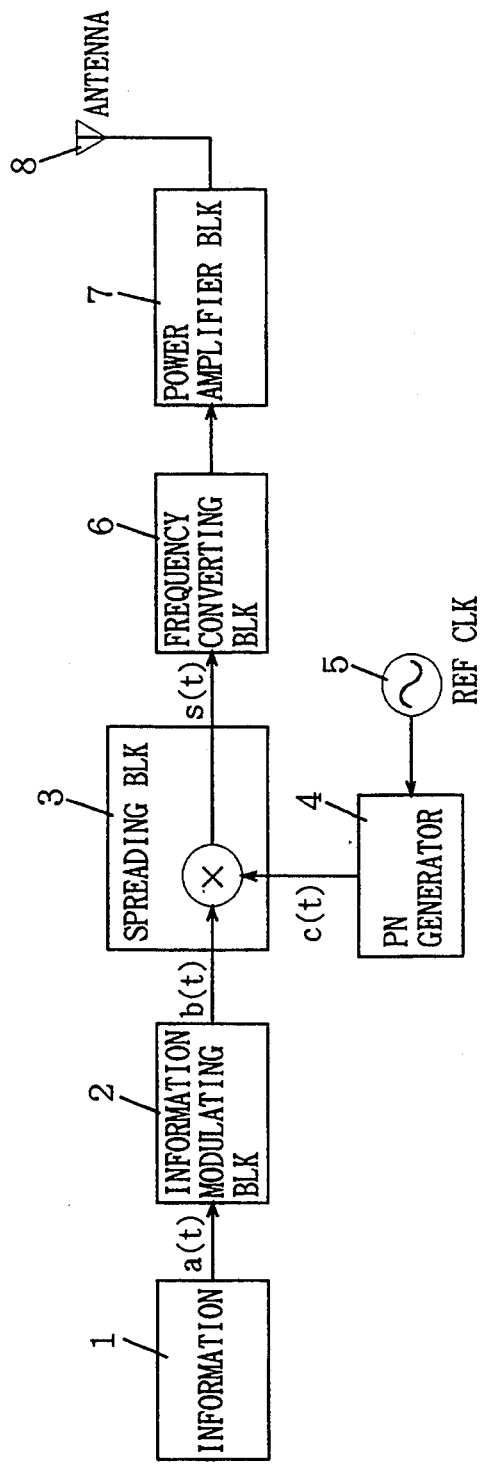
FIG. 1 is a schematic block diagram of a transmitter of spread spectrum communication system employing a conventional method of direct spreading.
Figure 2:
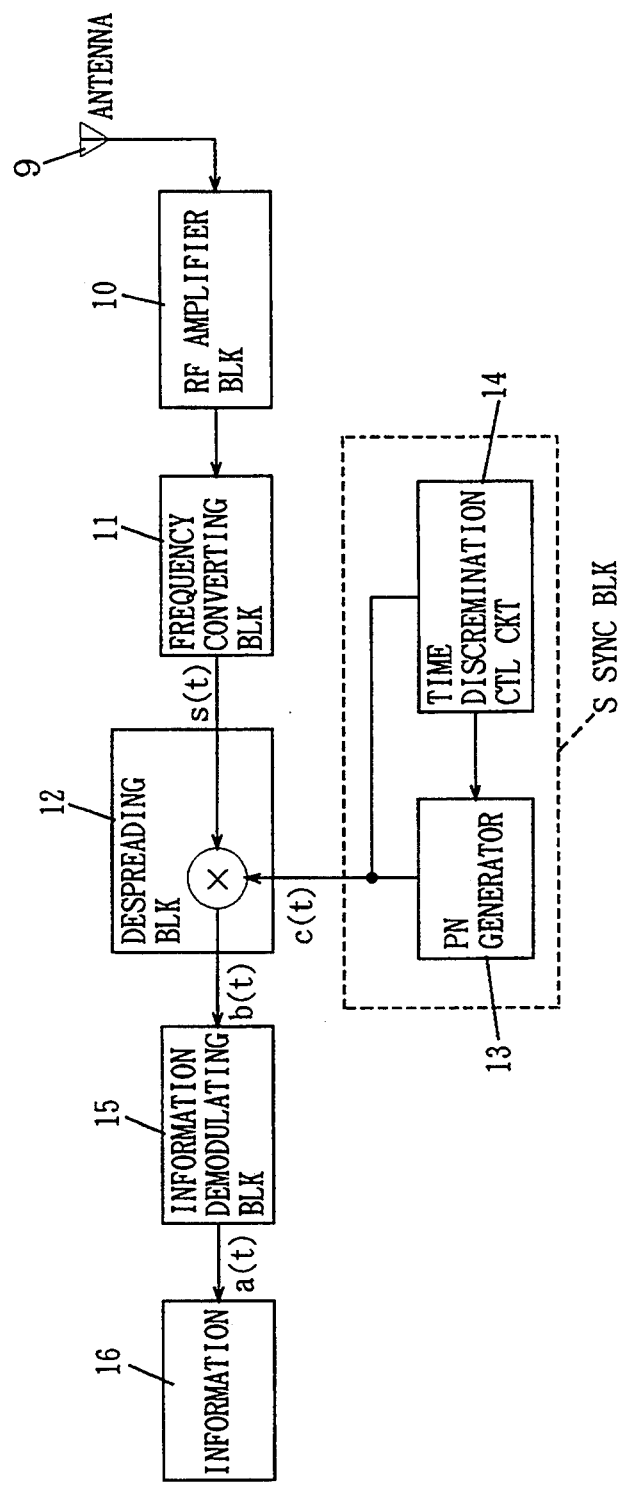
FIG. 2 is a schematic block diagram showing a receiver of conventional spread spectrum communication system employing direct sequence.
Figure 4:
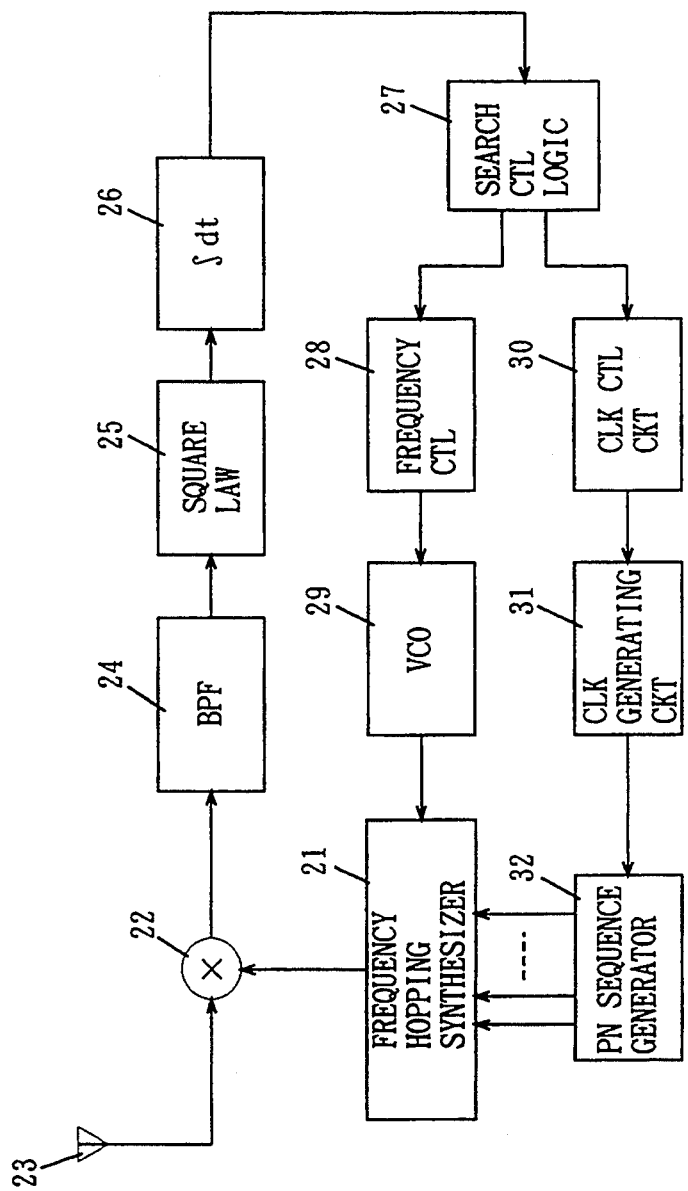
FIG. 4 is a block diagram of an acquisition circuit in a conventional frequency hopping.
Figure 5:
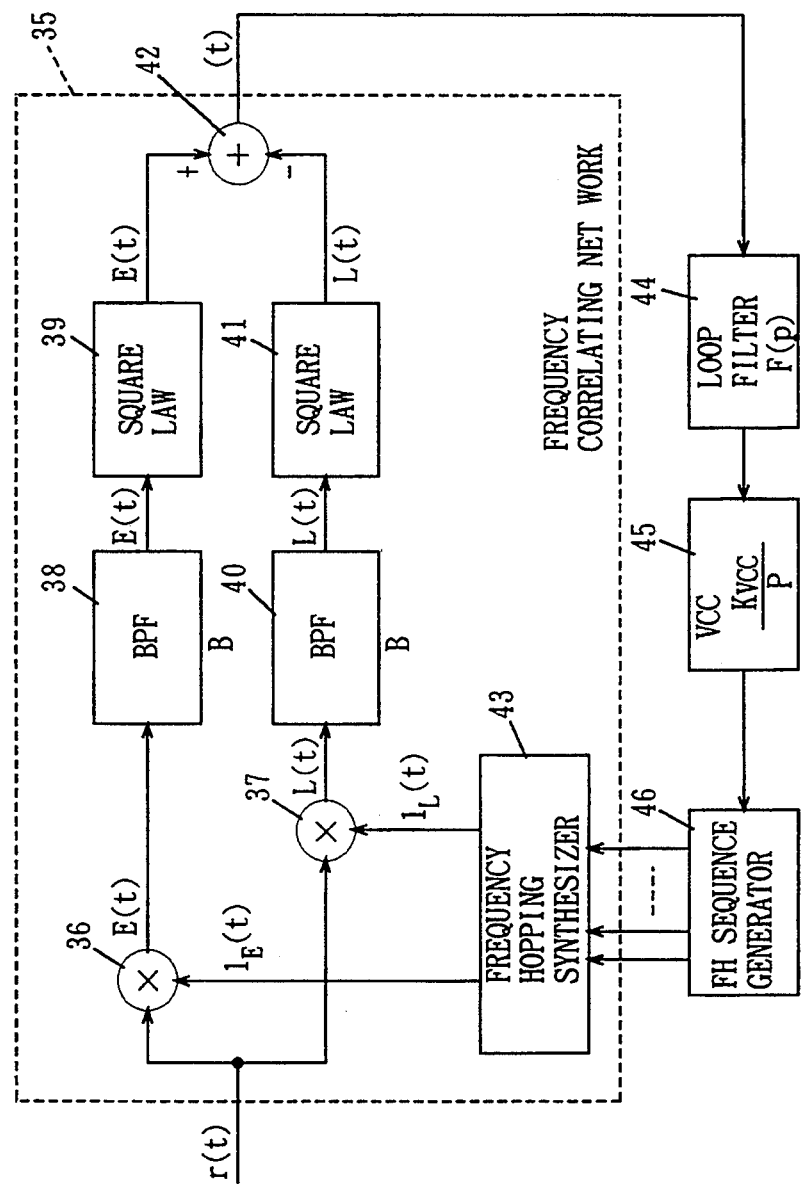
FIG. 5 is a block diagram of tracking circuit in the frequency hopping.
Figure 6:
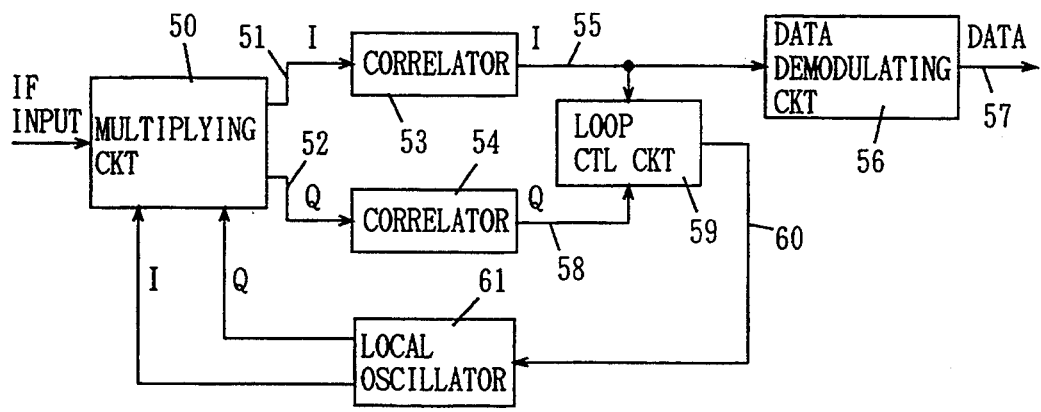
FIG. 6 is a block diagram of a demodulator employing the conventional despreading system.
Figure 7:
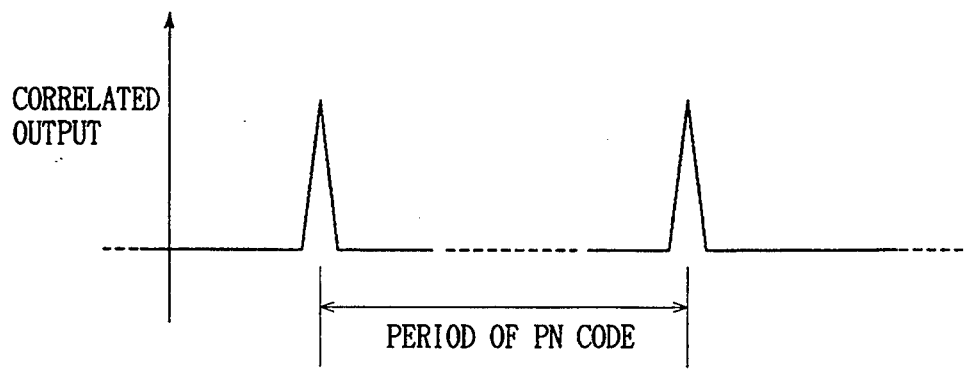
FIG. 7 is a diagram of output waveform of a correlator shown in FIG. 6.
Figure 8:
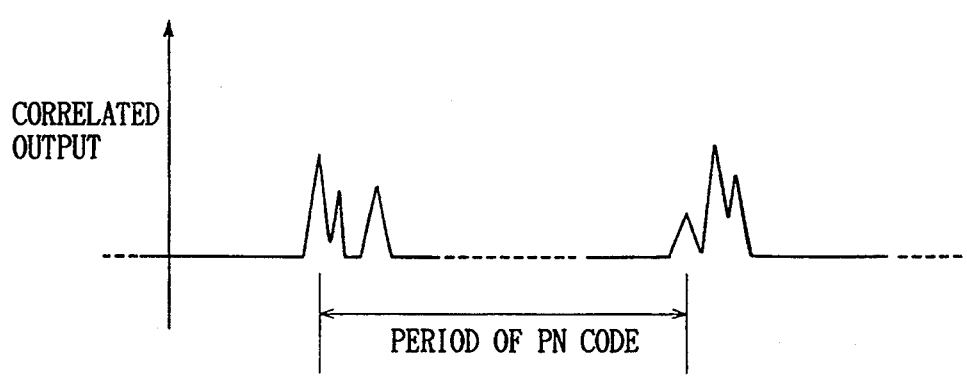
FIG. 8 is a diagram of output waveform of a correlator when there are much multipath fading.
Figure 9:
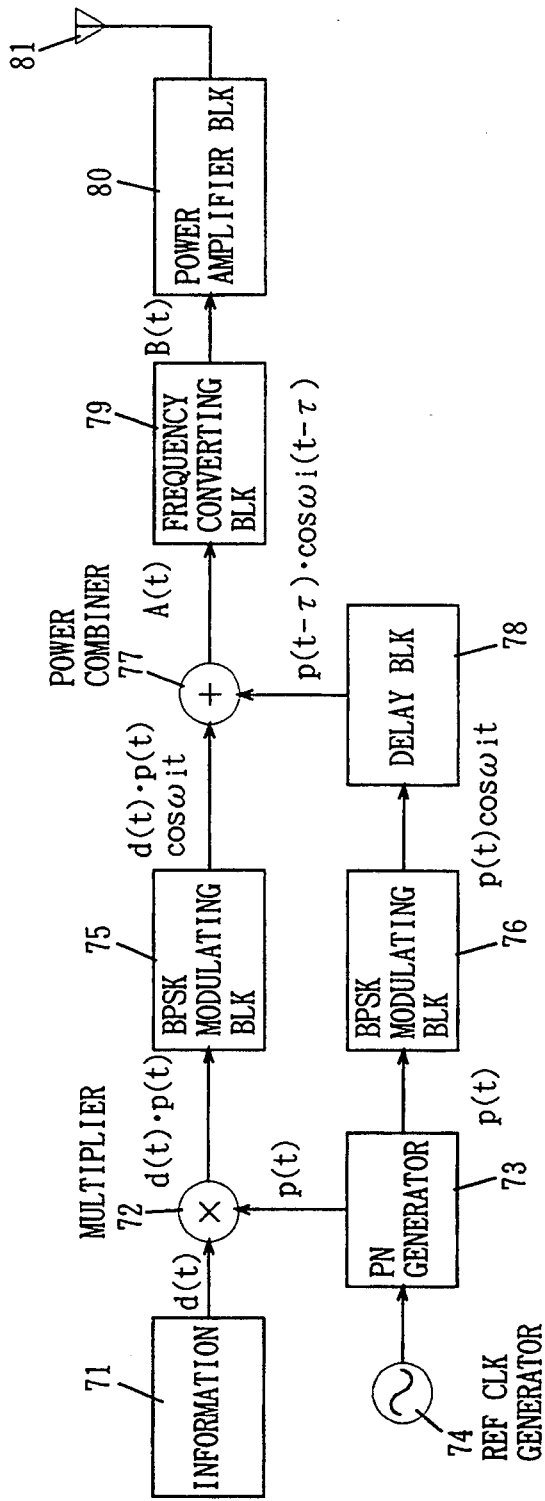
FIG. 9 is a block diagram of a transmitter in accordance with one embodiment of the present invention.
Figure 10:
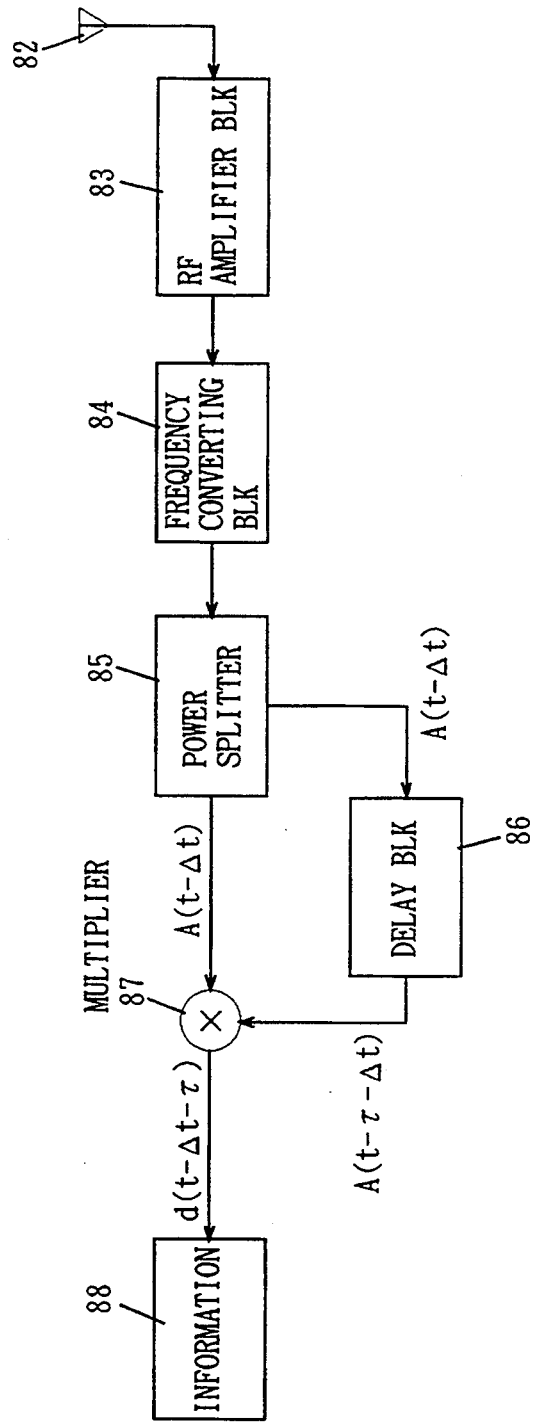
FIG. 10 is a schematic block diagram of a receiver in accordance with one embodiment of the present invention.

FIGS. 9 and 10 are block diagrams showing one embodiment of the present invention. FIG. 9 shows the transmitter side and FIG. 10 shows the receiver side.

The transmitting system will be described with reference to FIG. 9. Information 71 is represented as d(t), which is a digital signal represented by 1, −1. A PN code signal p(t) is generated from a PN generator 73 based on the clock from a reference clock generator 74. The signal p(t) is divided into two paths, one of which is fed to a multiplier 72. The bit rate of signal p(t) is made considerably faster than that of d(t). The multiplier 72 multiplies the signal d(t) by the signal p(t). The signal p(t) is also a code which assumes 1 or −1 in a pseudo random manner. Accordingly, the spectrum comes to be spread to have the width (chip rate of p(t))/(bit rate of the data) times that when the data only is used. The output d(t)·p(t) from multiplier 72 is subjected to BPSK modulation by a BPSK modulating block 75 and turned into d(t)·p(t)·cos $\omega_i$t, where $\omega_i$ represents local frequency and d(t)·p(t) assumes either 1 or −1.

Signal p(t) passes through the other path as described in the following. It passes through BPSK modulating block 76 to be changed to p(t)·cos $\omega_i$t, then it passes through a delay block 78 to be p(t-τ) cos $\omega_1$(t-τ) where τ represents delay time, which is longer than one chip of the PN code. The output signals from these two paths are combined by a power combiner 77 and turned to {d(t)·p(t)·cos $\omega_i$+p(t-τ)·cos $\omega_i$(t-τ)}.

This is represented as A(t). This signal A(t) has its frequency converted to RF by a frequency converting block 79 to be B(t). This signal B(t) is amplified by power amplifier block 80 and transmitted from an antenna 81.

On the receiver side, the signal received by an antenna 82 is amplified by an RF amplifier block 83 and it has its frequency converted to the intermediate frequency band at a frequency converting block 84. This signal is divided into two paths by a power splitter 85. Assuming that the time for propagation between the transmitter and the receiver is Δt, one is input to a multiplier 87 as A(t-Δt), while the other one is passed through a delay block 86 having the same delay time τ as the delay block 78 on the transmitter side to be A(t-τ-Δt) and input to multiplier 87. Here, A(t-Δt) represents {d(t-Δt)·p(t-Δt)·cos $\omega_i$(t-Δt)+p(t-Δt-τ)·cos $\omega_i$(t-Δt-τ)}   (1)

and A(t-Δt-τ) represents

{d(t-Δt-τ)·p(t-Δt-τ)·cos $\omega_i$(t-Δt-τ)+p(t-Δt-2τ)·cos $\omega_i$(t-Δt-2τ)}   (2)

Therefore, an output provided from multiplier 87 is represented as a sum of four terms except the double frequency component of $\omega_1$, that is, {d(t − Δt)·d(t − Δt − τ)·p(t − Δt)·p(t − Δt − τ)·   (3)

cos$\omega_i$τ + d(t − Δt)·p(t − Δt)·p(t − Δt − 2τ)·cos2$\omega_i$τ + d(t − Δt − τ)·p(t − Δt − τ)·p(t − Δt − τ)·cos0 + p(t − Δt − τ)·p(t − Δt − 2τ)·cos$\omega_i$τ}

However, noting the term p(t) of the PN code, there is a deviation of at least T except the synchronized third term {d(t-Δt-τ)·p(t-Δt-τ)·p(t-Δt-τ)·cos 0}   (4)

and therefore the spectrum is kept spread and data component d(t) can be obtained.

In this manner, by the above described embodiment, by transmitting a combined signal from the transmitter, despreading can be easily done on the receiver side. As for synchronization, synchronization can be established approximately at the same time as the turning on of the power switch, and the time necessary for synchronization is nearly 0. Since the phase of the carrier wave is also delayed in the transmitter side, the carrier wave can also be removed from the output of the multiplier 87 on the receiver side, which further facilitates demodulation of information.

Figure 11:
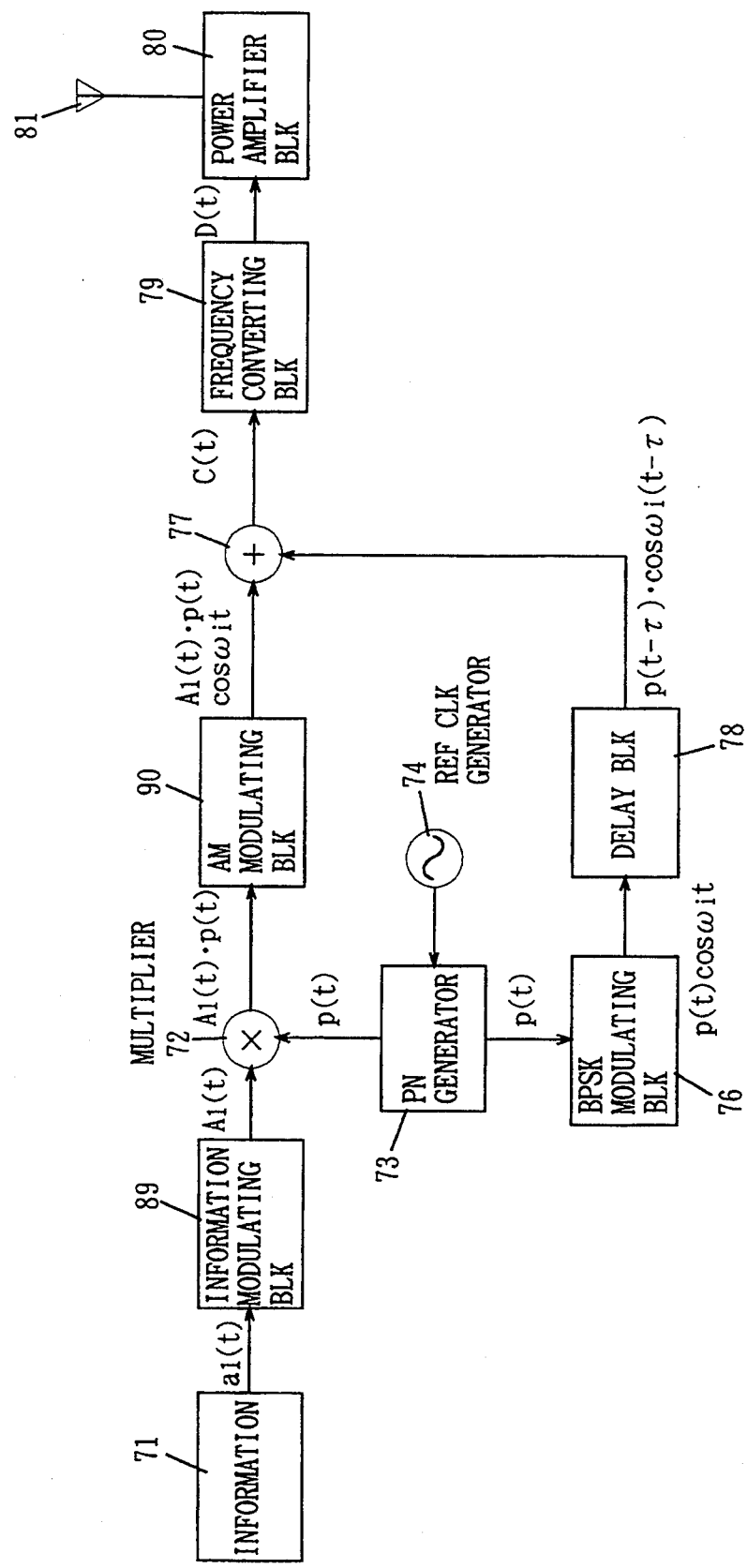
FIG. 11 is a schematic block diagram of a transmitter in accordance with the second embodiment of the present invention.
Figure 12:
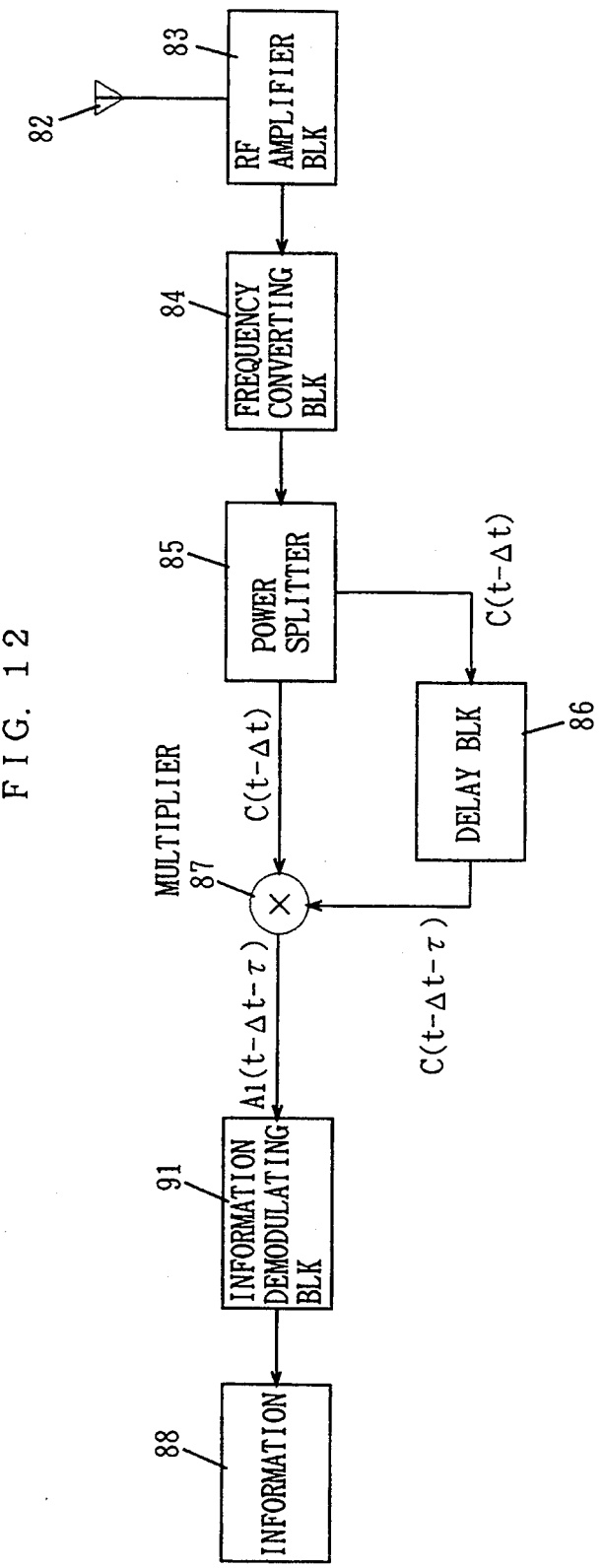
FIG. 12 is a schematic block diagram of a receiver in accordance with the second embodiment of the present invention.

FIGS. 11 and 12 are block diagrams of the second embodiment. FIG. 11 shows the transmitter side and FIG. 12 shows the receiver side. In this example, modulation of information is carried out in analog manner. FIGS. 11 and 12 differ from FIGS. 9 and 10 in that the information is analog information so that the information modulating block 89 effects analog modulation, and that BPSK modulating block 75 of FIG. 9 is changed to an AM modulation block 90.

Referring to FIG. 11, an analog signal $a_1$(t) of information 71 is subjected to analog modulation at information modulating block 89 and is turned to a signal $A_1$(t). Modulation may be AM, FM, PM or any other modulation. The signal $A_1$(t) which has been modulated here is multiplied by a PN code signal p(t) formed by a PN generator 73 to be $A_1$(t)·p(t). The signal p(t) assumes either 1 or −1. Thereafter, it is subjected to AM modulation at an AM modulating block 90 to be $A_1$(t)·p(t)·cos $\omega_i$t, and input to a power combiner 77.

The PN code signal p(t) formed by PN generator 73 driven by a reference clock oscillator 74 is subjected to BPSK modulation by BPSK modulating block 76 to be p(t)·cos $\omega_i$t, which is passed through a delay block 78 to be p(t-τ)·cos $\omega_i$(t-τ), where τ represents the delay time.

These two signals are combined by power combiner 77 to be C(t), here C(t) is represented as {p(t)·$A_1$(t)·cos $\omega_i$t+p(t-τ)·cos $\omega_i$(t-τ)}   (5)

This has its frequency converted to RF by frequency converting block 79 to provide D(t), which is amplified by power amplifier block 80 and transmitted from an antenna 81.

On the receiver side, the combined signal is received by an antenna 82, amplified by an RF power amplifier portion 83 and it has its frequency converted to IF band by a frequency converting block 84, as shown in FIG.

12. Thereafter, the received signal is divided into two paths by a power splitter 85, one of which is directly input to multiplier 87, while the other is passed through delay block 86 to be delayed by the same delay time as in the delay block 78 on the transmitter side and then input to multiplier 87. The output from power splitter 85 is C(t-Δt) where Δt represents time of propagation between the transmitter and the receiver, which C(t-Δt) is $$\{p(t-\Delta t)\cdot A_1(t-\Delta t)\cdot \cos \omega_i(t-\Delta t)+p(t-\Delta t-\tau)\cdot \cos \omega_i(t-\Delta t-\tau)\} \quad (6)$$

The output C(t-Δt-τ) from delay block 86 represents $$\{p(t-\Delta t-\tau)\cdot A_1(t-\Delta t-\tau)\cdot \cos \omega_i(t-\Delta t-\tau)+p(t-\Delta t-2\tau)\cdot \cos \omega_i(t-\Delta t-2\tau)\} \quad (7)$$

Therefore, the output from multiplier 87 is represented by four terms with the double frequency component of the carrier wave removed, and except the term $$\{p(t-\Delta t)\cdot p(t-\Delta t-\tau)\cdot A_1(t-\Delta t-\tau)\cdot \cos 0\} \quad (8)$$

in which the PN code is in synchronization, the levels are low as in the first embodiment described above. The output comes to be $A_1(t-\Delta t-\tau)$. By demodulating this output by information demodulating block 91, information 88 can be obtained.

By this method, by adding such a simple spread spectrum communicating circuit as described above, a system strong against multipath fading and narrow band noise can be obtained also for the signals using FM, AM or PM.

Figure 13:
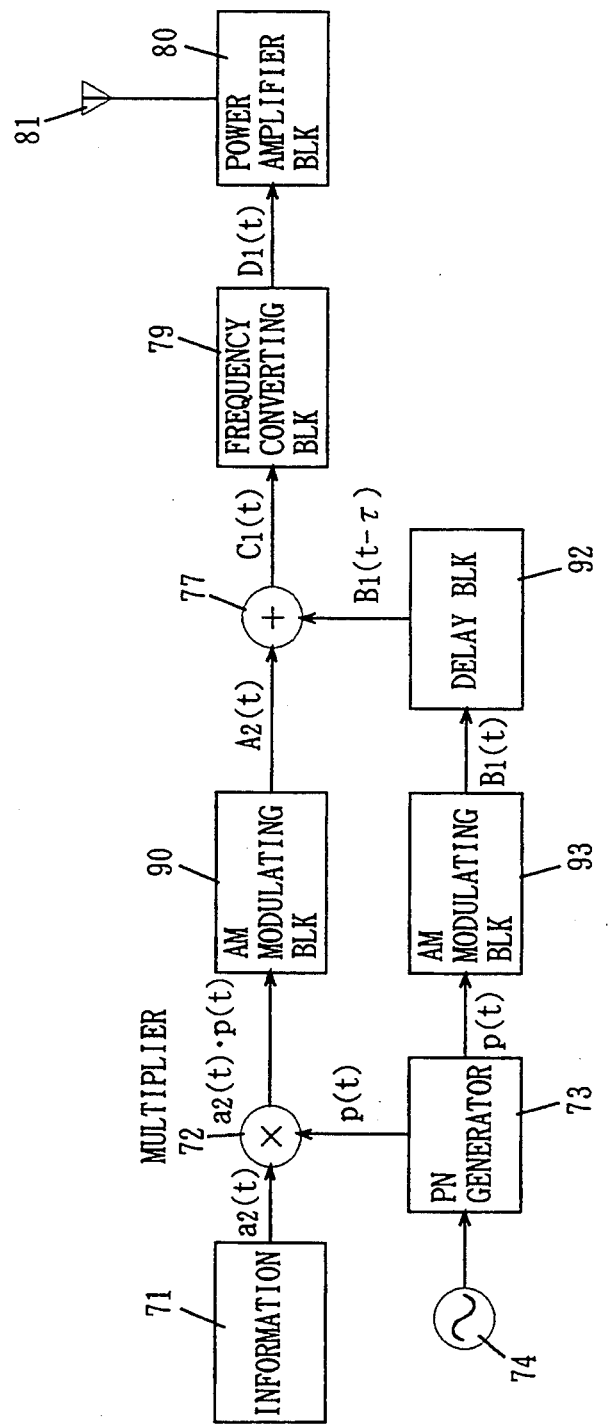
FIG. 13 is a schematic block diagram of a transmitter in accordance with the third embodiment of the present invention.
Figure 14:
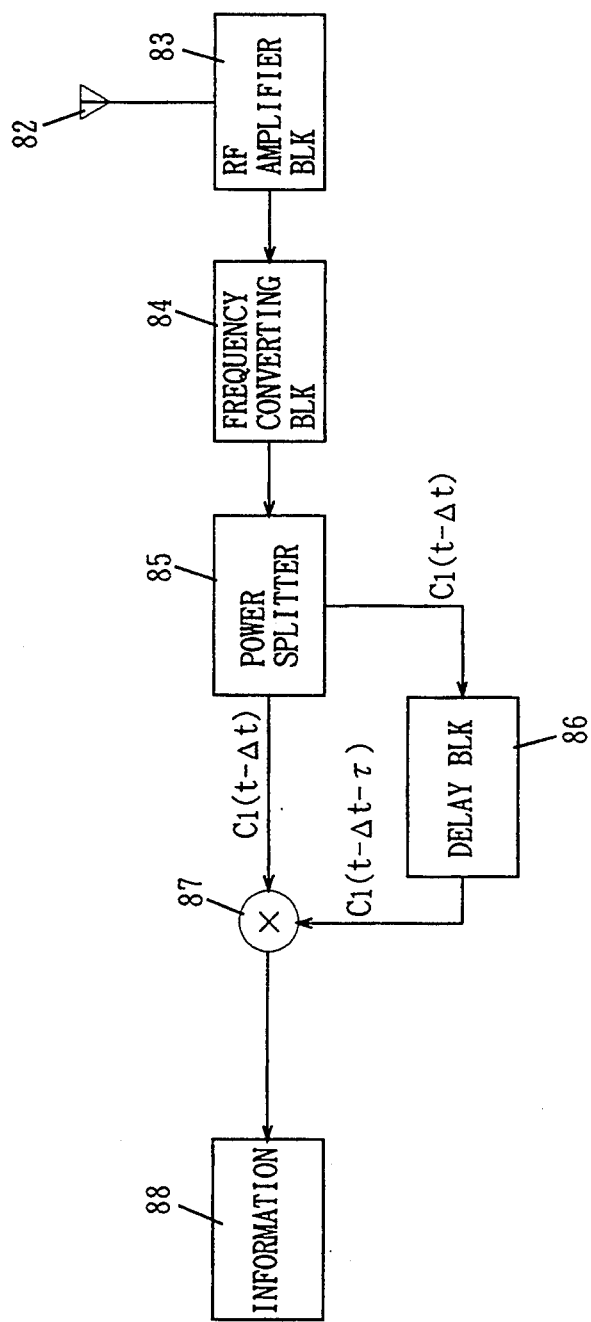
FIG. 14 is a schematic block diagram of a receiver in accordance with the third embodiment of the present invention.

FIGS. 13 and 14 are block diagrams of the third embodiment in which FIG. 13 shows the transmitter side and FIG. 14 shows the receiver side. In this example, it is assumed that an analog signal (audio signal and the like) is directly subjected to spectrum spreading.

Referring to FIG. 13, information 71 is an analog signal and it is represented as $a_2(t)$. It is multiplied by a PN code signal p(t) formed in PN generator 73 driven by reference clock oscillator 74 in multiplier 72 to be $a_2(t)\cdot p(t)$, and is subjected to AM modulation at an AM modulating block 90. The resulting signal is represented as $A_2(t)$. The PN code signal P(t) formed at PN generator 73 is similarly subjected to AM modulation at AM modulating block 93 (which is equivalent to BPSK modulation here) to be a signal $B_1(t)$, that is, $p(t)\cdot \cos \omega_i t$, which is delayed by τ at delay block 92 as in the embodiments 1 and 2 to be a signal $B_1(t-\tau)$ that is, $p(t-\tau)\cdot \cos \omega_i(t-\tau)$. These two signals are combined at power combiner 77, resulting in a signal $C_1(t)$. Thereafter, it is converted to RF by frequency converting block 79 as in the embodiments 1 and 2 to be $D_1(t)$ which is amplified by power amplifier block 80 and transmitted from antenna 81.

The structure of the system on the receiver side is similar to those of embodiments 1 and 2, as shown in FIG. 14. The signal received by receiving antenna 87 is amplified by RF amplifier block 83, it has its frequency converted to IF by frequency converting block 84 and divided into two paths by power splitter 85.

Assuming that the time for propagation between the transmitter and the receiver is Δt, one of the split signal is represented as $C_1(t-\Delta t)$ and input to multiplier 87. $C_1(t-\Delta t)$ represents $$\{a_2(t-\Delta t)\cdot p(t-\Delta t)\cdot \cos \omega_i(t-\Delta t)+p(t-\Delta t-96)\cdot \cos \omega_i(t-\Delta t-\tau)\} \quad (9)$$

The other one passes through a delay block 86 having the same delay time as the delay block 92 on the transmitter side as in embodiments 1 and 2 to be $C_1(t-\Delta t-\tau)$ to be input to multiplier 87. $C_1(t\Delta t-\tau)$ represents $$\{a_2(t-\Delta t-\tau)\cdot p(t-\Delta t-\tau)\cdot \cos \omega_i(t-\Delta t-\tau)+p(t-\Delta t-2\tau)\cdot \cos \omega_i(t-\Delta t-2\tau)\} \quad (10)$$

therefore, the output from multiplier 87 is only
$$\{p(t-\Delta t-\tau)\cdot p(t-\Delta t-\tau)\cdot a_2(t-\Delta t-\tau)\cdot \cos 0\} \quad (11)$$

in which the PN code is synchronized from the same reason as described with reference to embodiments 1 and 2, and thus data can be obtained. By this method also, by adding a simple spread spectrum circuit, a system strong against multipath fading and narrow pass band can be obtained, and multiple accessing in the same band becomes possible by shifting the delay time τ.

In the first to third embodiments, there are two terms in which $\cos \omega_i \tau$ is multiplied as a coefficient and there is one term in which $\cos 2\omega_i \tau$ is multiplied as a coefficient, among the three terms in which the PN code is not synchronized, in the four terms of the output from multiplier 87 on the receiver side. In this connection, more effective communication becomes possible by selecting the values of $\omega_i$ and τ to minimize the value of An which is $$A_n = A_1 \cdot \cos \omega_i \tau + A_2 \cdot \cos \omega_i \tau + A_3 \cdot \cos 2\omega_i \tau \quad (12)$$

The spectrum of the spread spectrum signal is represented as a line spectrum of a space of $(f_{PN}/L)$ (Hz) having an envelope of $(\sin x/x)^2$ with the first null point being at $f_c \pm f_{PN}$, where the chip rate of the PN code is represented as $f_{PN}$(bps), the code length is represented as L(chips) and the central frequency is represented as $f_c$(Hz). Each line spectrum has been subjected to data modulation, and the spectrum component at $f_c$(Hz) is suppressed in power to $(1/L^2)$ as compared with the level before spreading. The spectrum spread in this manner is concentrated at the central frequency portion by despreading, and the component of other line spectrum becomes 0.

Assume that the spectrum band before spreading is $2f_D$. If it is spread to be $2f_D > f_{PN}/L$, the spectrum at the $f_c$ portion overlaps with the spectrum of the portion $(f_c \pm (f_{PN}/L))$ from the above described reason. Accordingly, when band of $2f_D$ is to be taken out by concentrating power at the $f_c$ portion by despreading of one communication by CDMA, some of the spectrum of the portion $\{f_c \pm f_{PN/L}\}$ of other communication enters in the band, causing C/N degradation.

Therefore, more effective communication is enabled when the system is adapted to satisfy $2f_d < (f_{PN}/L)$.

Figure 15:
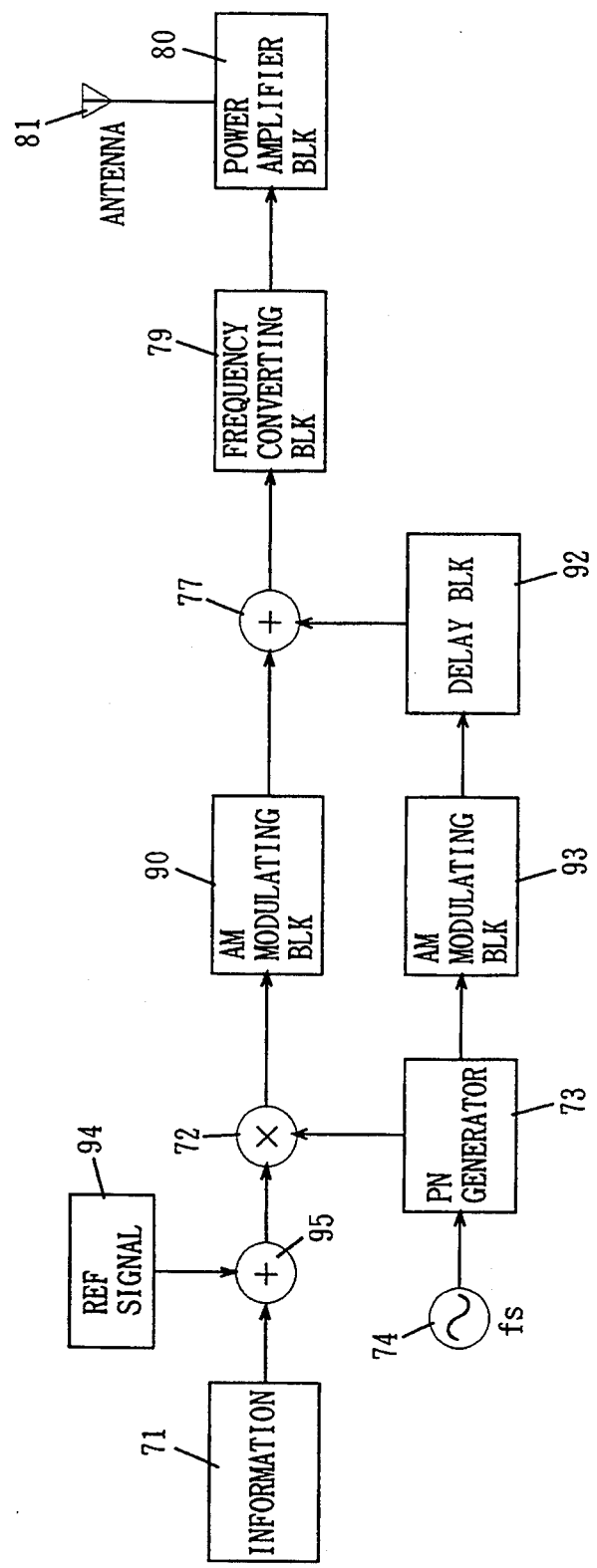
FIG. 15 is a schematic block diagram of a transmitter in accordance with the fourth embodiment of the present invention.
Figure 16:
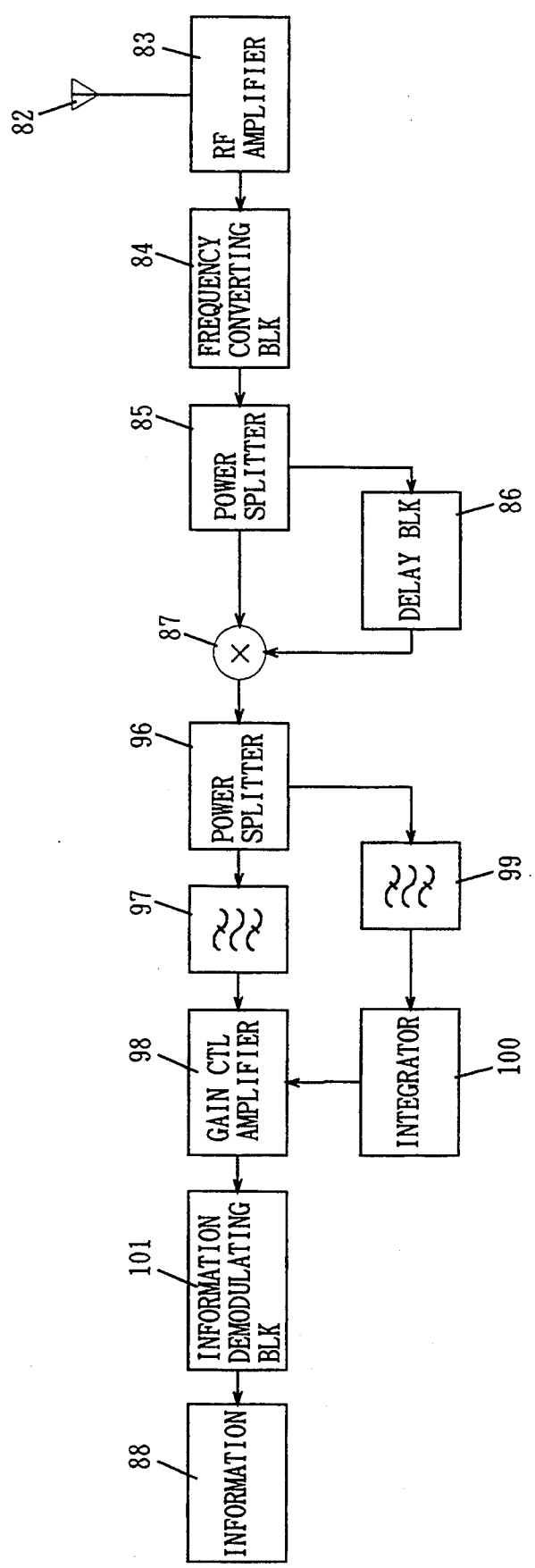
FIG. 16 is a schematic block diagram of a receiver in accordance with the fourth embodiment of the present invention.

FIGS. 15 and 16 are block diagrams of the fourth embodiment in which FIG. 15 shows the transmitter side and FIG. 16 shows the receiver side. This embodiment is a modification of the third embodiment shown in FIG. 13 and on the transmitter side, data which depends on amplitude of an analog signal or AM is provided with a reference signal to be spread and transmitted.

Referring to FIG. 15, information 71 dependent on amplitude of baseband data or of AM modulating wave, and a reference signal 94 which is a narrow band signal out of the data band or a sinusoidal wave, are combined in power combiner 95. The reference signal selects information of such frequency as not to influence the data band. This is transmitted from antenna 81 in the similar manner as described in the third embodiment.

Referring to FIG. 16, various conversions are carried out in the similar manner as in the third embodiment, and despreading operation is carried out by multiplier 87. The signal after despreading is split by power splitter 96. One of the split signals has its data component only extracted by a bandpass filter 97 and is input to a gain control amplifier 96. The other one has its gain control reference signal only extracted by a bandpass filter 99, which is integrated by an integrator 100, and the gain of gain control amplifier 98 is controlled by this output. The output of gain control amplifier 98 obtained by this operation is demodulated by information demodulating block 101, and information 88 is obtained.

As for the input to multiplier 87 on the receiver side, it is apparent that $\{a(t)+r(t)\}\cdot\cos\omega_c t$ and $p(t\Delta t)\cdot\cos\omega_c(t\Delta t)$ are input. Here a(t) represents data component, p(t) represents PN code, $\omega_c$ represents carrier frequency, r(t) represents a reference signal and $\Delta t$ represents delay time in the delay circuit on the transmitter side.

The output of multiplier 87 includes four terms, that is, i) $\{a(t) + r(t)\} \{a(t - \Delta t) + r(t - \Delta t)\} \cdot p(t) \cdot$ (13)
$p(t - \Delta t) \cdot \cos\omega_c t \cdot \cos\omega_c(t - \Delta t)$
ii) $\{a(t) + r(t)\} p(t) \cdot p(t - 2\Delta t) \cdot$
$\cos\omega_c t \cdot \cos\omega_c(t - 2\Delta t)$
iii) $\{a(t - \Delta t) + r(t - \Delta t)\} \cdot p(t) \cdot p(t - \Delta t) \cdot$
$\cos\omega_c(t - \Delta t) \cdot \cos\omega_c(t - \Delta t)$
iv) $p(t - \Delta t) \cdot p(t - 2\Delta t) \cdot \cos\omega_c(t - \Delta t) \cdot$
$\cos\omega_c(t - 2\Delta t)$ of which only the term iii) has its PN code removed, so that the desired component can be taken out. Other components are all spread, and when the chip number is 127 chips, it becomes lower by at least 21 dB as compared with the desired component, there is no problem to the gain control signal. By this method, a system can be realized in which data having amplitude information can be received at the uniform level.

Figure 17:
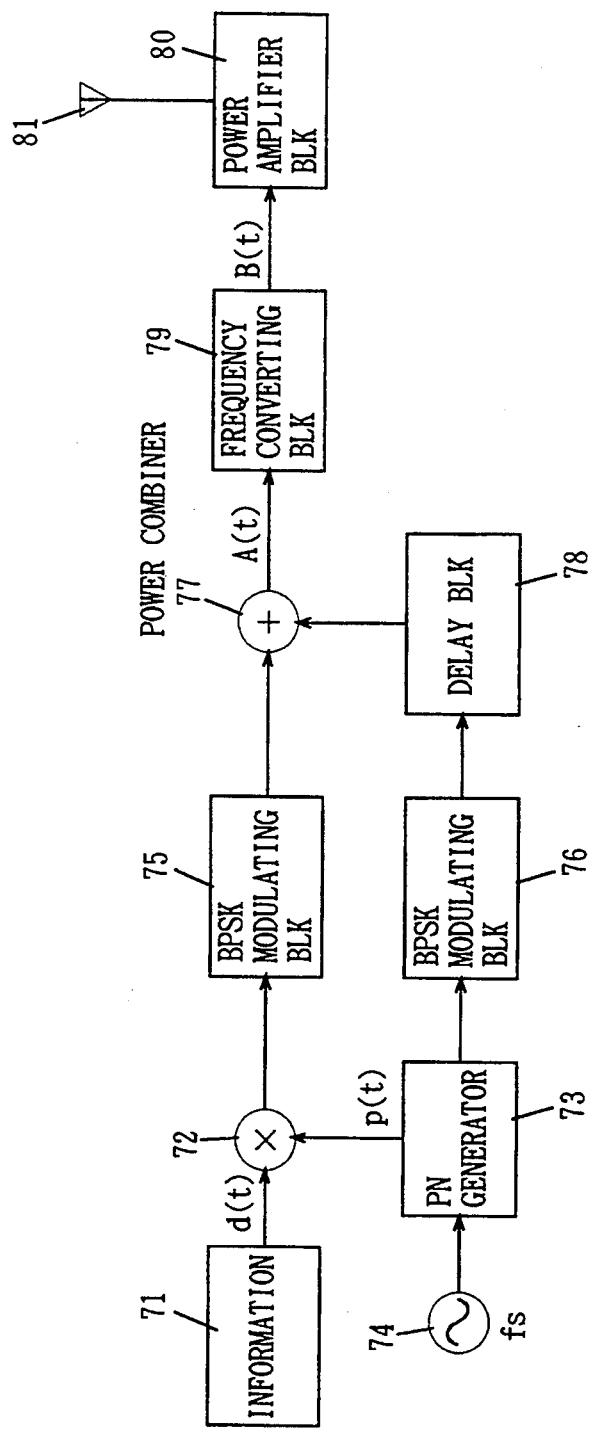
FIG. 17 is a schematic block diagram of a transmitter in accordance with the fifth embodiment of the present invention.
Figure 18:
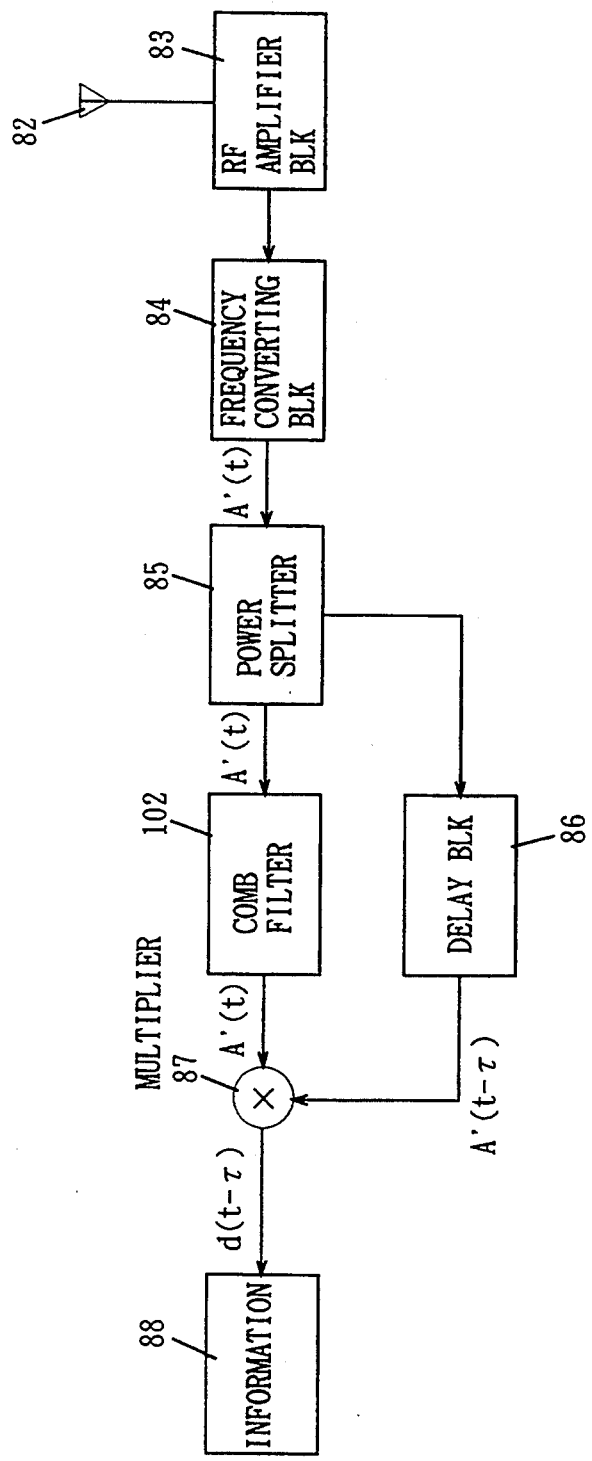
FIG. 18 is a schematic block diagram of a receiver in accordance with the fifth embodiment of the present invention.

FIGS. 17 and 18 are block diagrams of the fifth embodiment in which FIG. 17 shows the transmitter side and FIGS. 18 shows the receiver side.

The transmitter side shown in FIG. 17 is the same as that of FIG. 9. Information 71 is represented as d(t). Though a digital signal has been described in the embodiment of FIG. 9, the embodiment of FIG. 17 may be applicable both to analog and digital signals. This is multiplied by PN code p(t) having the chip rate of $f_s$(chips/sec) generated by PN generator 73 at multiplier 72, modulated by BPSK modulating block 75 (AM modulating block when the information is an analog signal) and input to power combiner 77. The PN code generated by PN generator 73 passes through the other path to be directly modulated by BPSK modulating block 76, delayed by the amount $\tau$ by delay block 78 and input to power combiner 77.

The output A(t) from power combiner 77 is represented as $A(t)=d(t)\cdot p(t)\cdot\cos\omega_c t+p(t-\tau)\cdot\cos\omega_c(t-\tau)$ (14)

as in the embodiment shown in FIG. 9. As in the case of FIG. 9(a), $\omega_i$ represents local frequency.

This signal has its frequency converted to RF by frequency converting block 79 as in the above embodiments to be a signal B(t), which is amplified by power amplifier block 80 and transmitted from antenna 81.

On the receiver side, the signal received by antenna 82 is amplified by RF amplifier block 83 and it has its frequency converted to intermediate frequency band by frequency converting block 84 to be A'(t), in the similar manner as described above. Here, the time for propagation between the transmitter and the receiver is neglected. Thereafter, it is distributed to two paths by power splitter 85. One passes through delay block 86 to be A'(t-$\tau$) and the other passes through a comb filter 102 to be input to multiplier 87. The input signal A'(t) to comb filter 102 and the signal A'(t-$\tau$) after it passed through delay block 86 are respectively represented as $A'(t)=d(t)\cdot p(t)\cdot\cos\omega_i t+p(t-\tau)\cdot\cos\omega_i(t-\tau)$ $A'(t-\tau)=d(t-\tau)\cdot p(t-\tau)\cdot\cos\omega_i(t-\tau)+p(t-2\tau)\cdot\cos\omega_i(t-2\tau)$ (15)

By multiplying the second term in the right side of the expression of A'(t) by the first term on the right side of the expression of A'(t-$\tau$), data d(t-$\tau$) is demodulated. Here, the first term of the right side of the expression of A'(t) and the communication path noise affect the result of demodulation. Therefore, in order to remove these, a comb filter 102 which passes only a group of PN code line spectrum of the second term on the right side of the expression of A'(t) is provided, and the output from comb filter 102 and A'(t-$\tau$) are multiplied by multiplier 87, so that PN code and a carrier wave are removed and information can be obtained. If it is assumed that the total of pass band width of comb filter 102 is 1% of the band of spread spectrum communication and white noise is dominant in the received noise, then the signal after passage through comb filter 102 is improved in C/N by 20 dB as compared with A'(t).

Figure 19:
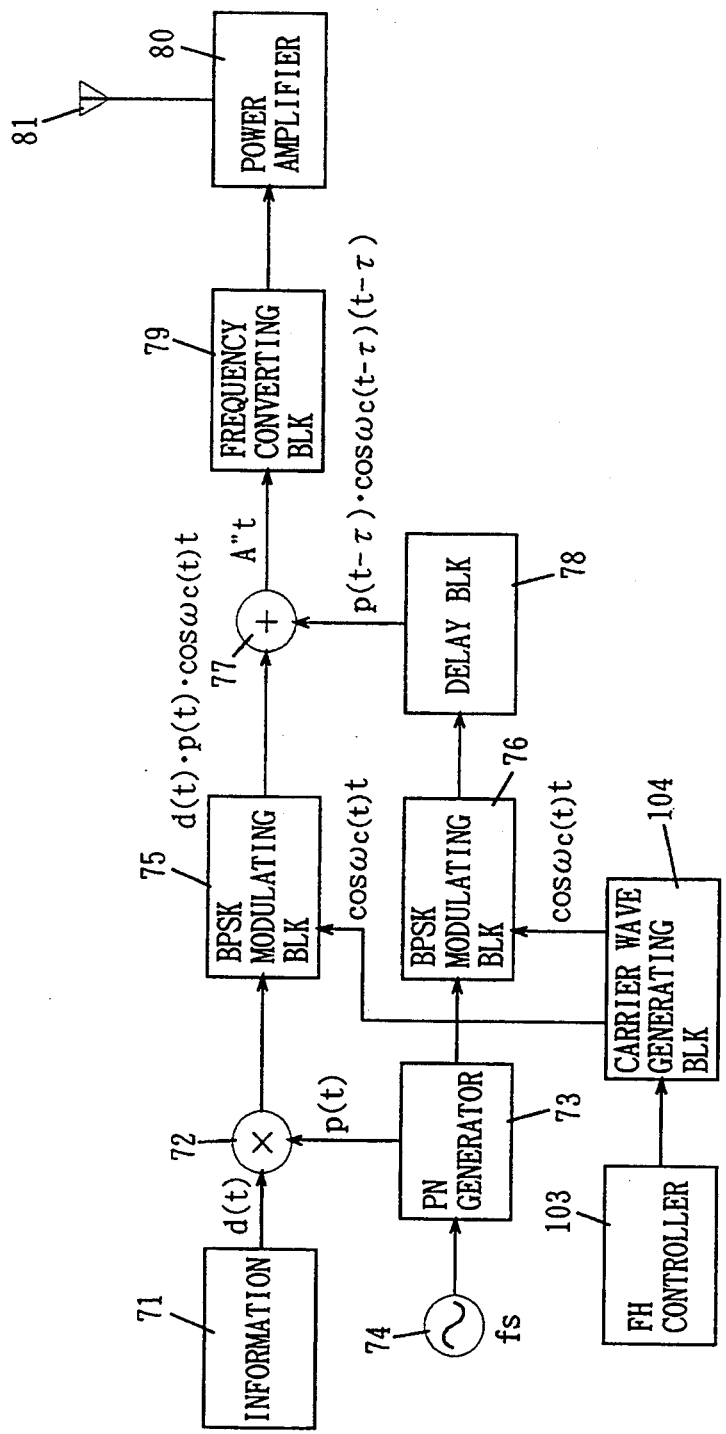
FIG. 19 is a schematic block diagram of a transmitter in accordance with the sixth embodiment of the present invention.

FIG. 19 is a block diagram of a sixth embodiment, which is still further effective against interfering waves. In this embodiment, the transmitting system of FIG. 9 of the first embodiment is improved, in which direct sequence and frequency hopping are both employed. The receiver shown in FIG. 10 is used in the receiver side.

Referring to FIG. 19, data information 71 is represented as d(t). It is multiplied by PN code from PN generator 73 in multiplier 72, and then subjected to primary modulation in BPSK modulating block 75. The PN code from PN generator 73 is transmitted to the other path and the PN code passes through BPSK modulating block 76 and delay block 78 by itself to be combined in power combiner 77. Signals from both paths are at this time simultaneously subjected to secondary modulation by a carrier wave generated by carrier wave generating block 104 which is controlled by a FH (Frequency Hopping) controller 103. The frequency at the carrier wave generating block 104 changes in synchronization or in non-synchronization with the data at every several to several ten bits.

The operation will be described in the following. The output from BPSK modulating block 75 is $d(t)\cdot p(t)\cdot\cos\omega_{c(t)}t$, where PN code is represented as p(t), data is represented as d(t), the carrier wave for frequency hopping is represented as $\cos\omega_{c(t)}$ and the delay is represented as $\tau$.

Meanwhile, the output from delay block 78 is $$p(t-\tau)\cdot\cos\omega_{c(t-\tau)}(t-\tau) \quad (16)$$

Therefore, the output from power combiner 77 is represented by the following expression $$A''(t)=d(t)\cdot p(t)\cdot\cos\omega_{c(t)}t+p(t-\tau)\cdot\cos\omega_{c(t-\tau)}(t-\tau) \quad (17)$$

When this is input to the receiving system such as shown in FIG. 10, the signal which is not delayed will be $A''(t-\Delta t)$ and the signal which is delayed will be $A''(t-\Delta t-\tau)$, where $\Delta t$ represents time of propagation between the transmitter and the receiver.

Therefore, the output of the multiplier 87 shown in FIG. 10 is as follows.

$$A''(t-\Delta t)\cdot A''(t-\Delta t-\tau)= \quad (18)$$

$$\{d(t)\cdot p(t)\cdot\cos\omega_{c(t)}t+p(t-\tau)\cdot\cos\omega_{c(t-\tau)}(t-\tau)\}\times$$

$$\{d(t-\tau)\cdot p(t-\tau)\cdot\cos\omega_{c(t-\tau)}(t-\tau)+$$

$$p(t-2\tau)\cdot\cos\omega_{c(t-2\tau)}(t-2\tau)\}$$

With the double frequency component of $\omega_{c(t)}$ removed, $$=d(t)\cdot d(t-\tau)\cdot p(t)\cdot p(t-\tau)\cdot \quad (19)$$

$$\cos\{\omega_{c(t)}t-\omega_{c(t-\tau)}(t-\tau)\}+d(t-\tau)\cdot p(t-\tau)\cdot p(t-2\tau)\cdot$$

$$\cos 0 + d(t)\cdot p(t)\cdot p(t-2\tau)\cdot\cos\{\omega_{c(t)}t-\omega_{c(t-2\tau)}(t-2\tau)\}+$$

$$p(t-\tau)\cdot p(t-2\tau)\cos\{\omega_{c(t-\tau)}(t-\tau)-\omega_{c(t-2\tau)}(t-2\tau)\}$$

However, when the PN code p(t) is noted, only the second term is synchronized and others are kept spread. Therefore, what is despread is the second term, i.e.

$$d(t-\tau)\cdot p(t-\tau)\cdot p(t-96)\cdot\cos 0=d(t-\tau).$$

In this manner, the same result as in the first embodiment of the present invention can be obtained, and it is understood that the present invention has general applicability even when the frequency wave is turned to $\omega_{c(t)}$ which is a variant of t, by frequency hopping. In the system of the sixth embodiment, secondary demodulation is carried out by providing a delay. Therefore, even if the secondary modulation is not synchronized with the data, the secondary modulation is possible. Therefore, modulation in the transmitter side is not necessarily be synchronized with the data.

Since the band of use ever changes in this system because of frequency hopping, even if there is strong CW interference which could not be met by the spread gain of direct sequence, the interference can be avoided by the change of frequency. Therefore, advantageous of both frequency hopping and direct sequence can be enjoyed, while demodulation can be carried out in a simple manner without incurring any load on the demodulator.

As described above, according to the first to sixth embodiments, by transmitting a signal modulated by a PN code and data as well as a signal obtained by delaying the PN code by more than 1 chip from the transmitter side 3, despreading can be easily carried out on the receiving side. Consequently, the circuitry can be made smaller, and the cost can be reduced. Further, there is an advantage that the time for synchronization is not necessary at all. In addition, the spread spectrum communication system can be easily added to the conventional communication system, enabling more effective communication strong against multipath fading and narrow band noise.

Figure 20:
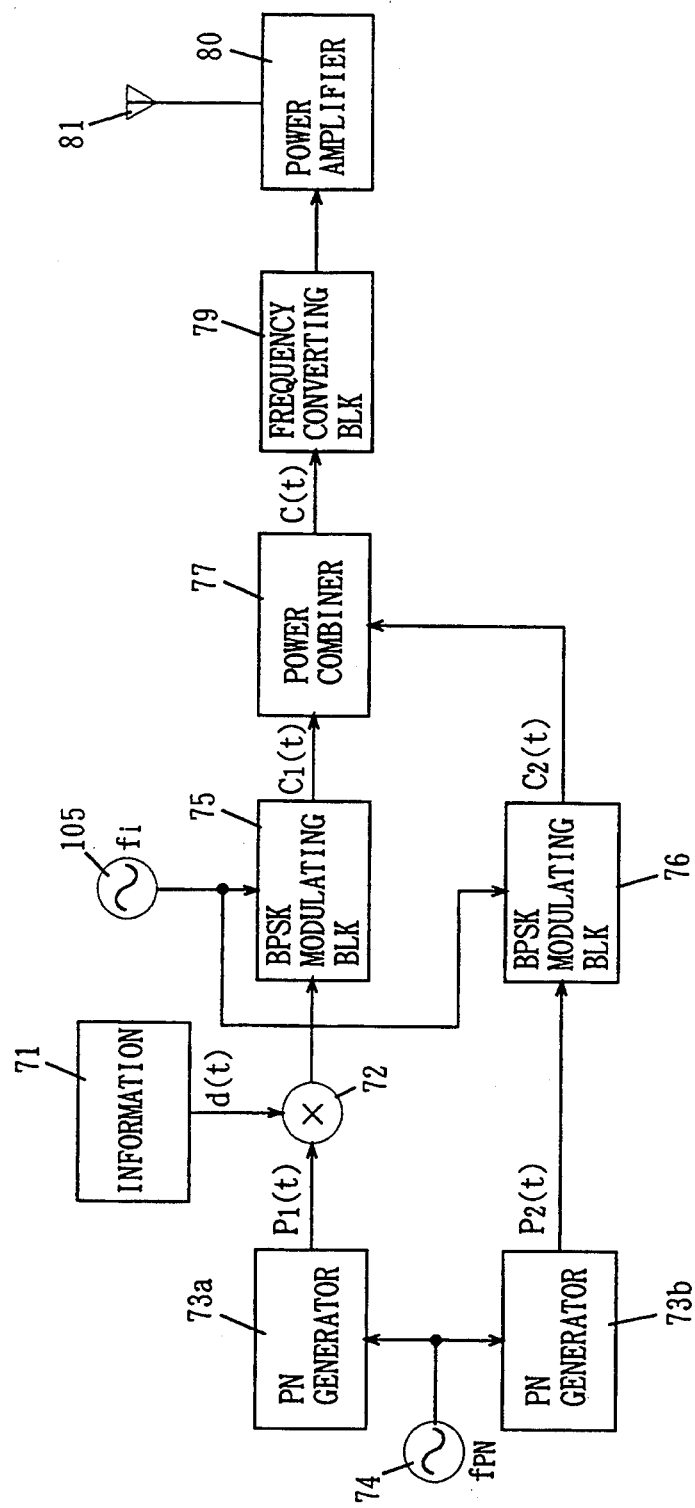
FIG. 20 is a schematic block diagram of a transmitter in accordance with the seventh embodiment of the present invention.
Figure 21:
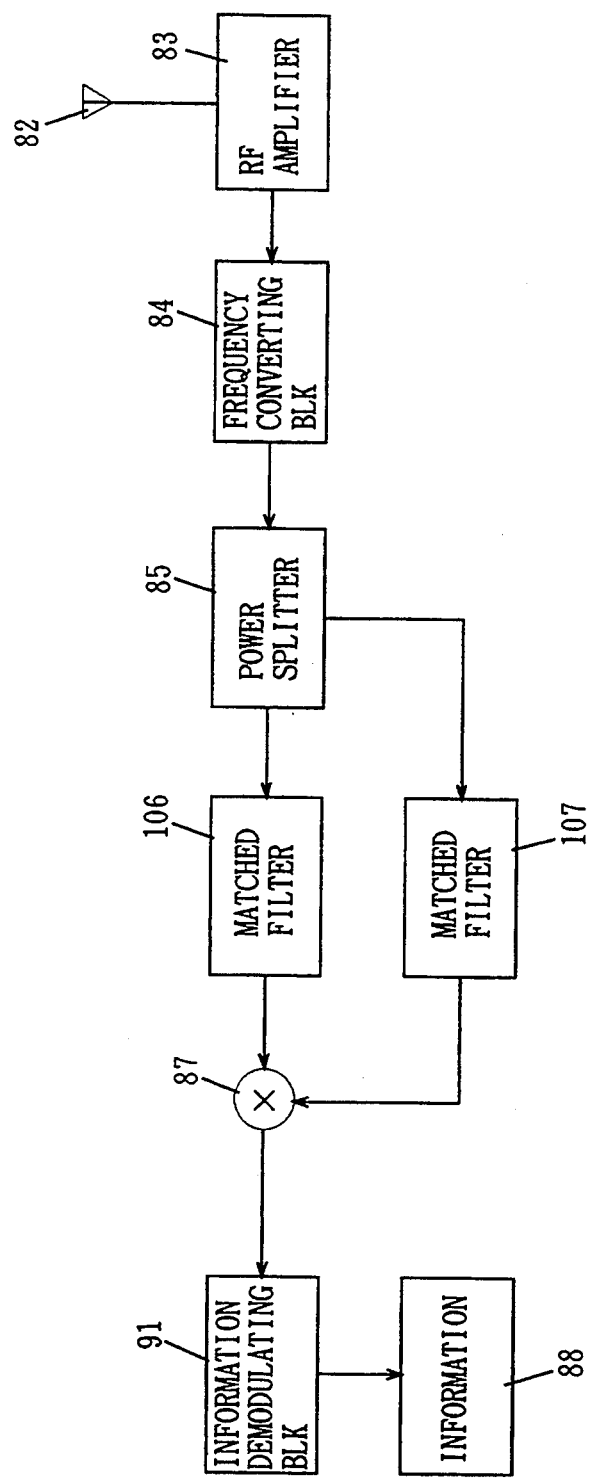
FIG. 21 is a schematic block diagram of a receiver in accordance with the seventh embodiment of the present invention.

FIGS. 20 and 21 are schematic block diagrams of the seventh embodiment, in which FIG. 20 shows the transmitter side and FIG. 21 shows the receiver side.

This embodiment differs from the above described first to sixth embodiments in that two code generators 73a and 73b are used in FIG. 20 and two matched filters 106 and 107 are used in FIG. 21.

The transmitter side will be described with reference to FIG. 20. Now, information 1 (digital data which assumes either +1 or −1) is represented as d(t). d(t) is multiplied by a PN code $p_1(t)$ generated from PN generator 73a in multiplier 72 to be $d(t)\cdot p_1(t)$. PN generator 73a is driven by a reference clock ($f_{PN}$[Hz]) generated by a reference clock generator 74. Generally, it holds $f_{PN}>>f_d$ when data bit rate is represented as $f_d$[Hz], and therefore the frequency spectrum $d(t)\cdot p_1(t)$ has been spread as compared with that of d(t). Assume that the code length of $p_1(t)$ is L chips (L: integer) and that a period of the PN code is allotted per 1 bit of data, then $f_{PN}=L\cdot f_d$. Thereafter, it is BPSK modulated by the frequency wave ($f_i$[Hz]) of the reference oscillator 105. The resulting signal $c_1(t)$ can be represented as $$c_1(t)=d(t)\cdot P_1(t)\cdot\cos\omega_i t \quad (20)$$

where $\omega_i=2\pi f_i$. $C_1(t)$ is then input to power combiner 77.

The PN code $P_2(t)$ generated by PN generator 73b driven by the same clock $f_{PN}$ as the former PN node $P_1(t)$ is not multiplied with the data but subjected to BPSK modulation at the BPSK modulating block 76 by using the carrier wave $f_i$ generated by reference oscillator 105 in the similar manner as described above. The resulting signal $c_2(t)$ is represented as $$c_2(t)=p_2(t)\cdot\cos\omega_i t$$

where $\omega_i=2\pi f_i$. The code $p_2(t)$ has the same sequence length as the former code $p_1(t)$ and is synchronized therewith: however, it is a PN code having different sequence. Thereafter, $c_2(t)$ is input to power combiner 77.

These two waves $c_1(t)$ and $c_2(t)$ are combined by power combiner 77 to be c(t), which is represented as $$c(t) = c_1(t) + c_2(t) \quad (21)$$
$$= d(t)\cdot p_1(t)\cdot\cos\omega_i t + p_2(t)\cdot\cos\omega_i t$$

This signal c(t) has its frequency converted to RF by frequency converting block 79, amplified by power amplifier block 80 and transmitted to a communication pass through antenna 81.

The receiving system will be described with reference to FIG. 21. The signal received by antenna 82 is at first power-amplified by RF amplifier block 83, its frequency converted to IF by frequency converting block 84, and it is distributed to two paths by power splitter 85. It is assumed that the IF frequency is $f_i$8 Hz] as in the transmitter side. Thereafter, one of the split signals is input to a matched filter 106. The matched filter 106 has a structure corresponding to PN code $p_1(t)$. The other output of power splitter 85 is input to a matched filter 107. The matched filter 107 has a structure corresponding to the PN code $p_2(t)$.

The output from matched filters 106 and 107 have waveforms such as a sinusoidal wave modulated by a triangular pulse having the width of (2/f$_{PN}$) [sec.] at every one period of the PN code, as described above. The output from matched filter 106 includes data, and the carrier wave is inverted or non-inverted dependent on the data. However, the output from matched filter 107 does not include data, and therefore carrier wave is constantly at the non-inverted state. Therefore, by multiplying these two outputs at multiplier 87, a pulse corresponding to the data can be obtained. Information 88 is obtained by demodulating the pulse at the information demodulating block 91.

Information demodulating block 91 recoveries data clock from the triangular pulse and determines whether or not the pulse is on the positive side or the negative side depending on the clock.

Figure 22:
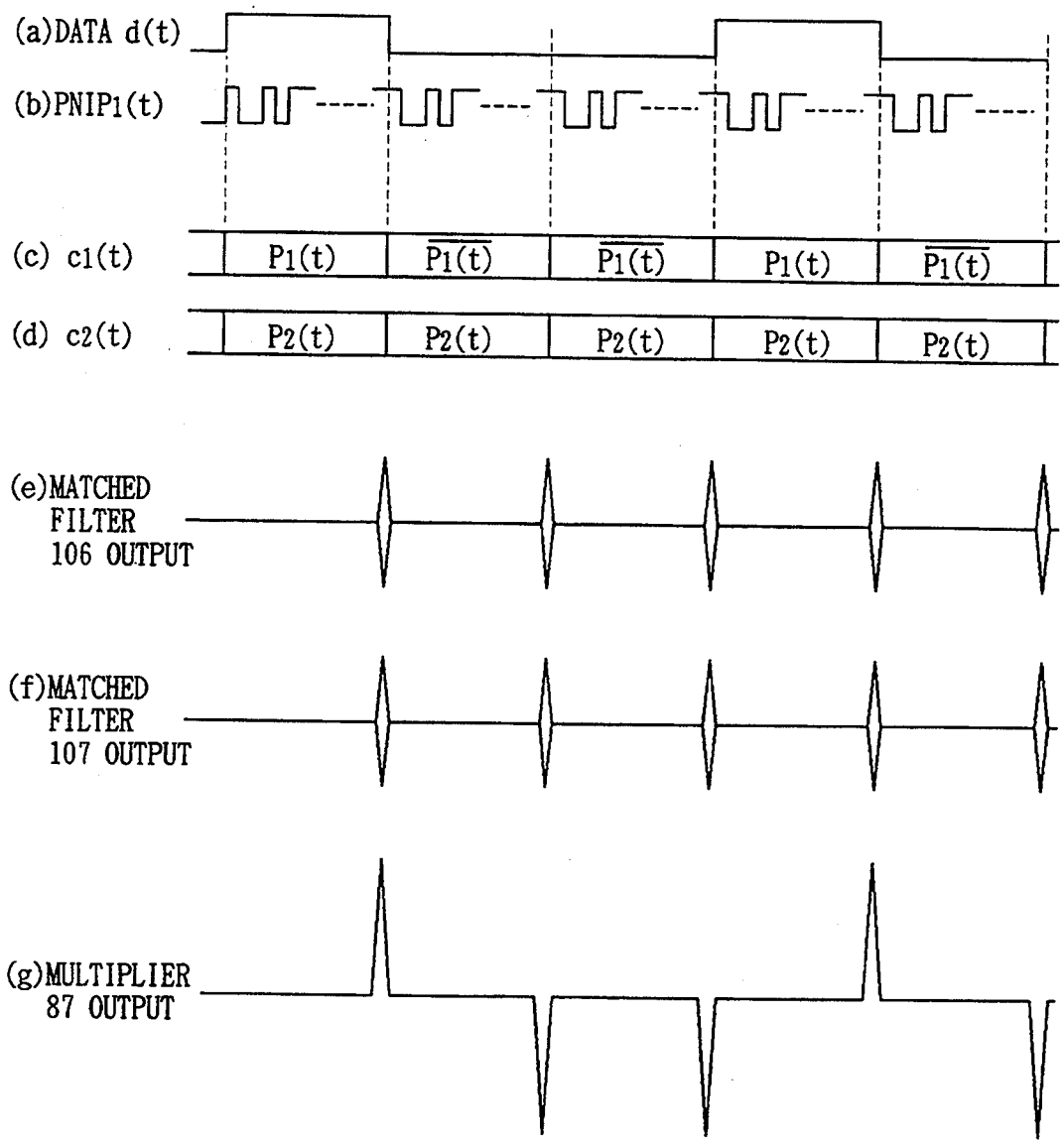
FIG. 22 shows principle of demodulation in the seventh embodiment.

FIG. 22 shows the principle of demodulation in the seventh embodiment. FIG. 22(a) represents data d(t), (b) represents PN code p$_1$(t), (c) represents output from BPSK modulating block 75, (d) represents an output from BPSK modulating block 76, (e) represents an output from matched filter 106 on the receiver side, (f) represents an output from matched filter 107, and (g) represents an output of multiplier 87. The time of propagation between the transmitter and the receiver is neglected. FIG. 22(e) is an output obtained in relation to d(t)·p$_1$(t)·cos ω$_i$t and the carrier component included in this triangular pulse is inverted or non-inverted dependent on the data d(t). Meanwhile, FIG. 22(f) represents an output obtained in relation to p$_2$(t)·cos ω$_i$t, and carrier component included in this triangular pulse is always non-inverting. Therefore, by multiplying these two outputs, the carrier component is removed, and a pulse on the positive side or on the negative side can be obtained depending on the data d(t) as shown in FIG. 22(g), which is passed through information demodulating block 91 to enable data demodulation.

Figure 23:
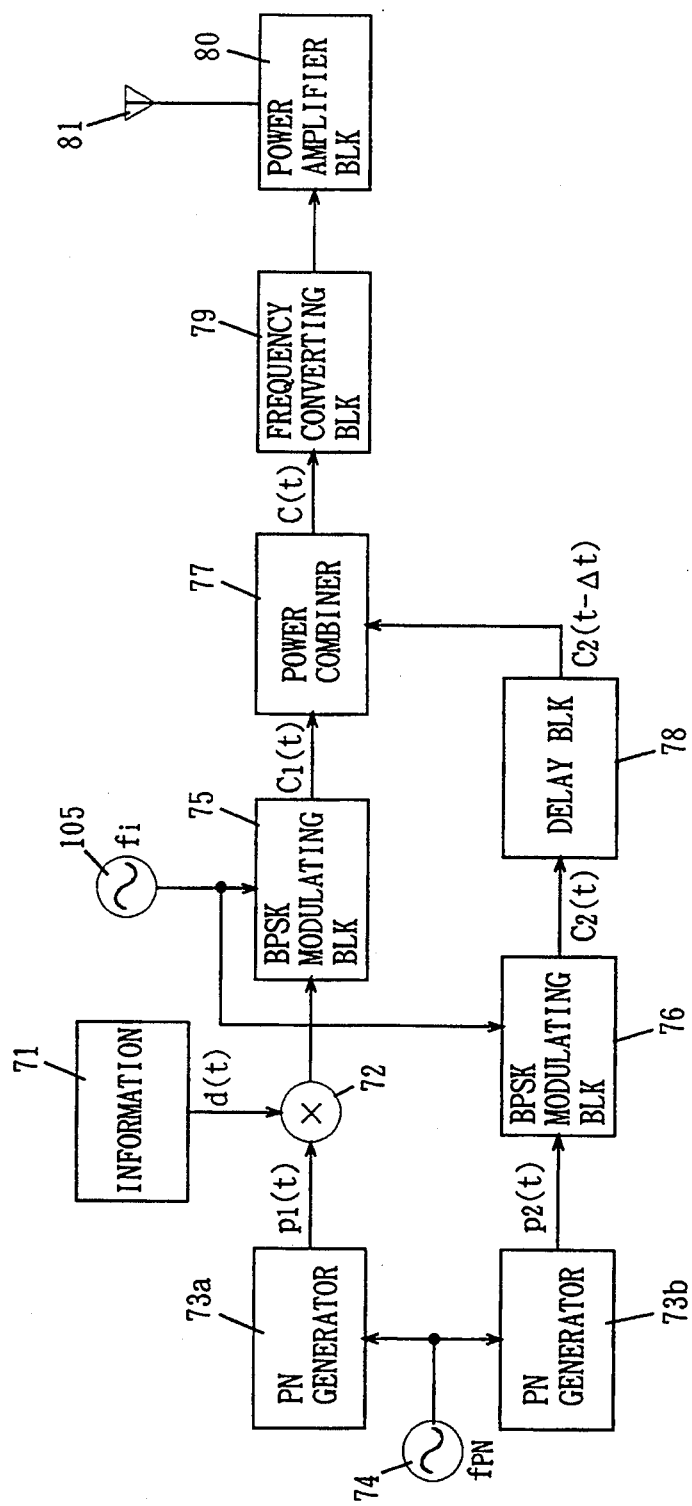
FIG. 23 is a schematic block diagram of a transmitter in accordance with the eighth embodiment of the present invention.
Figure 24:
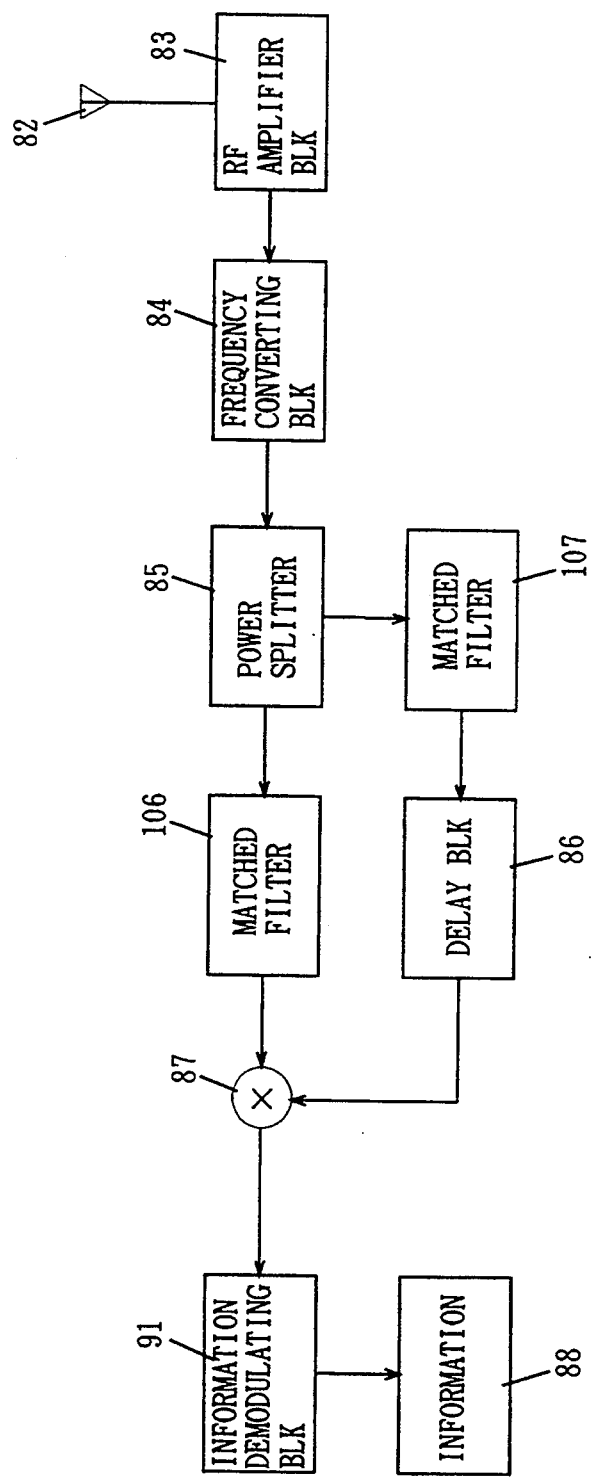
FIG. 24 is a schematic block diagram of a receiver in accordance with the eighth embodiment of the present invention.

FIGS. 23 and 24 are schematic block diagrams of the eighth embodiment of the present invention, in which FIG. 23 shows the transmitter side and FIG. 24 shows the receiver side. This embodiment differs from the seventh embodiment described above in that there is time difference between two signals transmitted.

The operations of PN generators 73a, 73b, multiplier 72 and of BPSK modulating blocks 75 and 76 in the transmitting system of FIG. 23 are the same as those shown in FIG. 20, and an output c$_2$(t) from BPSK modulating block 76 is delayed by Δt[sec.] (desired time period) by a delay block 78, and then input to power combiner 77. The delay block 78 may be a passive delay line formed by an LC or the like, or it may be a SAW element. However, in that case, it must be the one which transmits wide band signal of spread spectrum. If the BPSK demodulating block, the multiplier and the like can be implemented by digital circuitry, the delay may be provided digitally. The input at the power combiner, that is c$_2$(t-Δt) can be represented as $$c_2(t-\Delta t) = p_2(t-\Delta t) \cdot \cos \omega_i(t-\Delta t) \quad (22)$$

When we represent the output of the power combiner 77 as c(t), c(t) is represented as the sum of c$_1$(t) and c$_2$(tΔt), that is, $$c(t) = c_1(t) + c_2(t - \Delta t) \quad (23)$$
$$= d(t) \cdot p_1(t) \cdot \cos \omega_i t + p_2(t - \Delta t) \cdot \cos \omega_i(t - \Delta t)$$

Thereafter, c(t) is transmitted to the communication path in the similar manner as in the above described embodiment.

The receiving system will be described with reference to FIG. 24. Similar to the above described embodiment, the received signal which has its frequency converted to IF band (here IF is f$_i$ as in the transmitter side) is distributed to two paths by power splitter 85. One of the split signals is input directly to matched filter 106. The matched filter 106 has a structure corresponding to PN code P$_2$(t). Thereafter, an output from matched filter 106 is input to multiplier 87.

The other output of the power splitter is input to matched filter 107. The matched filter 107 has a structure corresponding to PN code P$_1$(t). The pulse-like output is passed through delay block 86 having the same amount of delay as the delay block 78 in the transmitter so as to be delayed by Δt, and then it is input to multiplier 87. The output from multiplier 87 is a positive or negative pulse with its carrier component removed, which is passed through information demodulating block 91 to obtain the information 88.

Figure 25:
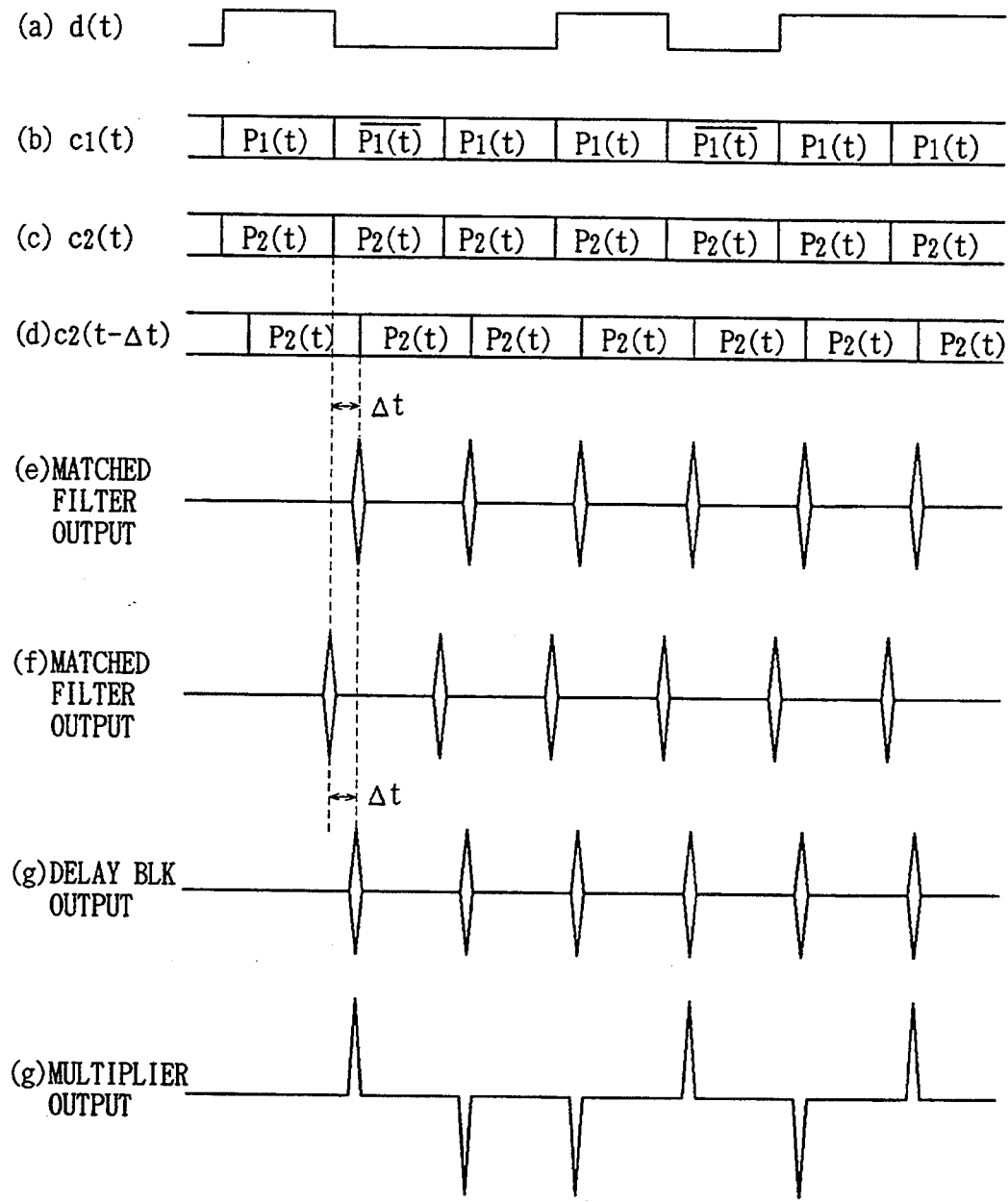
FIG. 25 shows the operation of demodulation in the receiver shown in FIG. 24.

FIG. 25 shows the demodulating operation in the receiving system of FIG. 24. It is assumed that there is no propagation delay time between the transmitter and the receiver. FIG. 25(a) represents data d(t), (b) represents outputs from BPSK demodulating block 75, (c) represents an output from BPSK demodulating block 76, (d) represents an output from delay block 78, (e) denote an output from matched filter 106, (f) represents an output from matched filter 107, (g) represents an output from delay block 86 and (h) represents an output from multiplier 87.

Since matched filter 106 has a structure corresponding to p$_2$(t), there is hardly no output of c$_1$(t) obtained from the combined signal of c$_1$(t) and c$_2$(t) received. Therefore, the pulse can be obtained at the timing synchronized with c$_2$(t-Δt) as shown in FIG. 25(e). Similarly, there is hardly any output related to c$_2$(t) obtained through matched filter 107. Therefore, the pulse can be obtained at the timing synchronized with c$_1$(t) as shown in FIG. 25(f). These two outputs are shifted by Δt as is apparent from FIG. 25. Therefore, output of matched filter 107 is passed through delay block 86 to provide a delay of Δt. Consequently, the two waves input to multiplier 87 are synchronized with each other, resulting in a pulse such as shown in FIG. 25(h) due to the difference in phase of the carrier component included therein, thereby enabling demodulation of information. On the receiver side, even when the matched filter 107 and the delay block 86 are replaced by each other, the same signals are input to multiplier 87, and therefore the same result as described above can be obtained.

Figure 26:
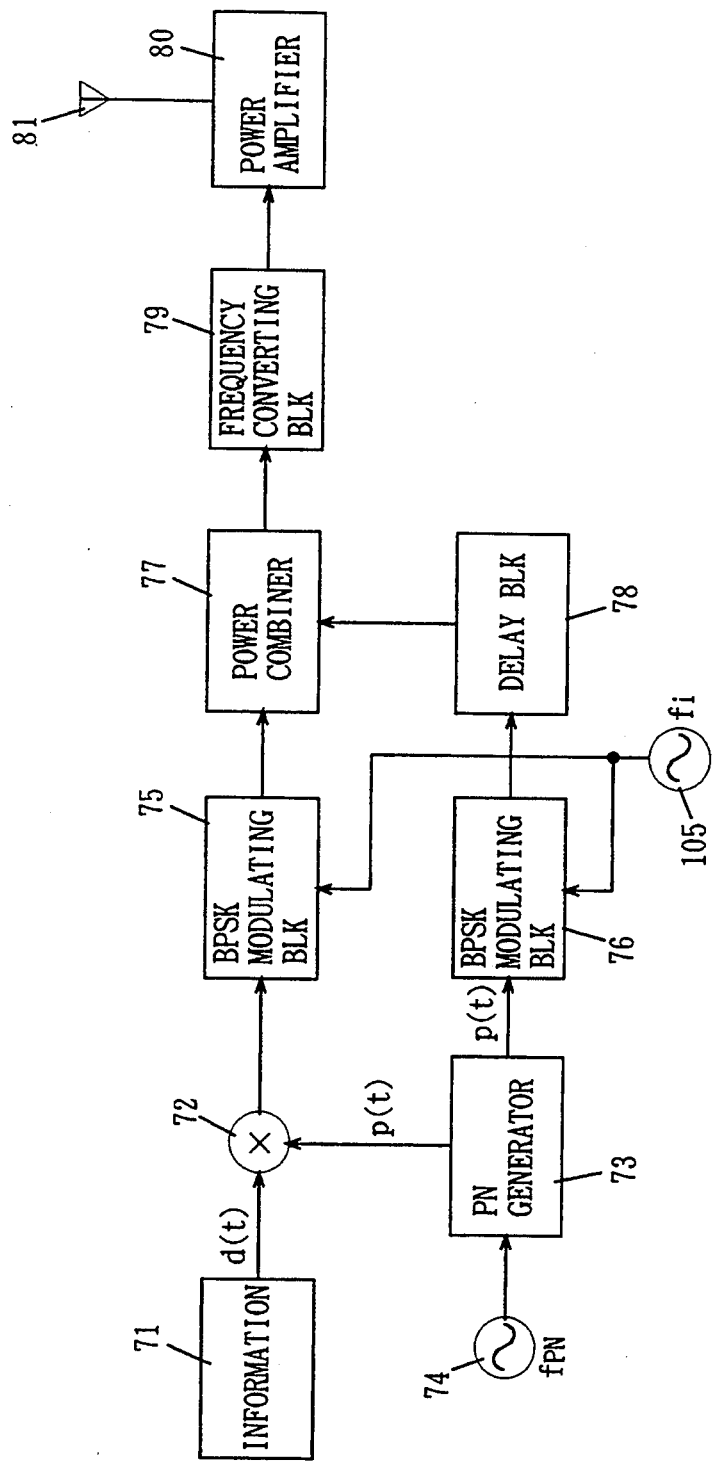
FIG. 26 is a schematic block diagram of a transmitter in accordance with the ninth embodiment of the present invention.
Figure 27:
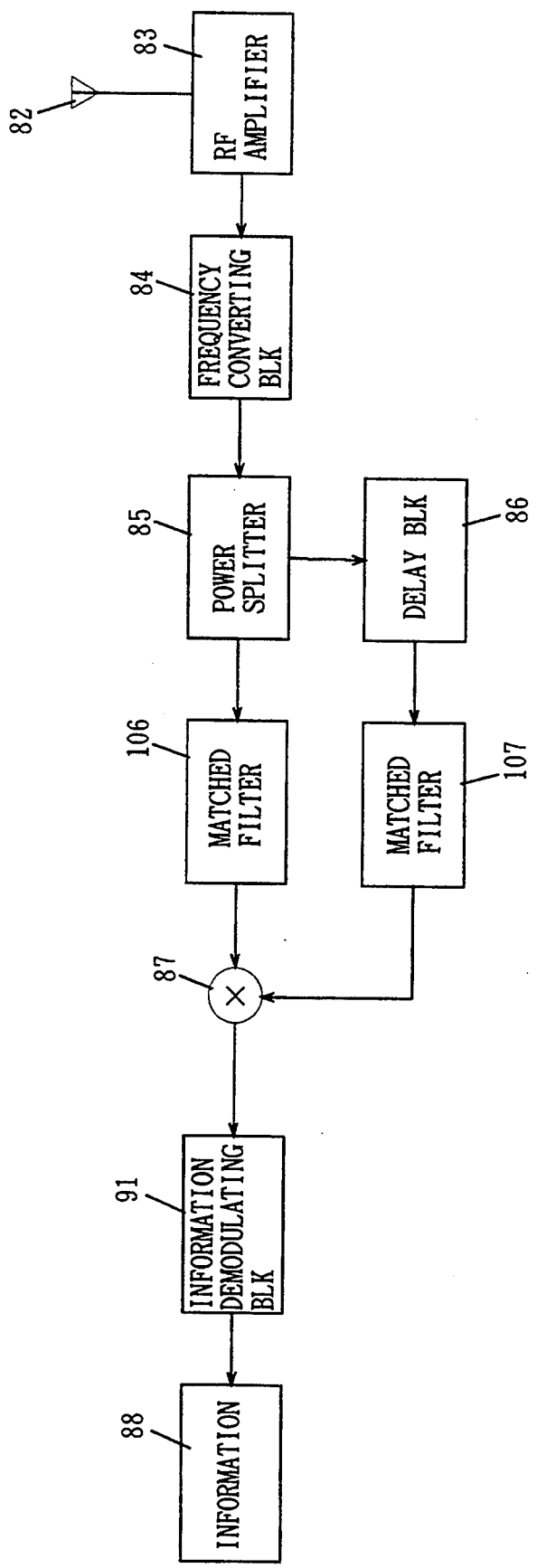
FIG. 27 is a schematic block diagram of a receiver in accordance with the ninth embodiment of the present invention.

FIGS. 26 and 27 are schematic block diagrams showing the ninth embodiment of the present invention in which FIG. 26 shows the transmitter side and FIG. 27 shows the receiver side. In this embodiment, the two signals transmitted share the PN code included therein.

The transmitter side will be described with reference to FIG. 26. The information (digital data which assumes either +1 or −1) is represented as d(t) as in the above described embodiment, which is multiplied by a PN code p(t) generated from PN generator 73 at multiplier 72. Assume that data rate is $f_d$[bits/sec.] and the chip rate of the PN code is $f_{PN}$[chips/sec.], then the spectrum band has come to be spread by $(f_{PN}/f_d)$ times, as in the above embodiment. Thereafter, it is subjected to BPSK modulation by using $f_i$ generated by reference oscillator 105 at BPSK modulating block 75, and then it is input to power combiner 77. Therefore, the signal $c_1(t)$ here can be represented as $$c_1(t) = d(t) \cdot p_1(t) \cdot \cos \omega_i t \qquad (24)$$

where $\omega_i$ represents angular frequency of the carrier wave $(\omega_i = 2\pi f_i)$.

The PN code generated by PN generator 73 is subjected to BPSK modulation by using $f_i$ at the BPSK modulating block 76 only by the PN code, without multiplication by data, through the other passage, delayed by $\Delta t$[sec.] (an arbitrary time longer than PN code 1 chip $(1/f_{PN})$[sec.]) at delay block 78 to be input to power combiner 77. The input $c_2(t)$ at the power combiner 77 can be represented as $$c_2(t) = p_1(t-\Delta t) \cdot \cos \omega_i(t-\Delta t) \qquad (25)$$

The two waves $c_1(t)$ and $c_2(t)$ are combined in power combiner 77. The output $c(t)$ from power combiner 77 is represented as $$\begin{aligned}c(t) &= c_1(t) + c_2(t) \\ &= d(t) \cdot p_1(t) \cdot \cos\omega_i t + p_1(t - \Delta t) \cdot \cos\omega_i(t - \Delta t)\end{aligned} \qquad (26)$$

This signal is converted in the similar manner as described above and transmitted to the transmission path.

On the receiver side, the received signal has its frequency converted to IF in the similar manner as described above, as shown in FIG. 27. Here IF is $f_i$ as in the transmitter side. Thereafter, it is split by power splitter 85 and one of the resulting two waves is directly input to matched filter 106. The matched filter 106 is structured to correspond to PN code $p_1(t)$. The output from matched filter 106 is input to multiplier 87.

The other output from power splitter 85 passes through delay block 86. Delay block 86 has the same delay amount $\Delta t$ as the delay block 78 on the transmitter side. The output from delay block 86 is input to matched filter 107. The matched filter 107 has the same structure as matched filter 106. Then, output from matched filter 107 is input to multiplier 87 to be multiplied by the output from matched filter 106 mentioned above.

Figure 28:
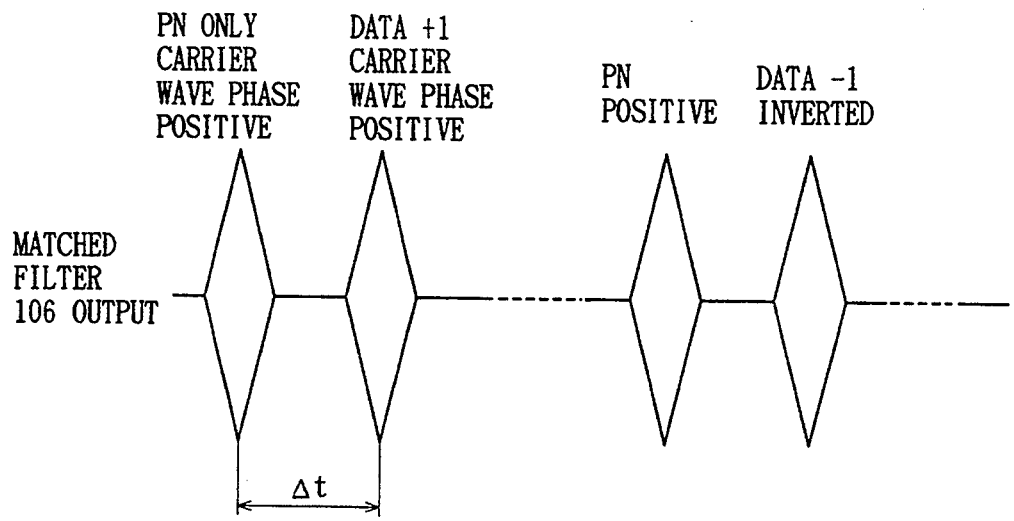
FIG. 28 is a diagram of output waveforms of a matched filter and a multiplier shown in FIG. 27.
Figure 28:
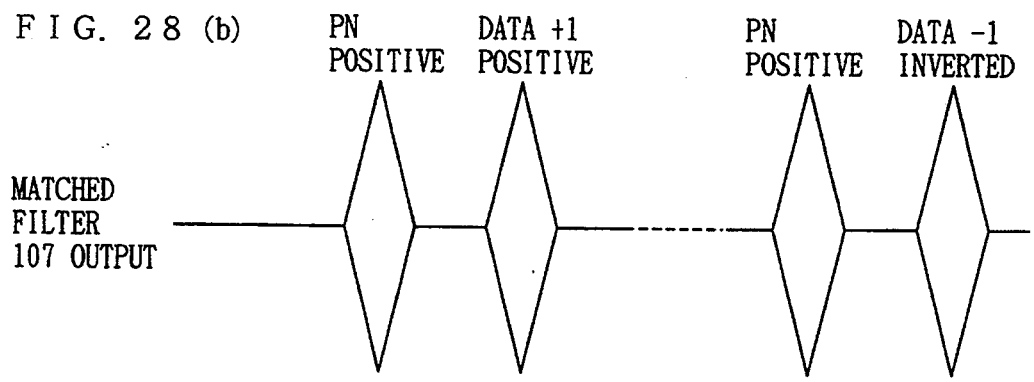
Figure 28:
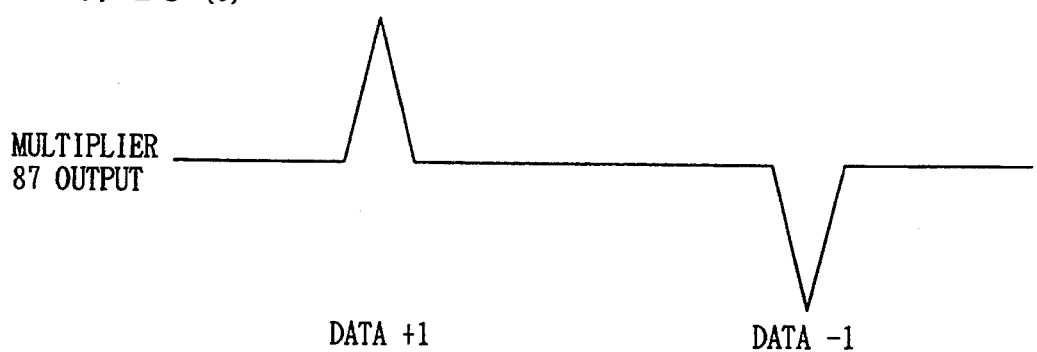

This process will be described with reference to FIG. 28. FIG. 28 (a) shows the output from matched filter, (b) shows the output from matched filter 107 and (c) shows the output from multiplier 87. As is apparent from FIG. 28, carrier wave component is removed by multiplication of the triangular pulse including data of the output from matched filter 106 and the triangular pulse including data of the output from matched filter 106 and the triangular pulse not including data of the output from matched filter 107, and a pulse wave is output on the positive side if data is $+1$, while the pulse is output on the negative side when data is $-1$. Other components are not output at all. The pulse width is demodulated for data discrimination in information demodulating block 91 and thus information 88 can be obtained.

The signal input to multiplier 87 is not changed even when delay block 86 and matched filter 107 are replaced by each other, and therefore the same result as described above can be obtained.

Figure 29:
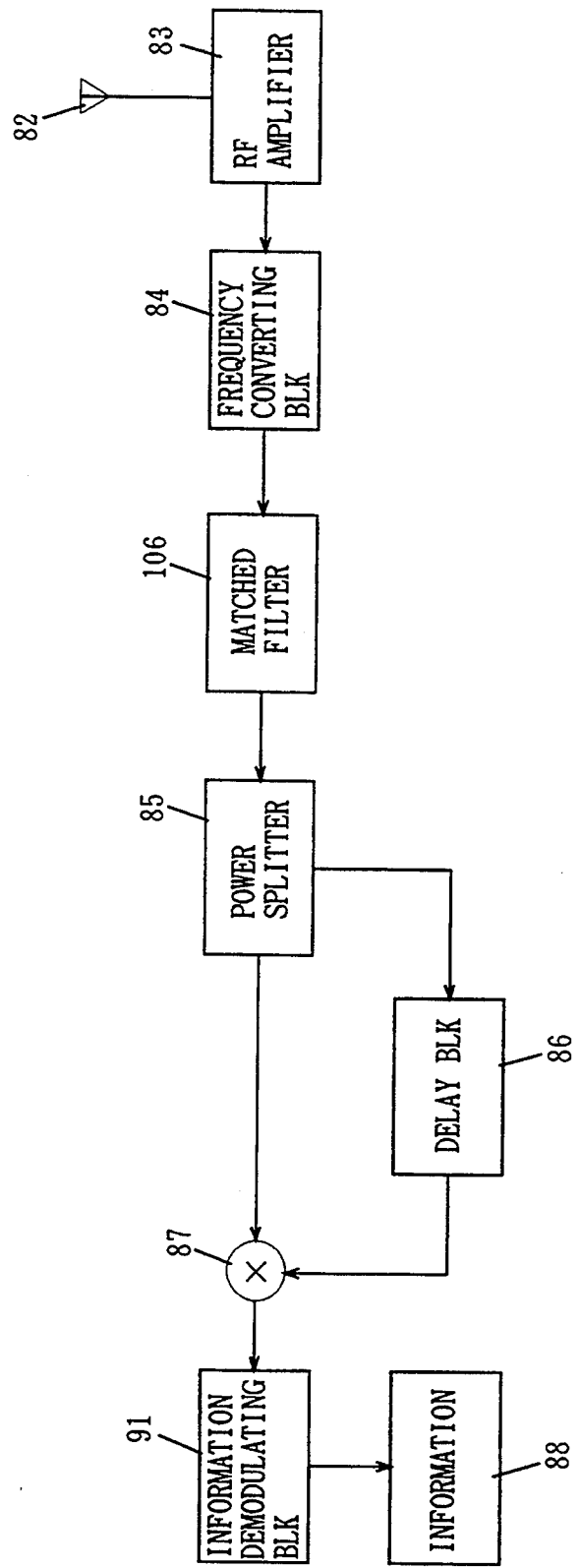
FIG. 29 is a schematic block diagram of a receiver in accordance with the tenth embodiment of the present invention.

FIG. 29 is a schematic block diagram of the receiver side of a tenth embodiment in accordance with the present invention. The transmitter has the same structure as that in the ninth embodiment. Various portions constituting the receiver system are implemented by the same structure as the above described embodiment. The difference over the ninth embodiment is that the signal is passed through the matched filter 106 before power splitting.

Now, the received signal has its frequency converted to IF band in the similar manner as in the ninth embodiment. Thereafter, the signal is passed through matched filter 106 and split by power splitter 85. One of the split signal is directly applied to multiplier 87, and the other one passes through delay block 86 having the same amount of delay as the delay block 78 on the transmitter side, and then input to multiplier 87. The two signals input to multiplier 87 are the same as the two signals input to multiplier 87 on the receiver side in the ninth embodiment. Therefore, as in the ninth embodiment, demodulation of information can be done by information demodulating block 91.

By this structure, the number of matched filters can be reduced by one, and therefore the cost and the size of the circuitry can be reduced.

In the eighth, ninth and tenth embodiments, of the two waves generated from the transmitter side, the signal not including data is delayed. However, as can be understood from the process of demodulation, the same result can be obtained when the signal including data is delayed.

In each of the embodiments, the multiplier output can not be obtained unless the delay time is the same in the transmitter and receiver sides. If the delay time is different (especially when it is different by more than 1 chip), the timings of outputs from both matched filters do not match. Therefore, it is apparent that multiple accesses are possible when delay time is made different.

Figure 30:
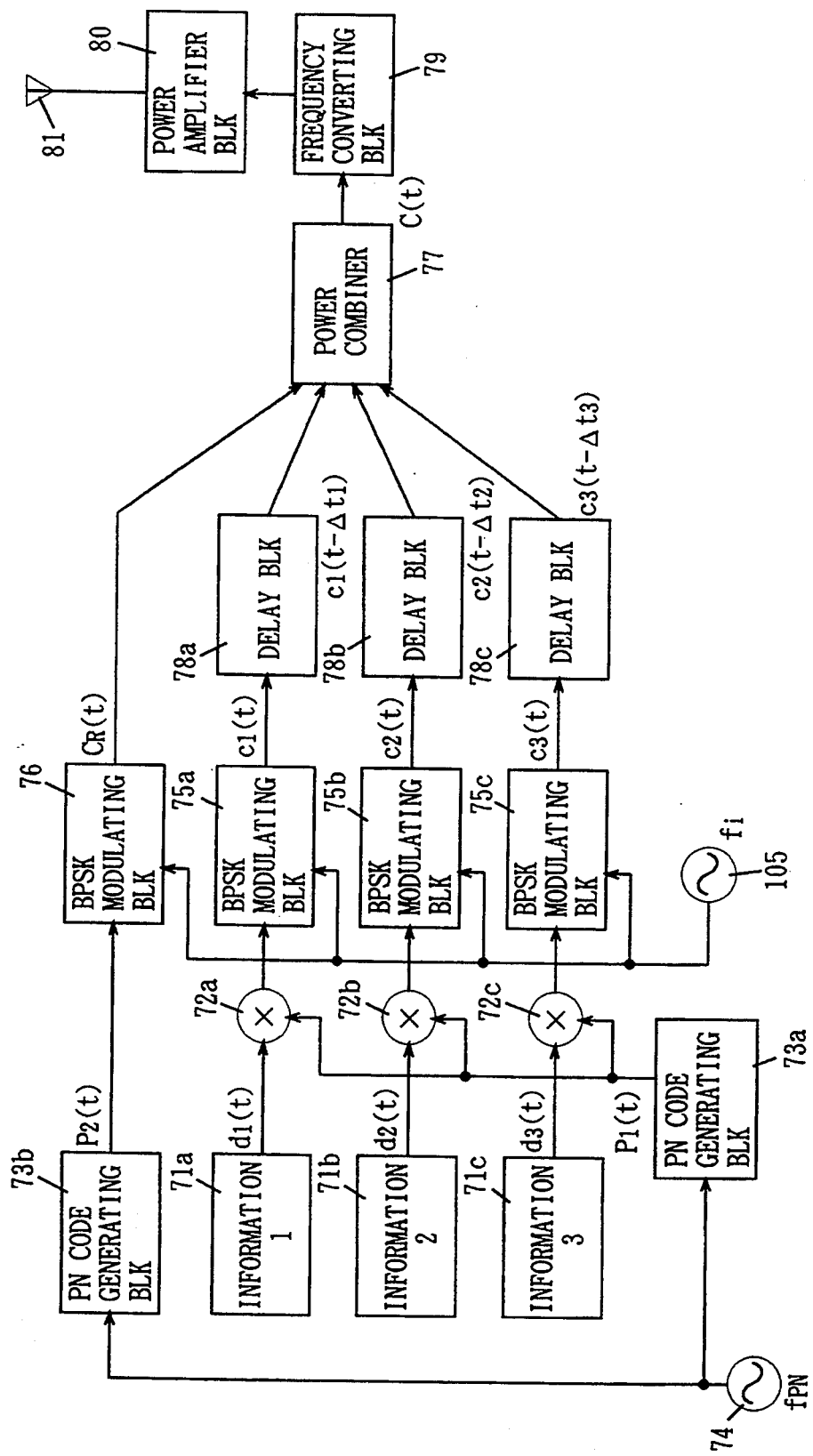
FIG. 30 is a schematic block diagram of a transmitter in accordance with the eleventh embodiment of the present invention.
Figure 31:
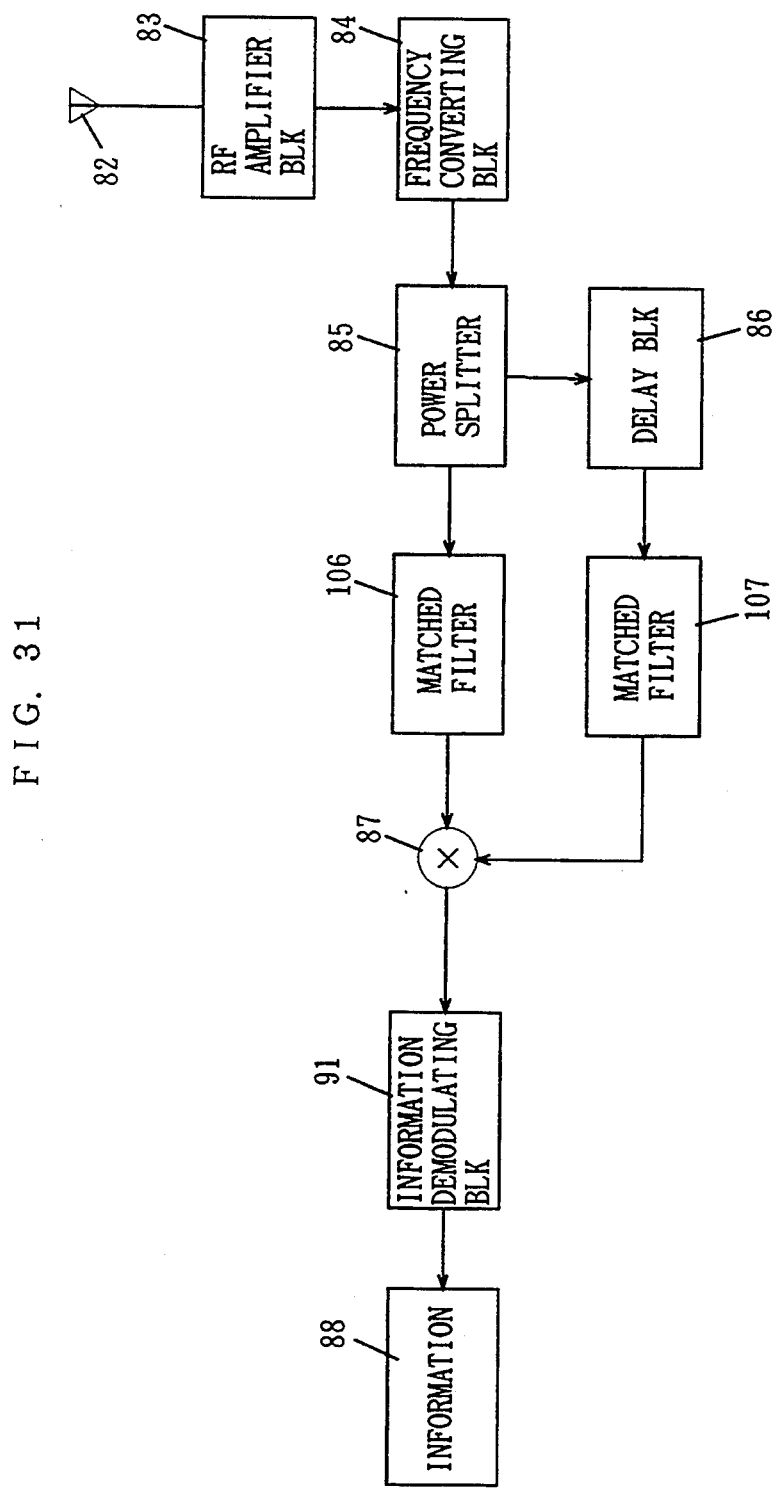
FIG. 31 is a schematic block diagram of a receiver in accordance with the eleventh embodiment of the present invention.

FIGS. 30 and 31 are schematic block diagrams of the eleventh embodiment of the present invention in which multiple communication is done. Here, the PN code $p_1(t)$ is used and delay time is made different so that three channel multiplexing is enabled, and PN code $p_2(t)$ is not multiplied by data but transmitted as a reference signal. FIG. 30 shows the transmitter side and FIG. 31 shows the receiver side.

Referring to FIG. 30, the structure and operation of the transmitter side will be described. Pieces of information 71a, 71b and 71c represent data of three channels to be multiplexed (each being digital data assuming either $+1$ or $-1$), which will be referred to as $d_1(t)$, $d_2(t)$ and $d_3(t)$. These are multiplied by PN code $p_1(t)$ generated by PN generator 73a at multipliers 72a, 72b and 72c, respectively. Thereafter, they are subjected to BPSK modulation at BPSK modulating blocks 75a, 75b, and 75c by using the carrier wave $f_i$ generated by reference oscillator 105, respectively. The signals $c_1(t)$, $c_2(t)$ and $c_3(t)$ obtained here are represented as $$c_1(t) = d_1(t) \cdot p_1(t) \cdot \cos \omega_i t$$

$$c_2(t) = d_2(t) \cdot p_1(t) \cdot \cos \omega_i t$$

$$c_3(t) = d_3(t) \cdot p_1(t) \cdot \cos \omega_i t \qquad (27)$$

Thereafter, $c_1(t)$ is delayed by $\Delta t_1$ by delay block 78a, $c_2(t)$ is delayed by $\Delta t_2$ by delay block 78b, and $c_3(t)$ is delayed by $\Delta t_3$ by delay block 78c, and these are input to power combiner 77, where it is assumed that the delay times $\Delta t_1$, $\Delta t_2$ and $\Delta t_3$ satisfy the following relation.

$$|\Delta t_1 - \Delta t_2| \geq T_C$$

$$|\Delta t_1 - \Delta t_3| \geq T_C$$

$$|\Delta t_2 - \Delta t_3| \geq T_C \quad (28)$$

where $t_C$ represents time per 1 chip of the PN code, that is, $$t_c = 1/f_{PN}$$

This condition must be satisfied since the time width of the correlated output pulse of the matched filter is $\pm(1/f_{PN}) = \pm T_C[\text{sec.}]$ with the peak value being the center and if the difference between the delay time becomes smaller than $T_C$, the peak of correlation may be overlapped with the correlated output from other circuits to be off-set. As for the PN code $p_2(t)$ generated from PN generator 73b, it is not multiplied by data, but subjected to BPSK modulation by using the carrier wave $f_i$ generated by reference oscillator 105 at BPSK modulating block 76. The PN code $p_2(t)$ has been generated by using the same block as $p_1(t)$, and therefore it is assumed that this code is completely synchronized. Further, it is assumed that the carrier wave used for BPSK modulation is not at all deviated in phase from that used for the signals $c_1(t)$, $c_2(t)$ and $c_3(t)$. Therefore, the output signal $c_R(t)$ from BPSK modulating block 76 can be represented as $$c_R(t) = p_2(t) \cdot \cos \omega_i t \quad (29)$$

This signal is directly input to power combiner 77. Therefore, the output $c(t)$ from power combiner 77 can be represented as $$\begin{aligned} c(t) &= c_1(t - \Delta t_1) + c_2(t - \Delta t_2) + c_3(t - \Delta t_3) + \\ & \quad c_R(t) \\ &= d_1(t - \Delta t_1) \cdot p_2(t - \Delta t_1) \cdot \cos\omega_i(t - \Delta t_1) + \\ & \quad d_2(t - \Delta t_2) \cdot p_1(t - \Delta t_2) \cdot \cos\omega_i(t - \Delta t_2) + \\ & \quad d_3(t - \Delta t_3) \cdot p_1(t - \Delta t_3) \cdot \cos\omega_i(t - \Delta t_3) + \\ & \quad p_2(t) \cdot \cos\omega_i t \end{aligned} \quad (30)$$

This signal is converted in the similar manner as in the above described embodiments and transmitted to the communication path.

The receiver side will be described with reference to FIG. 31. In this case also, the signal has its frequency converted to IF band in the similar manner as described in the above embodiments. Here, IF is assumed to be the same $f_i$ as in the transmitter side. Thereafter, it is split to two paths by power splitter 85, one of the split signals is directly input to matched filter 106. The matched filter 106 has a structure corresponding to PN code $p_1(t)$. The output from matched filter 106 is directly input to multiplier 87. The other one of the split signals passes through delay block 86. As for the delay block 86, when the receiver is to demodulate data $d_1(t)$, it is delayed by $\Delta t_1$, when $d_2(t)$ is to be demodulated, it is delayed by and when $d_3(t)$ is to be demodulated, it is delayed by $\Delta t_3$. Assume that $d_1(t)$ is to be demodulated here. In this case, delay block 86 has the same amount of delay as the delay blocks 78a to 78c on the transmitter side. After such a delay is provided, the signal is input to matched filter 107. Matched filter 107 has a structure corresponding to PN code $p_2(t)$. The Output from matched filter 107 is directly input to multiplier 87. The result of multiplication will be a negative or positive pulse signal as in the above described embodiments. Therefore, by checking the pulse by information demodulating block 91, information 88 can be obtained.

Figure 32:
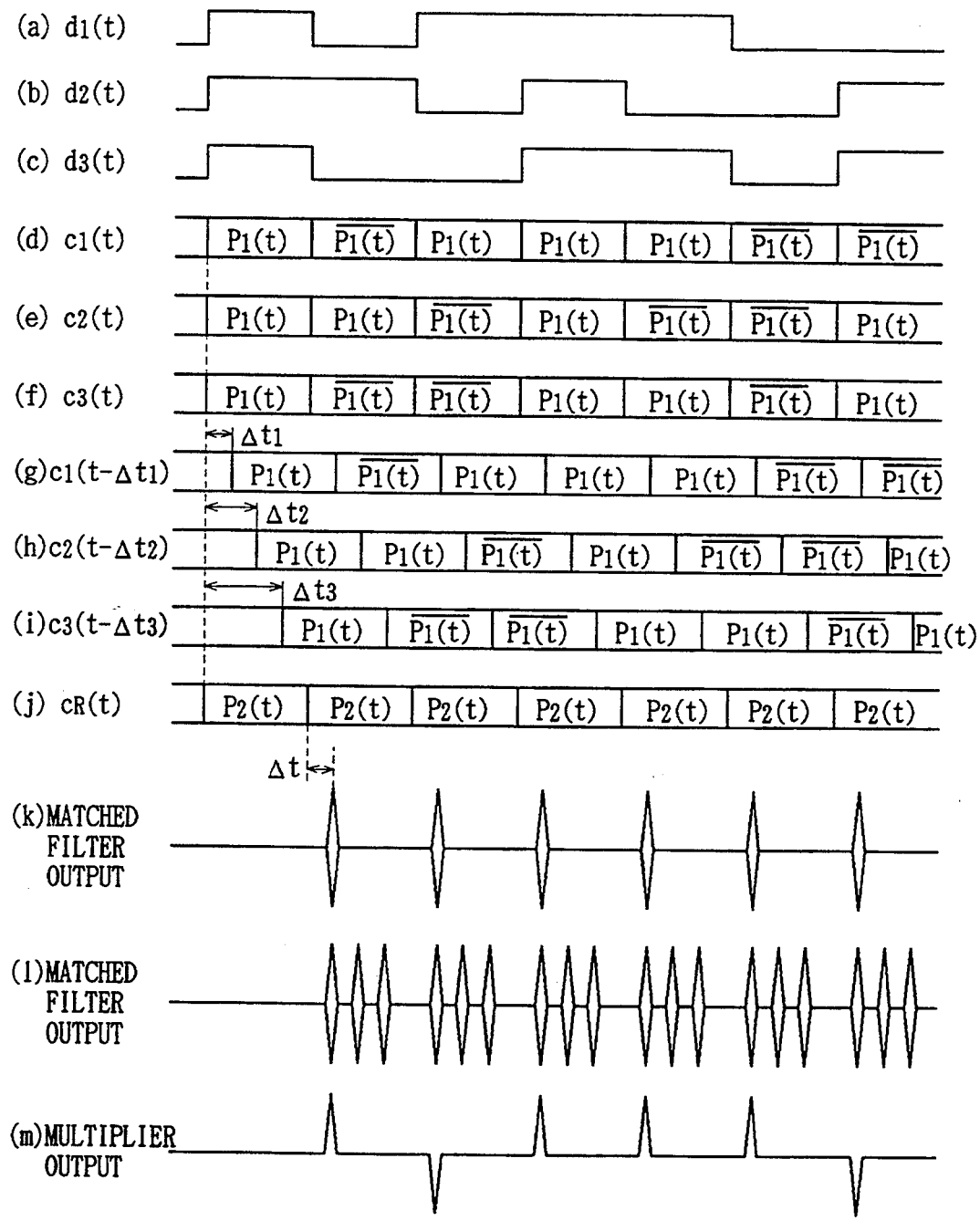
FIG. 32 is a time waveform diagram in the process of demodulation of the receiver shown in FIG. 31.

FIG. 32 shows the process of demodulation in the receiver side of FIG. 31 in the form of waveforms on the time basis. It is assumed that the receiver demodulates signal $d_1(t)$. In the figure, (a) represents data $d_1(1)$, (b) represents data $d_2(t)$, (c) represents data $d_3(t)$, (d) represents an output from BPSK modulating block 75a, (e) represents output from BPSK modulating block 75b, (f) represents an output from BPSK modulating block 75c, (g) represents output from delay block 78a, (h) represents an output from delay block 78b, (i) represents an output from delay block 78c, (j) represents an output from BPSK modulating block 76, (k) represents an output from matched filter 106, (l) represents an output from matched filter 107, and (m) represents an output from multiplier 87. As is apparent from these waveforms, what is obtained from the output (k) of matched filter 106 is only the output derived from PN code $p_2(t)$ used for reference. By making the output timing thereof matched with the output timing of data to be demodulated of output (l) of matched filter 107, the pulse of FIG. 32(m) can be obtained.

Figure 33:
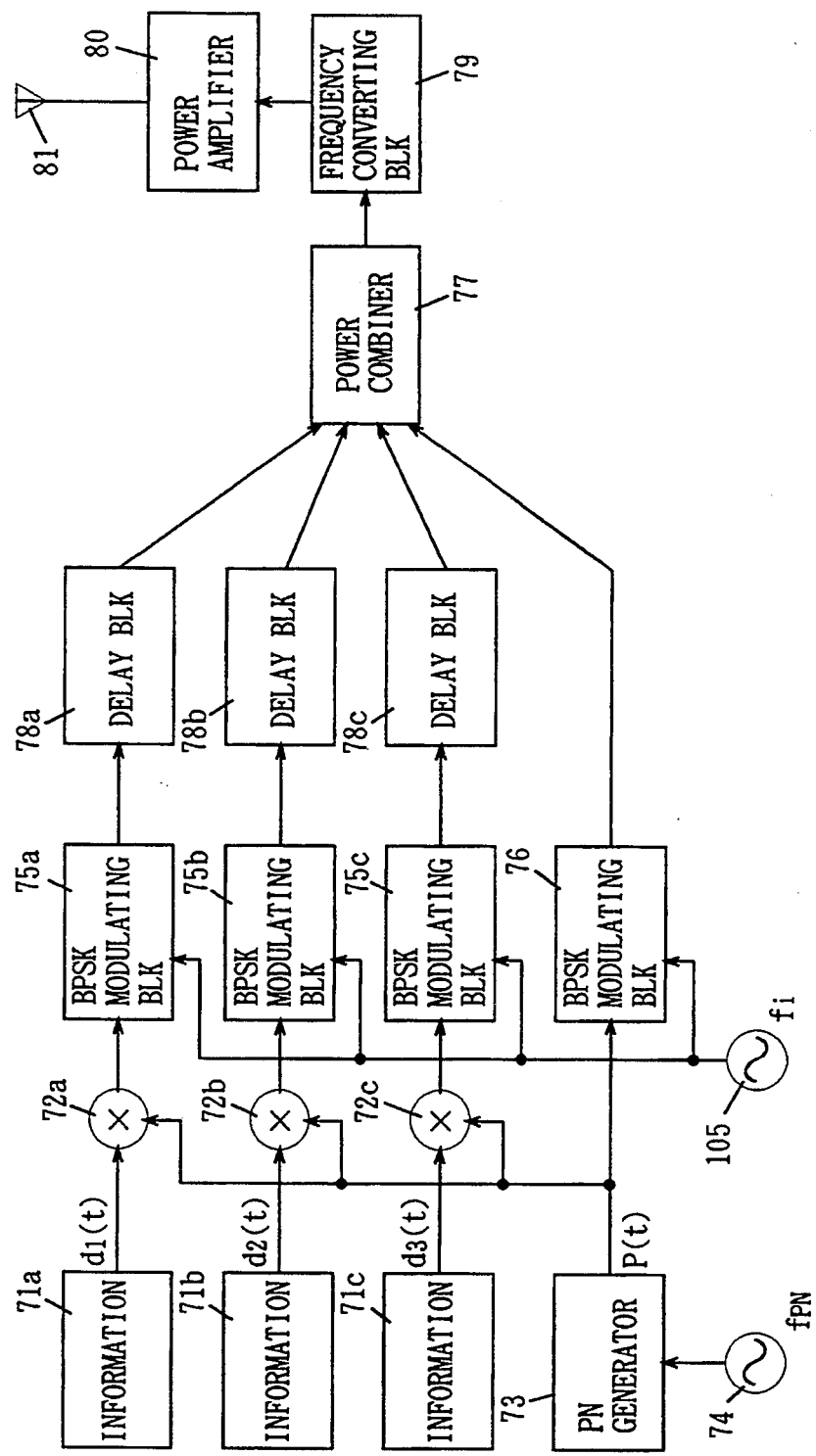
FIG. 33 is a schematic block diagram of a transmitter in accordance with the twelfth embodiment of the present invention.

FIG. 33 is a block diagram of the transmitter in accordance with the twelfth embodiment. In this embodiment also, three channel multiplexing is done simultaneously. The difference over the eleventh embodiment is that four waves including the reference signal employ the same PN code.

The structure and operation of the transmitter system will be described with reference to FIG. 33. The PN code $p_1(t)$ generated by PN generator 73 driven by clocks from reference clock generator 74 is subjected to BPSK modulation at BPSK modulating block 76 and input to power combiner 77. In another path, the PN code $p_1(t)$ is multiplied by data $d_1(t)$ of the circuit 1 at multiplier 72a, subjected to BPSK modulation by BPSK modulating block 75a, delayed by $\Delta t_1$ by delay block 78a, and then it is input to power combiner 77. Similarly, $d_2(t)$ and $d_3(t)$ are multiplied by the PN code $p_1(t)$ at multipliers 72b and 72c, and subjected to BPSK modulation by BPSK modulating blocks 75b and 75c, respectively. Thereafter, they are delayed by $\Delta t_2$ and $\Delta t_3$, respectively, to be input to power combiner 77. Therefore, the output $c(t)$ of the power combiner, that is the sum of the four waves, can be represented as $$\begin{aligned} c(t) &= p_1(t) \cdot \cos\omega_i t \\ &= d_1(t - \Delta t_1) \cdot p_1(t - \Delta t_1) \cdot \cos\omega_i(t - \Delta t_1) + \\ & \quad d_2(t - \Delta t_2) \cdot p_1(t - \Delta t_2) \cdot \cos\omega_i(t - \Delta t_2) + \\ & \quad d_3(t - \Delta t_3) \cdot p_1(t - \Delta t_3) \cdot \cos\omega_i(t - \Delta t_3) \end{aligned} \quad (31)$$

Figure 34:
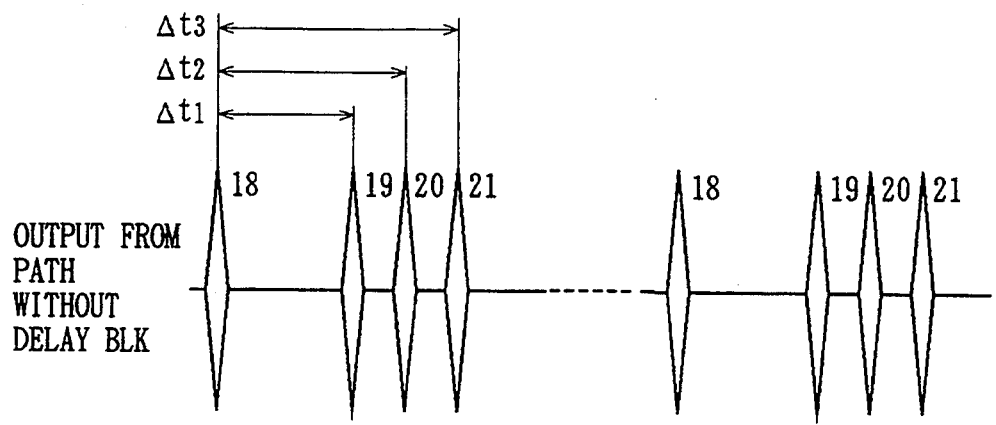
FIG. 34 is a diagram of output waveform of a receiver in accordance with the twelfth embodiment of the present invention.
Figure 34:
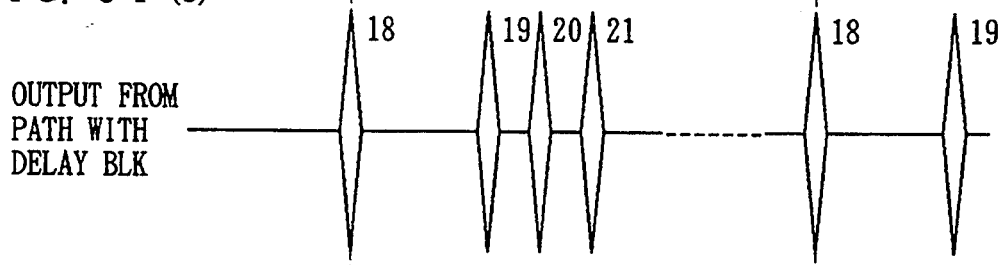
Figure 34:
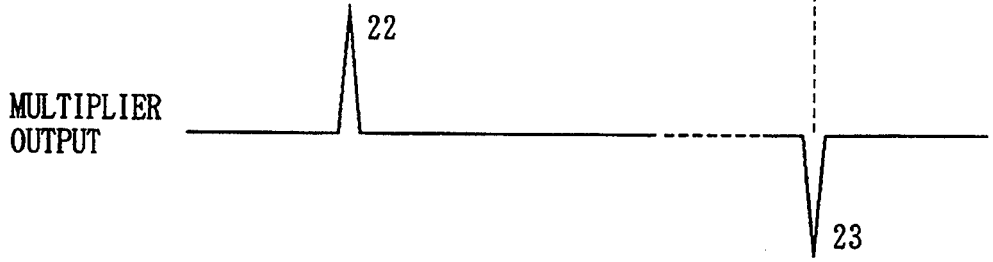

FIG. 34 shows examples of output waveforms when the signal is received by the receiver. The receiver has the same structure as that of the ninth embodiment above. FIG. 34 (a) represents the input of multiplier which is not delayed on the receiver side, (b) shows input of multiplier which has passed through the delay block (providing a delay of $\Delta(t)$) of the receiver side of channel 1, and (c) shows the output of multiplier of the receiver of the channel 1. In FIG. 34, 18 denotes the output of the matched filter of the signal not including data, 19 denotes the signal including data ($d_1(t)$) of the channel 1, 20 denotes the signal including data ($d_2(t)$) of the channel 2, 21 denotes the output of the matched filter of the signal including data ($d_3(t)$) of the channel 3, and 22 denotes the pulse representing the data of the channel 1. As is apparent from FIG. 34, the receiver is to receive $d_1(t)$ and the amount of delay at the delay block in the receiver is $\Delta_1$, and therefore (b) is delayed by $\Delta t_1$ from (a). As can be seen from the figure, the output 18 from the matched filter can be synchronized with the signal 19. However, other outputs have their timings not matching. Therefore, demodulation of data is possible as shown in FIG. 34(c). By appropriately allotting the delay time to respective circuits, multiple accessing can be enabled, utilizing the delay time for discrimination. Since matched filter is used, correlated output can not be obtained even if the delay time is the same when the PN code is different. Therefore, conventional code division multiple access is also possible.

As can be understood from the comparison between the inputs of multipliers shown in FIGS. 32 and 34, when the method of the twelfth embodiment is used, there are provided a number of correlated outputs for both inputs, and therefore there is a limit of setting the delay time for respective channels. However, as compared with the eleventh embodiment similar result can be obtained by the receiver having the same structure as the tenth embodiment, and therefore the number of matched filters can be reduced, and in addition the number of PN codes allotted to one channel can be made smaller.

Figure 35:
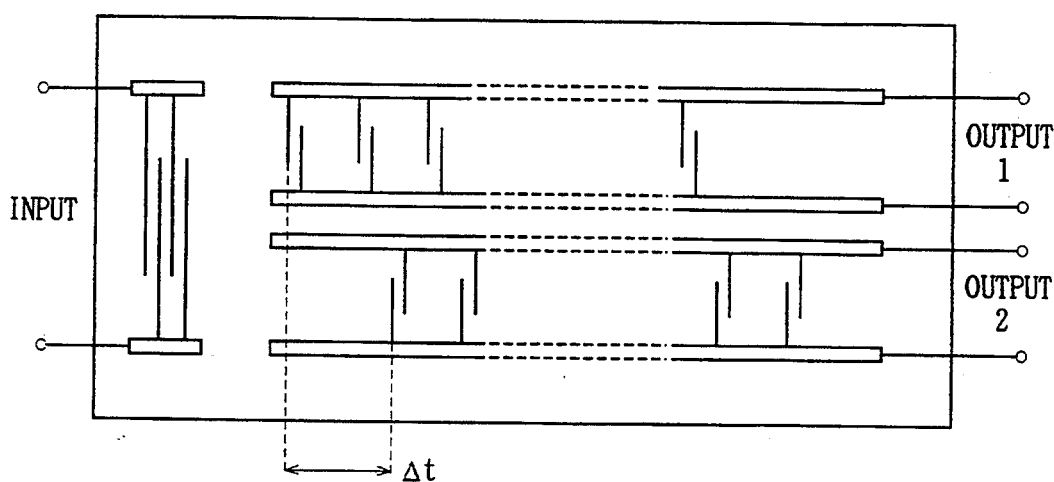
FIG. 35 shows an example of a matched filter employing a SAW element.
Figure 36:
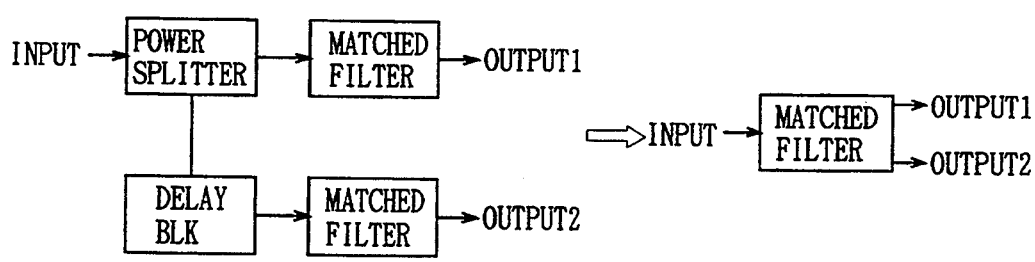
FIG. 36 shows the operation of the matched filter shown in FIG. 35.

FIG. 35 shows a manner of forming a matched filter employing a SAW element, and FIG. 36 shows the operation of the matched filter.

Referring to FIG. 35, the upper side of the output side corresponds to the first PN code, and the lower side corresponds to the second PN code. Here, there is a time difference of $\Delta t$ between the output of the upper and lower sides. This is because the delay block, such as used in the eighth and eleventh embodiments in which the delay block is provided in the receiver, is incorporated in the matched filter. Therefore, if this matched filter is to be used in the tenth embodiment, the value of $\Delta t$ should be set to 0.

When such a SAW matched filter structured as described above is employed, the correlated output of the first PN code with respect to the input signal and the correlated output for the second PN code are obtained, which may be directly input to the multiplier. Namely, functionally, the power splitter, two matched filters and the delay block can be simultaneously implemented as shown in FIG. 35, which realizes significant reduction in size of the receiver.

When not two different PN codes but only one PN code is used for transmission from the transmitter side (such as in the ninth embodiment), the PN code at the upper and lower sides of FIG. 35 should be made identical. By doing so, the structure of FIG. 35 can be applied to the ninth, tenth and eleventh embodiments.

Even when other PN code is input, an output corresponding to the value of cross correlation can be obtained by the cross correlation of the matched filter. Consequently, S/N ratio (signal to noise ratio) and the error rate are degraded. Generally, the cross correlation value $n_C(t)$ can be represented as $$n_C(t) = \int p_2(t) \cdot p_1(t-\Delta t) dt \tag{32}$$

where $p_1(t)$ and $p_2(t)$ represent the first and second PN codes.

As is apparent from the above equation, the cross correlation value is not constant but changes dependent on the amount of deviation ($\Delta t$) of the two PN codes. Therefore, by setting the value $\Delta t$ for power combining such that in the two signals generated on the transmitter side, the first and second PN codes cross with each other orthogonally (to have the cross correlation value of 0) (in the case of multiple accessing such as in the eleventh embodiment, each of the first PN codes crosses the second PN code orthogonally), the S/N can be improved and the number of channels for multiple accessing can be increased. When only one type of PN code is used on the transmitter side, the self correlation value $n_A(t)$ in which $p_2(t) \cdot p_1(t-\Delta t)$ in the aforementioned $n_C(t)$ replaced by $p_1(t) \cdot p_1(t-\Delta t)$ becomes significant. When M sequence (maximum-length sequence) is used as the PN code and when $|\Delta t| \geq T_C$, the self correlation value $n_A(t)$ will be all 1/L (L[chips]: code length), and therefore, it raises no problem when $L > 1$.

Further, by providing a time window, which passes only the timing at which pulse is generated, in the information demodulating block 91 by utilizing, for example, a data clock recovered by the pulse-like multiplier output, the quality of communication can be further improved.

As described above, according to the seventh to twelfth embodiment, it is not necessary to form a feedback loop at the time of correlation and at the time of removing carrier wave, whereby demodulation of information can be easily done at a moment.

Figure 37:
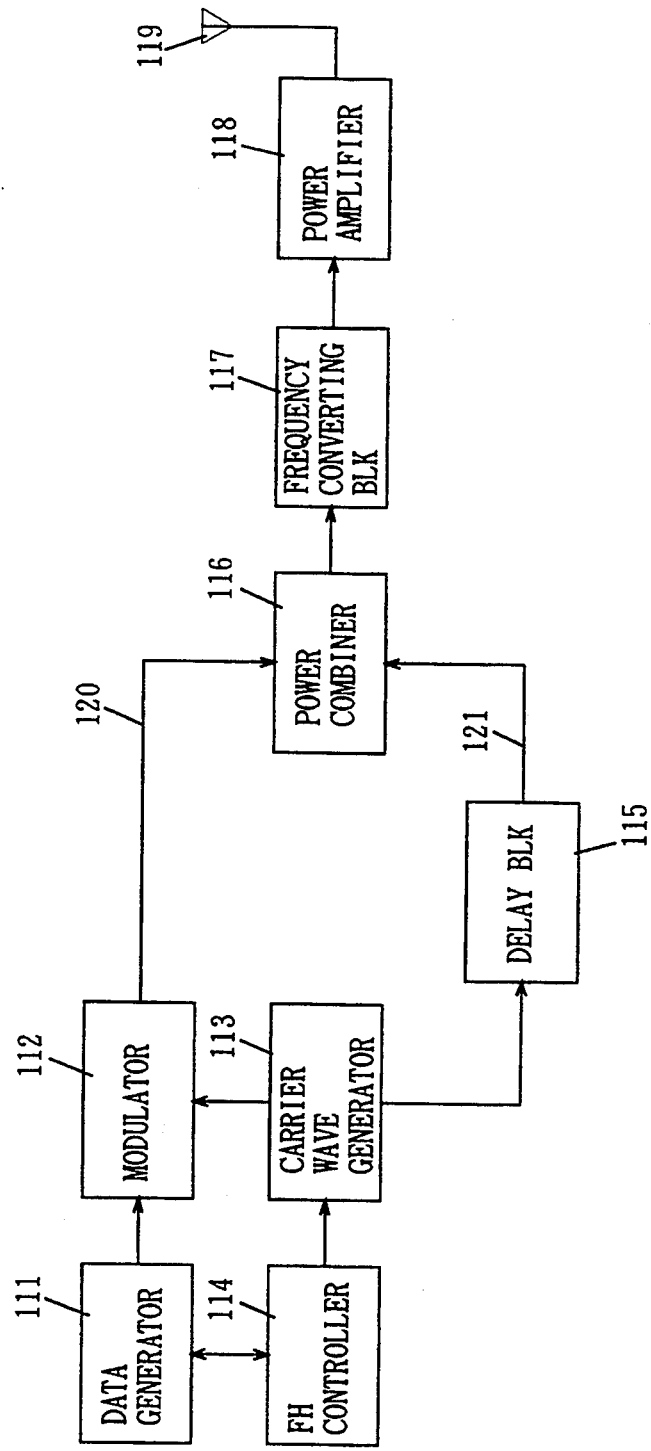
FIG. 37 is a schematic block diagram of a transmitter in accordance with the thirteenth embodiment of the present invention.
Figure 38:
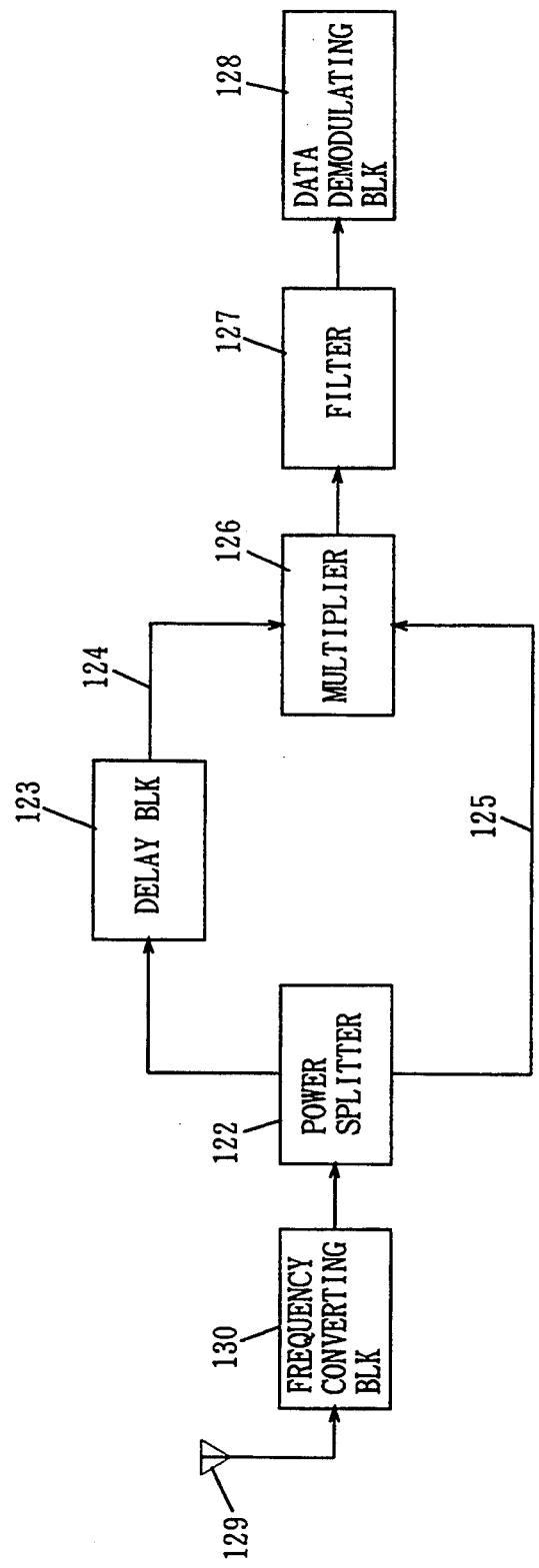
FIG. 38 is a schematic block diagram of a receiver in accordance with the thirteenth embodiment of the present invention.

FIGS. 37 and 38 are block diagrams of the thirteenth embodiment of the present invention in which FIG. 37 shows the transmitter side and FIG. 38 shows the receiver side. Referring to FIG. 37, data generating block 111 generates data having interleave or error correction code added. The data is applied to modulator 112. Modulator 112 modulates carrier wave generated from a carrier wave generator 113 by the data. Here it is assumed that the carrier wave is subjected to BPSK modulation (phase modulation). Carrier wave generator 113 has its frequency changed at every prescribed data bits under the control of a FH (Frequency Hopping) controller 114. The frequency is changed in accordance with the number of slots prepared in advance, and changes in a predetermined pattern by using a PN code.

The carrier wave is also input to a delay element 115 in which it is delayed by the delay time z, and thereafter, by a power combiner 116, a modulated signal 120 which is an output from modulator 112 and the nonmodulated signal 121 which has been delayed are combined. The output from power combiner 116 is converted to a high frequency signal by a high frequency converting block 117, amplified by power amplifier block 118 and transmitted from antenna 119.

In the receiver shown in FIG. 38, the signal input from antenna 129 has its frequency converted to the intermediate frequency band by frequency converting block 130. The intermediate frequency signal is distributed by power splitter 122, one of which is delayed by delay element 123, and this delayed signal 124 and the signal which is not delayed are multiplied by a multiplier 126, only the necessary band of which is taken out by a filter 127 and is demodulated by data demodulating block 128.

More specific operation of the transmitter and receiver shown in FIGS. 37 and 38 will be described. The modulated signal 120 as the output from modulator 112 is represented by the following equation in which data from the data generating block 111 is represented by d(t) and the angular frequency of carrier is represented as $w_c(t)$:

$$S_1(t) = d(t) \cos \omega_c(t)t \quad (33)$$

The signal delayed by the delay element 115 is represented as $$S_2(t) = \cos \omega_c(t\text{-}z) \quad (34)$$

where z represents the amount of delay. Therefore, the signal formed in the power combiner 116 is the sum of these, which is represented as $$S_0(t) = d(t) \cos \omega_c(t)t + \cos \omega_{c(t\text{-}z)}(t\text{-}z) \quad (35)$$

In the transmitter, the signal 125 distributed by the power splitter 122 can be represented as $$R_1 = d(t\text{-}t_0) \cos \omega_{c(t\text{-}t_0)}(t\text{-}t_0) + \cos \omega_{c(t\text{-}t_0\text{-}z)}(t\text{-}t_0\text{-}z) \quad (36)$$

where the time of propagation of the signal is represented by $t_0$ and the amplitude value is neglected. The signal which has passed through the delay element 123 is represented as $$R_2 = d(t\text{-}t_0\text{-}z) \cos \omega_{c(t\text{-}t_0\text{-}z)}(t\text{-}t_0\text{-}z) + \cos \omega_{c(t\text{-}t_0\text{-}2z)}(t\text{-}t_0\text{-}2z) \quad (37)$$

Therefore, the output from multiplier 126 corresponds to multiplication of $R_1$ and $R_2$, that is, $$\begin{aligned} R_0 = R_1 \times R_2 &= d(t-t_0)\cos\omega_{c(t-t_0)}(t-t_0) + \\ &\quad \cos\omega_{c(t-t_0-z)}(t-t_0-z) \times \\ &\quad d(t-t_0-z)\cos\omega_{c(t-t_0-z)}(t-t_0-z) + \\ &\quad \cos\omega_{c(t-t_0-2z)}(t-t_0-2z) \\ &= d(t-t_0) \cdot d(t-t_0-z)\cos\omega_{c(t-t_0)}(t-t_0) \cdot \\ &\quad \cos\omega_{c(t-t_0-z)}(t-t_0-z) + \\ &\quad d(t-t_0)\cos\omega_{c(t-t_0)}\cos\omega_{c(t-t_0-2z)}(t-t_0-2z) \\ &\quad + \\ &\quad d(t-t_0-z)\cos\omega_{c(t-t_0-z)}(t-t_0-z) \cdot \\ &\quad \cos\omega_{c(t-t_0-z)}(t-t_0-z) + \\ &\quad \cos\omega_{c(t-t_0-z)}(t-t_0-z) \cdot \\ &\quad \cos\omega_{c(t-t_0-2z)}(t-t_0-2z) \end{aligned} \quad (38)$$

Among these, $\omega_{c(t\text{-}t_0)}$ and $\omega_{c(t\text{-}t_0\text{-}z)}$, $\omega_{c(t\text{-}t_0)}$ and $\omega_{c(t\text{-}t_0\text{-}2z)}$, and $\omega_{c(t\text{-}t_0\text{-}z)}$ and $\omega_{c(t\text{-}t_0\text{-}2z)}$ are longer than time duration of constant frequency of frequency hopping, and therefore they will be different frequencies. Accordingly, the frequency after the multiplication in the multiplier 126 is converted to the sum and difference frequency components, and it does not converted to the baseband. Meanwhile, when $\cos \omega_{c(t\text{-}t_0\text{-}z)}$ is multiplied by $\cos \omega_{c(t\text{-}t_0\text{-}z)}$, the resulting frequency is converted to the double wave and the baseband signal component. More specifically, $$\begin{aligned} &d(t-t_0-z) \cos \omega_{c(t-t_0-z)}(t-t_0-z) \cdot \cos \\ &\omega_{c(t-t_0-z)}(t-t_0-z) = d(t-t_0-z)\{\tfrac{1}{2}\cos \\ &\omega_{c(t-t_0-z)}(2t-2t_0-2z) + \cos \omega_{c(t-t_0-z)}(0)\} \end{aligned} \quad (39)$$

Therefore, the output of the equation of $R_0$ after the passage through filter 127 will be $d(t\text{-}t_0\text{-}z)$, and therefore data can be demodulated. Namely, despreading is effected.

As described above, by using one embodiment of the present invention, demodulation of frequency hopping is enabled by a very simple circuitry, and therefore the conventional problem can be solved.

Now, when we note synchronization, there are always two waves transmitted, and the time z is sufficiently short. Therefore, it can be assumed that they have approximately the same propagation path characteristic. Therefore, the output of multiplier 126 is constantly in the despread state, which means that demodulation can be done instantly even in the case of disconnection or at the initial connection of the circuit, which also solves the convention problem.

When we note the phase, the phase term $\omega_{c(t\text{-}t_0\text{-}z)}$ is completely the same, there is no phase difference as shown in the development of the equation $R_0$, and therefore the phase is continuous no matter how the frequency is changed. Further, as the effect of this embodiment, it is shown that it is not dependent on the frequency precision or transition time of $\omega_c(t)$. Therefore, design of the carrier wave generator is facilitated, and the load of the circuit and cost of the transmitter side can be reduced as compared with the prior art.

In the thirteenth embodiment of the present invention, the circuit may be an analog circuit or digital circuit. Further, the present invention can be generally applied when the output of power combiner 116 is provided by arithmetic operation using DSP or microprocessors. Although delay element 115 is connected to the output side of the carrier wave generator 113 in FIG. 37, it is apparent from the above equations that it operates similarly when the delay element is inserted to the output side of the modulator 112. The output of modulator 112 or output of carrier wave generator 113 may be delayed.

A fourteenth embodiment of the present invention will be described in which a code which does not have any DC component such as a manchester code is used in the data generating block 111.

Figure 39:
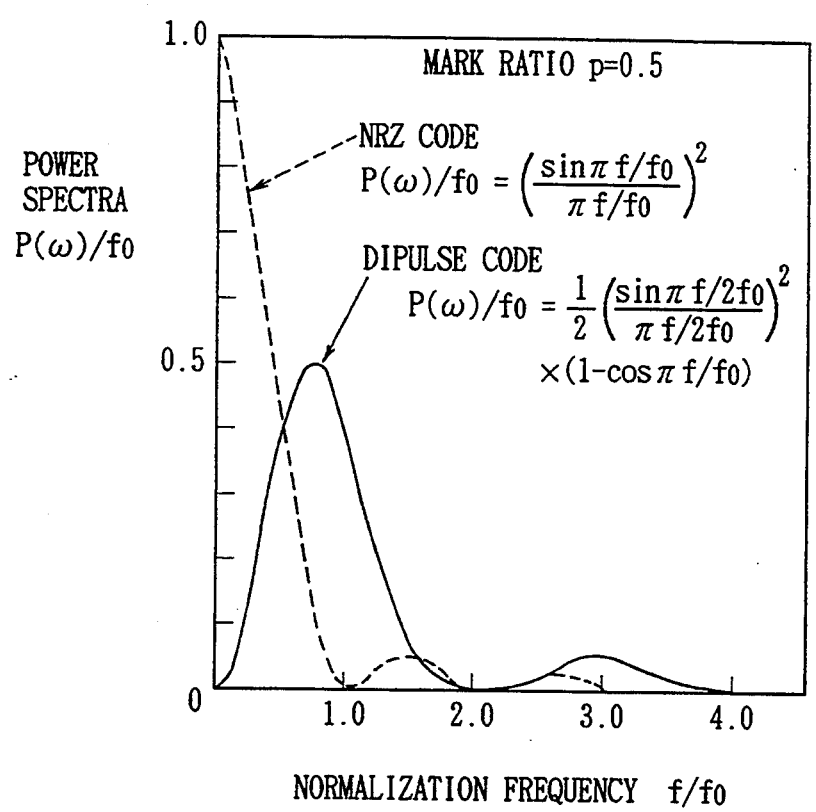
FIG. 39 shows spectrum distribution of a dipulse code such as a general NRZ code and a manchester code.

FIG. 39 shows spectra of a dipulse code such as a manchester code and a general NRZ code. As can be seen from FIG. 39, when a dipulse code is used, the DC term can be cut by means of a filter, since it does not have any DC component. Assume that the CW interfering wave enters in the thirteenth embodiment described above, the output from multiplier 126 will be $$\cos \omega_N(t) \times \cos \omega_N(t\text{-}z) = \tfrac{1}{2}\{\cos \omega_N(2t\text{-}z) + \cos \omega_N(t)\} \quad (40)$$

where $\cos \omega_N(t)$ represents CW wave.

In this case, the $\cos \omega_N(t)$ component is generated in the DC term. The DC component can be cut when the code is changed from NRZ code to the dipulse code to be transmitted. If the present invention is to be used in a band to which CW interference may enter, the fourteenth embodiment which will be described below is effective.

Although a dipulse code such as a manchester code is represented as the code having no DC component, any other code may be used provided that it has few spectrum components in the DC term.

Figure 40:
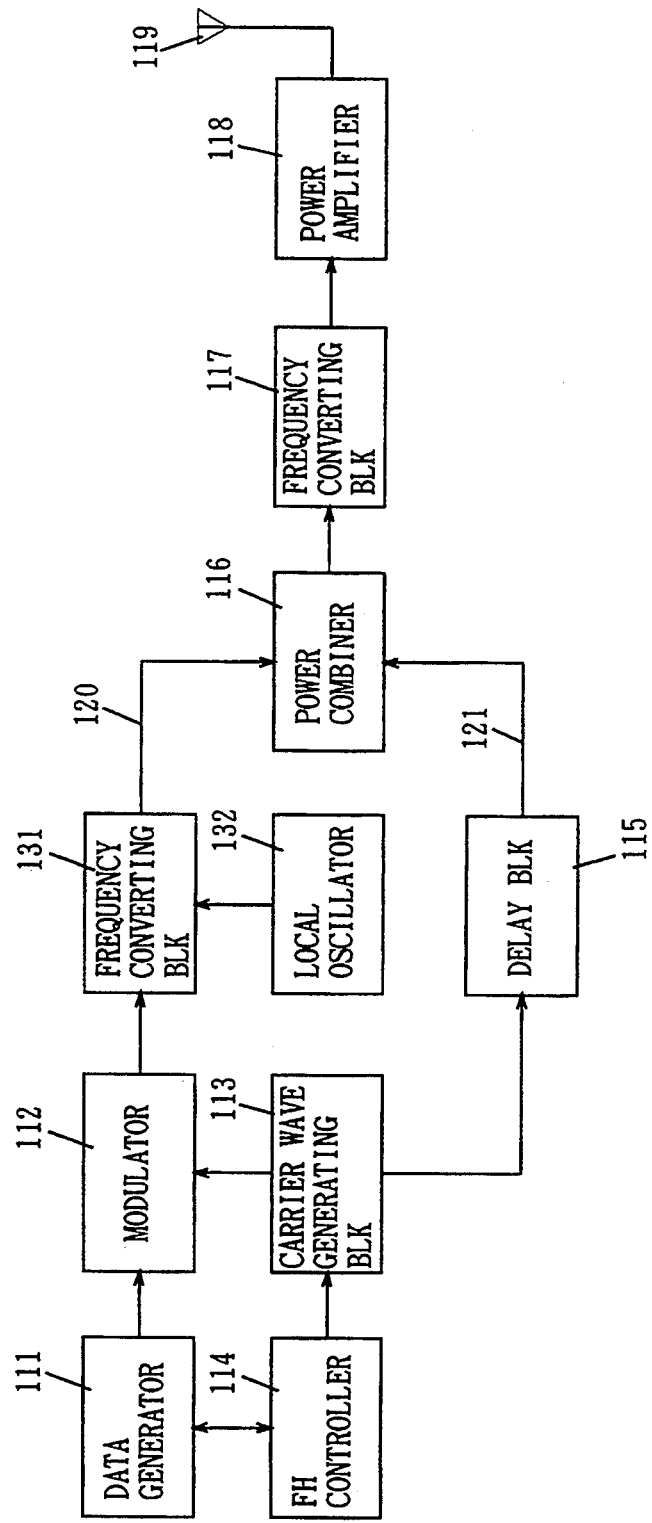
FIG. 40 is a schematic block diagram of a transmitter in accordance with the fourteenth embodiment of the present invention.
Figure 41:
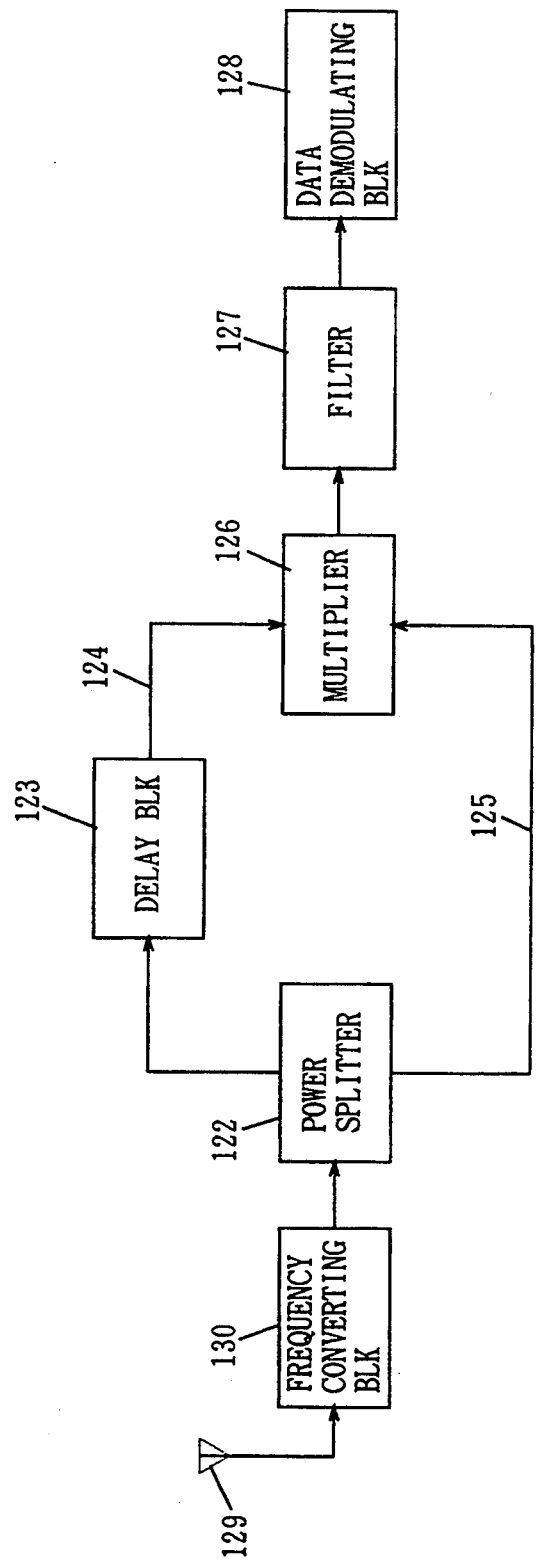
FIG. 41 is a schematic block diagram of a receiver in accordance with the fourteenth embodiment of the present invention.

FIGS. 40 and 41 are block diagrams showing the fourteenth embodiment of the present invention. FIG. 40 shows the transmitter side and FIG. 41 shows the receiver side. The transmitter shown in FIG. 41 has a frequency converting block 131 on the output side of the modulator 112 shown in FIG. 37, and a local oscillator 132 is provided for applying local oscillation signal to the frequency converting block 131. Except those, the structure is the same as that of FIG. 37. The carrier wave signal modulated by the data at the modulator 112 is applied to frequency converting block 131 to be converted to a signal having different frequency by the frequency of the local oscillating signal from local oscillator 132, and the resulting signal is combined in the power combiner 116.

On the receiver side, when similar processing as in the embodiment of FIG. 38 is carried out, the output of multiplier 126 is provided as an intermediate frequency signal which is obtained by the above mentioned demodulation term $d(t-t_0-z)$ of the equation of $R_0$ multiplied by the local oscillation frequency $\omega_{IF(t-t0-z)}$. A filter 127 is connected to the output of multiplier 126, the filter 127 takes out the intermediate frequency signal as a bandpass filter, and data demodulating block 128 demodulates this signal by a general method of demodulating BPSK wave which is provided by modulating general intermediate frequency signal. The frequency of the local oscillator 132 and the hopping pattern should be selected such that only this term passes through the filter 127 among the terms generated by multiplier 126.

With respect to this embodiment, CW interference can be prevented by the thirteenth embodiment described above. However, interference waves having relatively wide band may be generated with its spectrum considerably wider than DC, and such interference wave may interfere the signal. Therefore, by shifting the desired signal to the intermediate frequency band as in the fourteenth embodiment, such interference waves can be removed. The transmitter and the receiver in accordance with this embodiment are effective when the present invention is used in a frequency band where such interference waves as described above may exist.

In FIG. 40, it is adapted that the local oscillation signal from local oscillator 132 is multiplied by the modulation signal. However, the same result can be obtained when it is multiplied by the signal including the carrier wave only. Therefore, similar to the delay element 115, it can be generally applicable to any of the signals.

The fifteen embodiment of the present invention will be described. Generally, multiple accessing is one feature of the spread spectrum. In the system of the present invention, multiple accessing is enabled by the delay time z. When radio wave transmitted by a user by using a delay time $z_2$ is received by a user using delay time $z_1$, the transmission wave at this time will be $$R_1 = d(t-t_1)\cos\omega_{c(t-t1)}(t-t_1) + \cos\omega_{c(t-t1-z2)}(t-t_0-z_2)(t-t_1 z_2) \quad (41)$$

Meanwhile, the delay wave will be represented as $$R_2 = d(t-t_1-z_1)\cos\omega_{c(t-t1-z1)}(t-t_1-z_1) + \cos\omega_{c(t-t1-z2-z1)}(t-t_1-z_2-z_1) \quad (42)$$

Therefore, the output from multiplier 126 will be represented as $$\begin{aligned}R_0 &= R_1 \times R_2 \\ &= (d(t-t_1)\cos\omega_{c(t-t1)}(t-t_1) + \\ &\quad \cos\omega_{c(t-t1-z2)}(t-t_1-z_2)) \times \\ &\quad d(t-t_1-z_1)\cdot\cos\omega_{c(t-t1-z1)}(t-t_1-z_1) + \\ &\quad \cos\omega_{c(t-t1-z2-z1)}(t-t_1-z_2-z_1)\end{aligned} \quad (43)$$

As already described above, $\omega_{c(t-t1)}$ and $\omega_{c(t-t0-z2)}$, $\omega_{c(t-t1)}$ and $c_{(t-t1-z1)}$ and $\omega_{c(t-t0-z2)}$ and $\omega_{c(t-t0-z2-z1)}$ will have frequencies not related, since $z_1$ and $z_2$ are longer than the time duration of constant frequency of the frequency hopping.

Now, $\omega_{c(t-t0-z2)}$ and $\omega_{c(t-t1-z1)}$ are left. When $|z_2-z_1|$ > (time duration of constant frequency), this signal does not fall within the baseband, so that the users can be distinguished from each other, allowing multiple accessing.

Therefore, multiple accesses by multiple users can be carried out only by changing the value of z. In the fourteenth embodiment, each user has a fixed z allotted.

In this embodiment, coding shown in the thirteenth embodiment and the use of the intermediate frequency signal shown in the fourteenth embodiment can be simultaneously effected.

In this embodiment, the time duration of constant frequency is several bits of data. However, this may be any number of bits, or it may be shorter than 1 bit. Further, it may be asynchronous.

Figure 42:
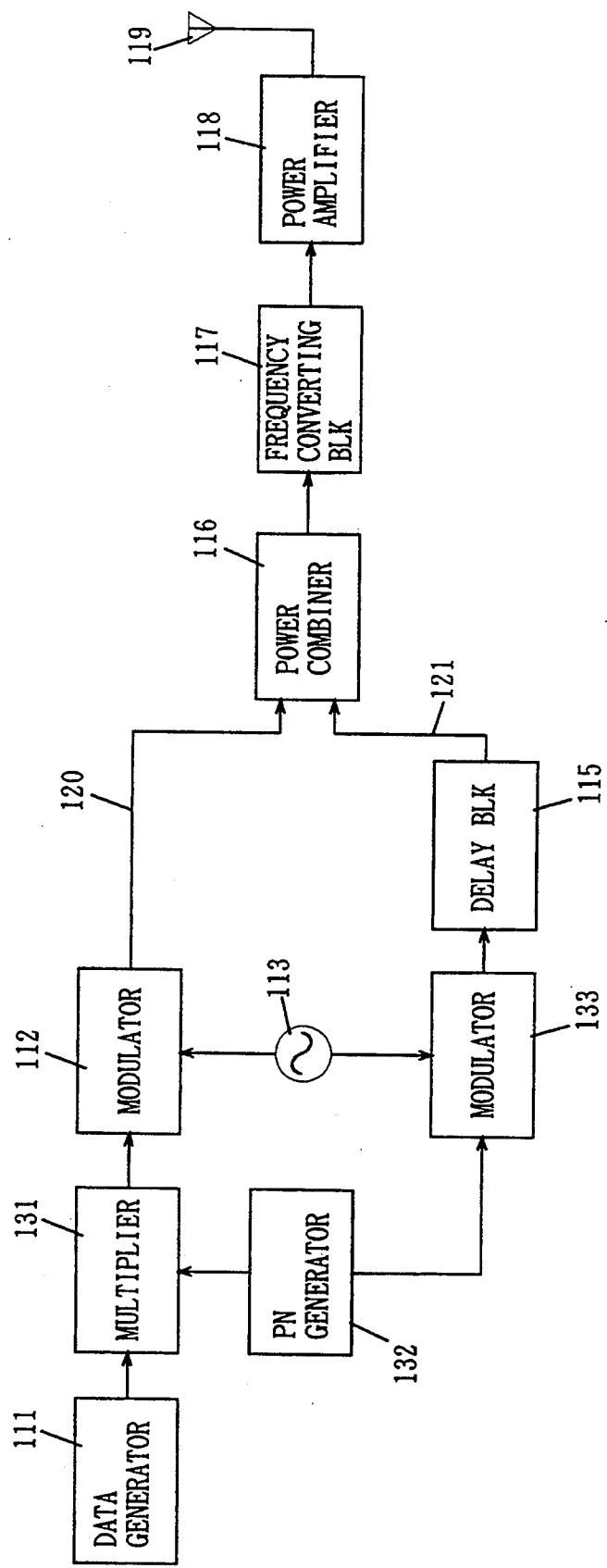
FIG. 42 is a schematic block diagram of a transmitter in accordance with the fifteenth embodiment of the present invention.
Figure 43:
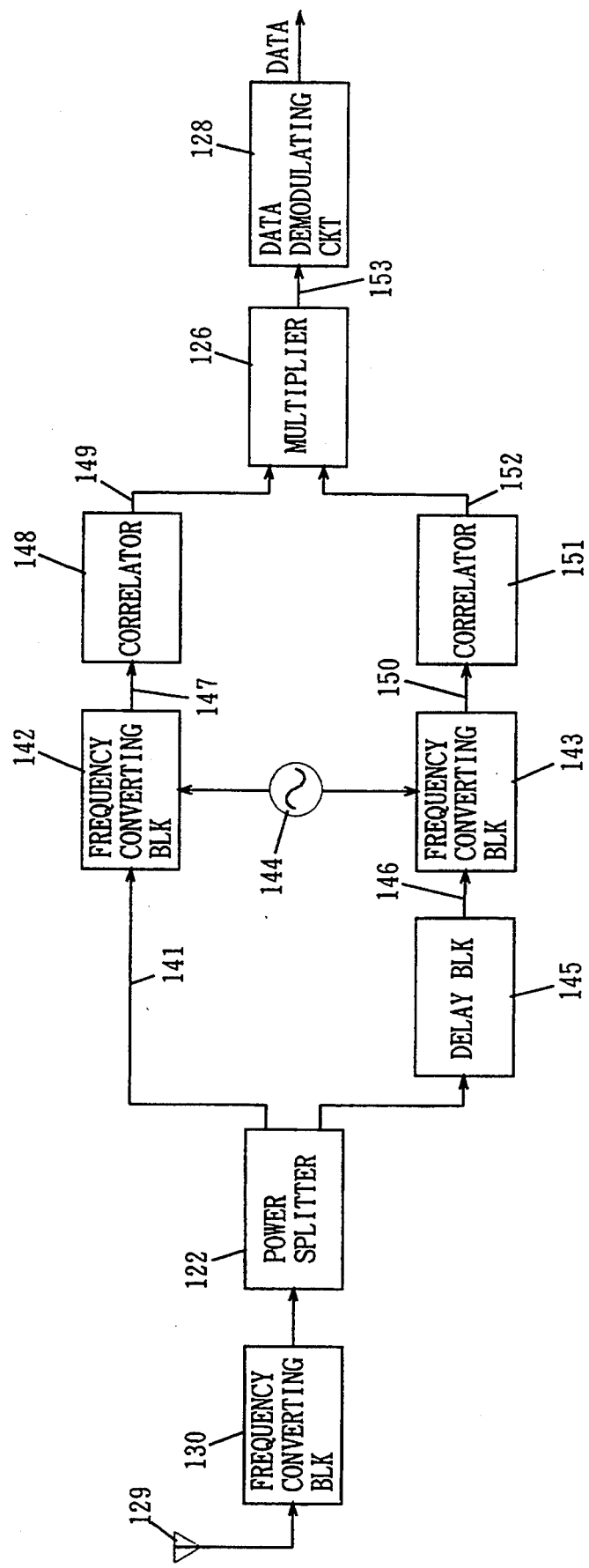
FIG. 43 is a schematic block diagram of a receiver in accordance with the fifteenth embodiment of the present invention.

FIGS. 42 and 43 are block diagrams of the fifteenth embodiment of the present invention in which FIG. 42 shows the transmitter side and FIG. 43 shows the receiver side. Referring to FIG. 42, data generated from data generating block 111 is applied to multiplier 131. Multiplier 131 multiplies the PN code generated by PN code generator 132 by the data and applies the multiplied output to modulator 112. Modulator 112 modulates carrier 113 by the signal from multiplier 131, for example by BPSK modulation. The PN code generated by PN code generator 132 is also applied to modulator 133, and modulator 133 modulates carrier 113 by the PN code and applies the modulated output to a delay element 115. The delay element 115 provides a delay of z to the modulated output from modulator 133 and applies the delayed signal to power combiner 116. Power combiner 116 combines the output signal 120 from modulator 112 and outputs signal 121 from delay element 115 and applies the result to a frequency converting block 117. Frequency converting block 117 converts the frequency of the combined output, a power amplifying block 118 amplifies the output from frequency converting block 117, and the result is transmitted from antenna 119.

In the receiver shown in FIG. 43, the signal is received by an antenna 129, the received signal has its frequency converted by frequency converting block 130, and the signal is distributed to two paths by a power splitter 122. One of the split signals is delayed by a delay element 145, and the delayed output signal 146 is applied to a frequency converting block 143. The frequency converting block 143 converts the frequency of the delayed output signal 143 by a carrier 144 having approximately the same frequency as the carrier 113 on the transmitter side, to convert the same to near baseband signal 150, which signal is input to a correlator 151.

The other one of the signals split by the power splitter 122 has its frequency converted by carrier 144 in the frequency converting block 142, and the output signal 147 is applied to a correlator 148. Output signals from correlators 148 and 151 are multiplied by multiplier 126, and the multiplied output signal 153 is modulated to data by data modulating circuit 128.

The operation of the embodiment shown in FIG. 42 will be described. Now, the modulated signal 120 from the modulator 112 and the signal 121 delayed by the delay element 115 on the transmitter side are respectively represented by the following equations, where d(t) represents data, P(t) represents the PN code and cos $\omega_c t$ represents carrier:

$$S_1 = d(t)P(t)\cos\omega_c t$$

$$S_2 = P(t-z)\cos\omega_c(t-z) \quad (44)$$

Therefore, the output signal from power combiner 116 is represented as a sum, that is, $$S' = d(t)P(t)\cos\omega_c t + P(t-z)\cos\omega_c(t-z) \quad (45)$$

In the receiver, the signal 141 distributed by the power splitter 122 and the output signal 146 from the delay element 145 are represented by the following equations, where $t_0$ represents the time of propagation:

$$\begin{aligned} R_1 = &\, d(t-t_0)\cdot P(t-t_0)\cos\omega_c(t-t_0) + \\ & P(t-t_0-z)\cdot\cos\omega_c(t-t_0-z) \\ R_2 = &\, d(t-t_0-z)\cdot P(t-t_0-z)\cos\omega_c(t-t_0-z) + \\ & P(t-t_0-2z)\cdot\cos\omega_c(t-t_0-2z) \end{aligned} \quad (46)$$

The nearly baseband signals 147 and 150 generated from frequency converting blocks 142 and 143 are represented by the following equations in which $\omega_2 t$ represents carrier 144:

$$\begin{aligned} B_1 = &\, d(t-t_0)P(t-t_0)\cos(\omega_c(t-t_0) - \omega_2 t) + \\ & P(t-t_0-z)\cos(\omega_c(t-t_0-z) - \omega_2 t) \\ = &\, d(t-t_0)P(t-t_0)\cos(\Delta\omega t - \omega_c t_0) + \\ & P(t-t_0-z)\cos(\Delta\omega t - \omega_c(t_0-z)) \\ B_2 = &\, d(t-t_0-z)P(t-t_0-z)\cos(\omega_c(t-t_0-z) - \\ & \omega_2 t) + P(t-t_0-2z)\cos(\omega_c(t-t_0-2z) - \omega_2 t) \\ = &\, d(t-t_0-z)P(t-t_0-z)\cos(\Delta\omega t - \omega_c(t_0-z)) \\ + & \\ & P(t-t_0-2z)\cos(\Delta\omega t - \omega_c(t_0-2z)) \end{aligned} \quad (47)$$

By substituting $\omega_c z = 2\pi n$ (n: integer) in the above described two equations representing two signals, then $\omega_c \cdot 2z = 2\pi n$, and therefore phase shift by z will be 0 for both $\omega_c z$ and $\omega_c 2z$, and therefore the above equations can be changed to $$\begin{aligned} B'_1 = &\, d(t-t_0)\cdot P(t-t_0)\cos(\Delta\omega t - \omega_c t_0) + P(t-t_0-z)\cos(\Delta\omega t - \omega_c t_0) \\ B'_2 = &\, d(t-t_0-z)\cdot P(t-t_0-z)\cos(\Delta\omega t - \omega_c t_0) + P(t-t_0-2z)\cos(\Delta\omega t - \omega_c t_0) \end{aligned} \quad (48)$$

FIG. 44(a) is a waveform of the output of correlator 148, that is, the aforementioned $B'_1$, FIG. 44(b) is the waveform of the output of correlator 151, that is, the waveform of the aforementioned $B'_2$, and FIG. 44(c) shows the output waveform from the multiplier 126. By multiplying the waveforms of FIG. 44(a) and FIG. 44(b), the output having the waveform of FIG. 44(c) is obtained, which means that the data is demodulated.

Figure 45:
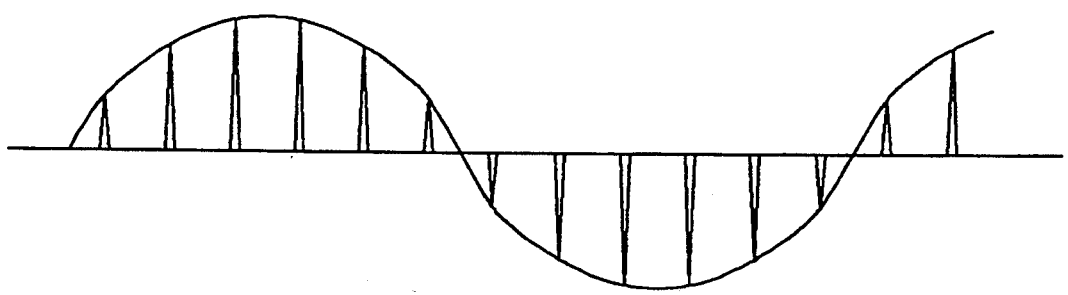
FIG. 45 is a diagram of a waveform when only the PN code is input to a one wave correlator.

The effect of the fifteenth embodiment of the present invention, that is, provision of stable data will be described. Even when the signal is converted to the nearly baseband signal as in the embodiment of the present invention, there still remains the term of cos ($\Delta\omega t - \omega_c C_0$), and therefore it appears as an amplitude term of the data output under the condition of ($\Delta t <$ (data rate)). FIG. 45 shows this state, which is a waveform when data are all 1, that is, when the PN code only is input to a one wave correlator. As shown in FIG. 45, by the influence of cos, the data, which are all 1, assume positive and negative values depending on the phase of the cos, resulting in erroneous values. Therefore, in the prior art, it was necessary to realize complete synchronization by providing a loop on the carrier to convert the same to the baseband. In one embodiment of the present invention, the data component is the product of the correlator output of $d(t-t_0-z)\cdot P(t-t_0-z)\cos(\Delta\omega t - \omega_c t_0)$ and $P(t-t_0-z)\cdot\cos(\Delta\omega t - \omega_c t_0)$. As can be seen from this expression, cos constantly shows the same phase in these two terms, therefore even when the cos term assumes a negative value, the data output will be the product of minus term by minus term, and therefore correct data is output.

As described above, by the thirteenth to fifteenth embodiment of the present invention, the carrier synchronization loop which was necessary for data demodulation becomes unnecessary, and data can be demodulated without carrier synchronization. Therefore, unlike the prior art, in which data modulation could not be done until the carrier is recovered at the time of disconnection/reconnection of channels because of multipath fluctuation and the like, the time loss becomes 0 in the thirteenth to fifteenth embodiments, and therefore even in a channel which is frequency disconnected, data is interrupted only for the actual time of disconnection. For simplicity, calculation is done under the condition of $\omega_c z = 2\pi n$ here. However, the present invention can be generally applied when $\omega_c z$ is not $2\pi n$, since what occurs when $\omega_c z$ is not $2\pi n$ is only that the output amplitude of two correlators 34 and 35 differ and that the output values of correlator are changed to some extent.

Figure 46:
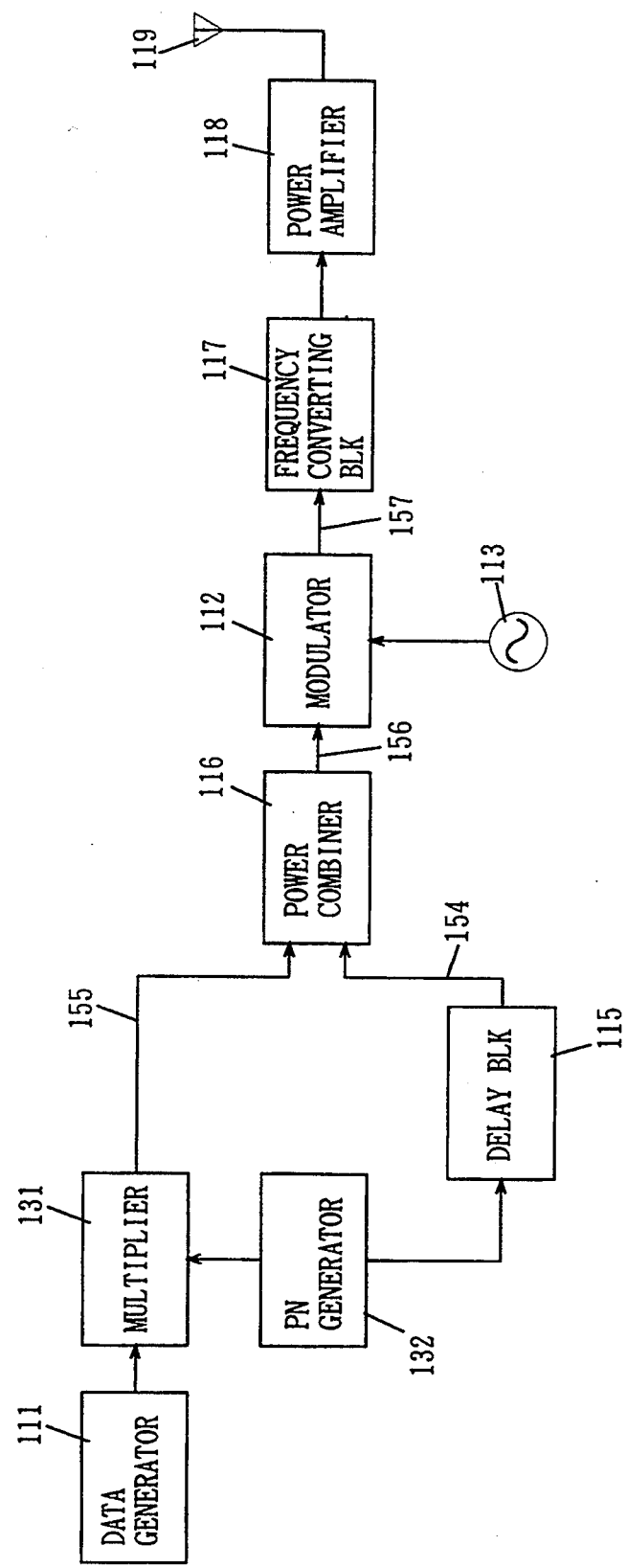
FIG. 46 is a schematic block diagram of a transmitter in accordance with the sixteenth embodiment of the present invention.
Figure 47:
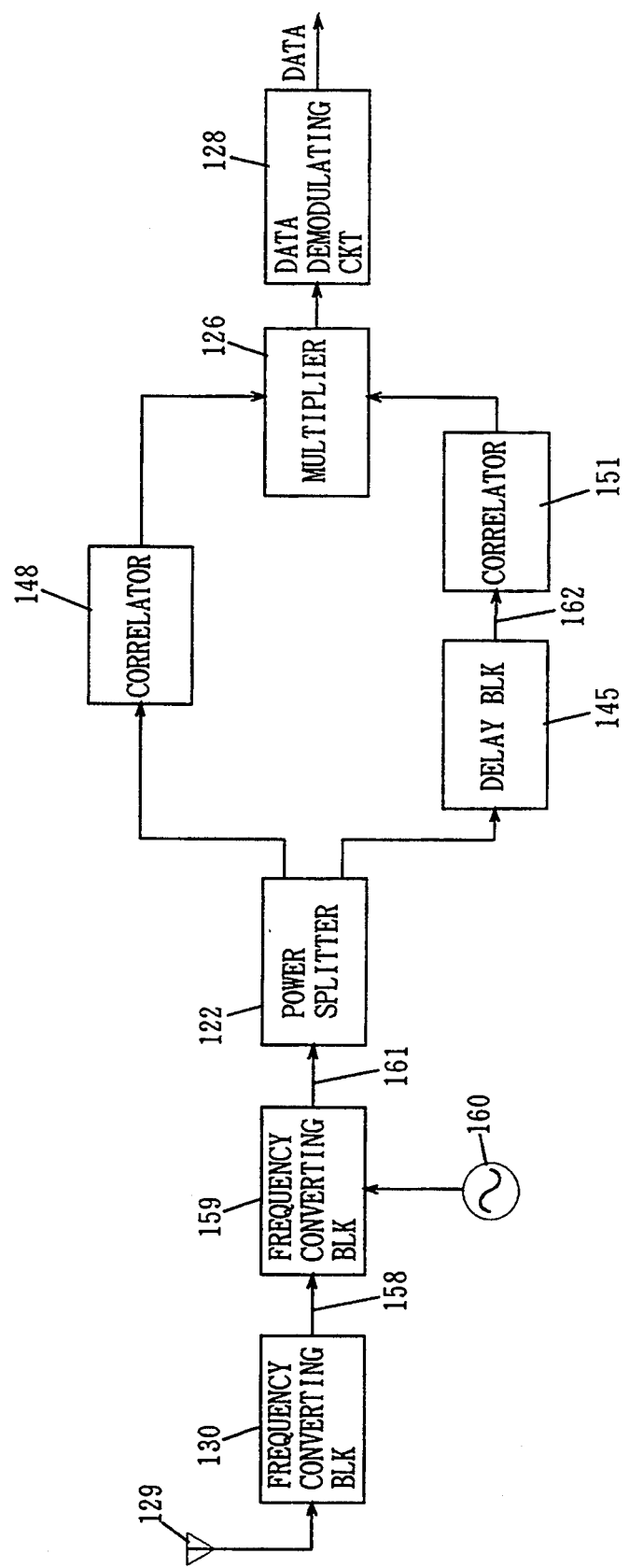
FIG. 47 is a schematic block diagram of a receiver in accordance with the sixteenth embodiment of the present invention.

FIGS. 46 and 47 are block diagrams showing the sixteenth embodiment of the present invention in which FIG. 46 shows the transmitter and FIG. 47 shows the receiver.

Referring to FIG. 46, on the transmitter side, an output of PN generator 132 is delayed by a delay element 115, an output signal 155 from multiplier 131 and an output signal 154 of delay element 115 are combined by a power combiner 116, and the result is demodulated by carrier 113 at modulator 112. On the receiver side, the signal received by antenna 129 has its frequency converted by frequency converting block 130, the resulting signal 158 has its frequency converted by a carrier 160 at a frequency converting block 159, and the resulting signal 161 is distributed to two paths by a power splitter 122, as shown in FIG. 147. Except these points, the structures are the same as those in FIG. 42. The operation of the sixteenth embodiment shown in FIGS. 46 and 47 will be described. The output signal from multiplier 131 is represented as $$S_1 = d(t)P(t) \quad (49)$$

The output signal 154 from delay element 115 is represented as $$S_2 = P(t-z) \quad (50)$$

The output signal 156 from power combiner 116 is represented as $$S = d(t)P(t) + P(t-z) \quad (51)$$

The output signal 157 from modulator 112 is represented as $$S' = (d(t)P(t) + P(t-z))\cos\omega_c t \quad (52)$$

On the receiver side, the signal has its frequency converted by frequency converting block 130, and output signal 158 therefrom is represented as $$R = (d(t-t_0)P(t-t_0) + P(t-t_0-z))\cos\omega_c(t-t_0) \quad (53)$$

When this signal is further converted to the nearly baseband by frequency converting block 159, it will be represented as $$R' = (d(t-t_0)P(t-t_0) + P(t-t_0-z))\cos\omega_c(t-t_0) \times \cos\omega_2 t = (d(t-t_0)P(t-t_0) + p(t-t_0-z))\cos(\Delta\omega t - \omega_c t_0) \quad (54)$$

Therefore, outputs $B_1$ and $B_2$ from correlators 148 and will be $$B_1 = (d(t-t_0)P(t-t_0) + P(t-t_0-z))\cos(\Delta\omega t - \omega_c t_0)$$

$$B_2 = (d(t-t_0-z)P(t-t_0-z) + p(t-t_0-2z))\cos(\Delta\omega t-z) - \omega_c t_0) \quad (55)$$

When we compare the above equations $B_1$ and $B_2$ with the equations of $B_1$ and $B_2$ described above, it can be seen that only the amplitude term in $B_2$ is shifted by $\Delta\omega z$ and other terms are the same.

Now, z is a delay time which is longer than 1 chip but it is far smaller than the time of data 1 bit. When it is taken into account that $\Delta\omega$ is very small, we can say that ($\Delta\omega z < z$), and therefore $\cos \Delta\omega t$ and $\cos \Delta\omega(t-z)$ can be regarded as approximately the same phase. The time ratio of inverse phase is $2\pi z/\Delta\omega \%$.

Therefore, in this sixteenth embodiment also, it is understood that the same result as in the fifteenth embodiment can be obtained. As described above, the processing carried out by the delay element 115 or modulation by the carrier have higher degree of freedom, and such processing may be changed appropriately to be suitable for particular circuits or particular systems. Further, the transmitters and receivers of the fifteenth and sixteenth embodiments are compatible when the phase of z is taken into consideration, as can be understood from above equations. Therefore, these transmitters and receivers may be used combined variously.

In the fifteenth embodiment described above, the data is not inverted even when there is no carrier synchronizing circuit, and that the data demodulation is possible. However, there still remains the amplitude term, and therefore the output level fluctuates dependent on $|\cos\theta|$. Therefore in a channel having low C/N, it is possible that the bit error rate is degraded at a region where $|\cos\theta|$ is small. A seventeenth embodiment will be described which can prevent such degradation of the bit error rate.

Figure 48:
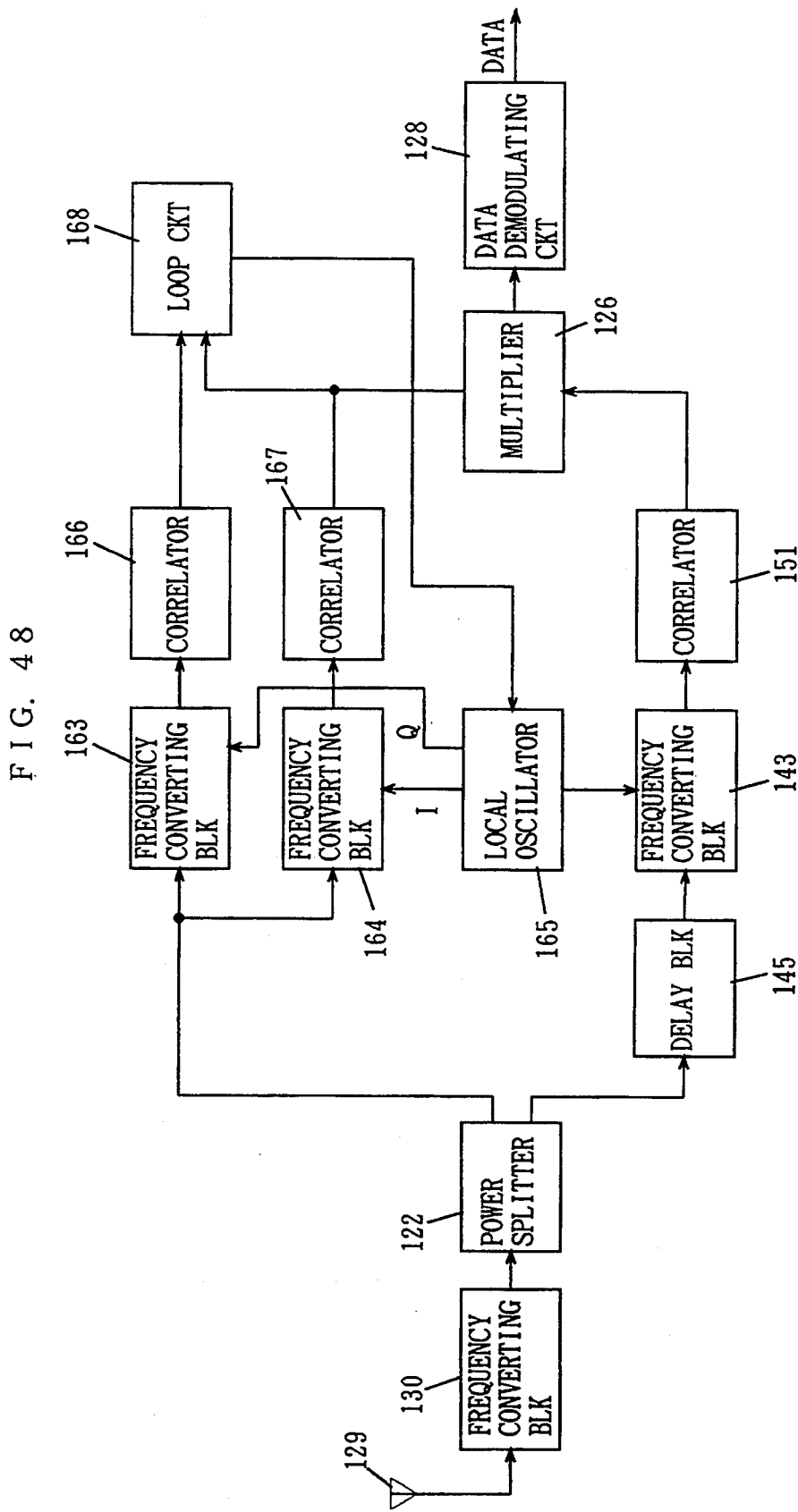
FIG. 48 is a schematic block diagram of a receiver in accordance with the seventeenth embodiment of the present invention.

FIG. 48 is a block diagram of the receiver of the seventeenth embodiment. This embodiment is characterized in that it also uses the carrier synchronization loop as in the conventional example.

More specifically, in one of the paths split by the power splitter 122 in which delay element 145 is not inserted, the frequency converting block 163, a correlator 166 and a loop circuit 168 are connected, an I phase carrier from local oscillating block 165 is applied to frequency converting block 164, a Q phase carrier is applied to frequency converting block 163, and the local oscillating block 165 is controlled by the output from loop circuit 168. By preparing the I and Q phases and providing a loop which is equivalent to a Costas loop in the prior art, the local oscillator block 165 is controlled by the loop circuit 168. It has been described with reference to the fifteenth embodiment that data demodulation is possible without carrier synchronization. However, when the loop functions and the carrier is synchronized thereafter, the amplitude value will be constant, which leads to further improvement of the bit error rate. Therefore, by this embodiment, data demodulation is possible immediately after disconnection or reconnection of channels, and when carrier is synchronized thereafter, bit error rate can be improved.

The control of the local oscillating block 165 by the loop circuit 168 can be applied to the sixteenth embodiment shown in FIG. 47.

Figure 49:
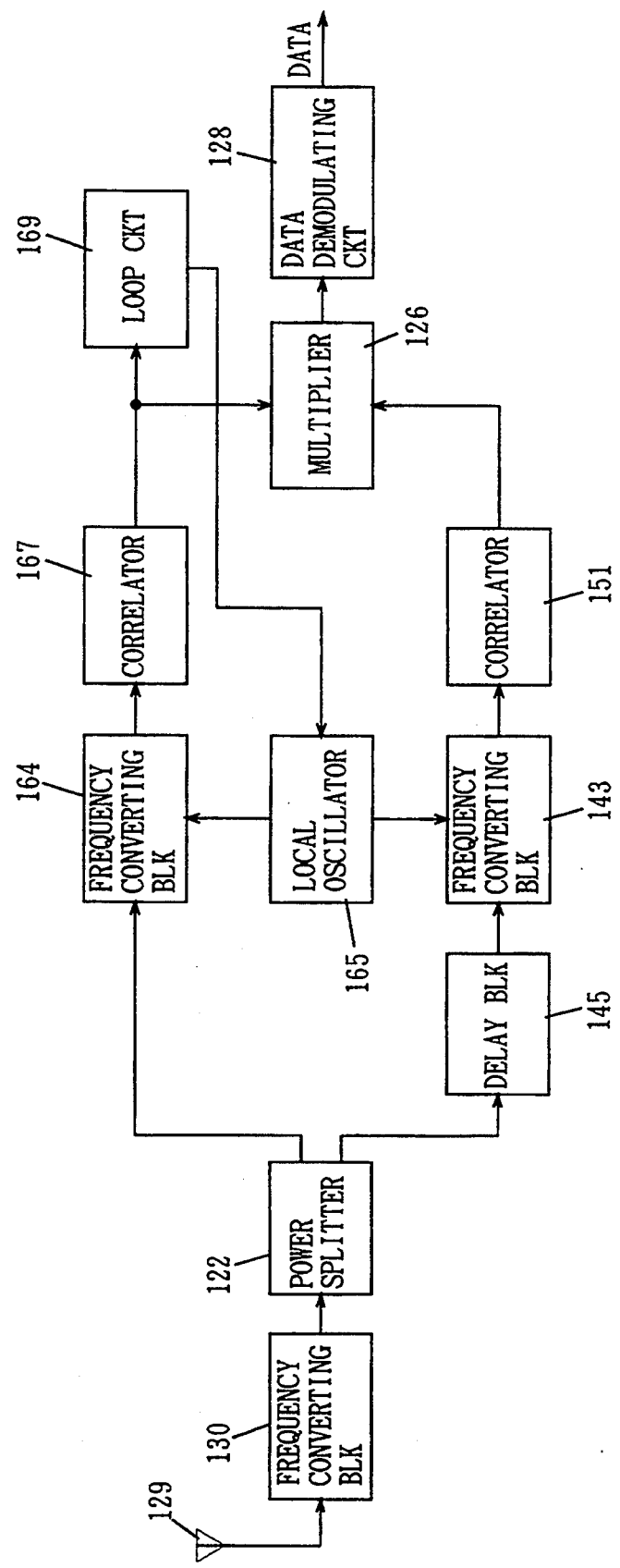
FIG. 49 is a schematic block diagram of a receiver in accordance with the eighteenth embodiment of the present invention.

FIG. 49 is a block diagram of the eighteenth embodiment of the present invention. In the seventeenth embodiment shown in FIG. 48, a Costas loop is used as in the prior art. In the embodiment shown in FIG. 49, loop is provided only by one signal. More specifically, the output from correlator 167 is connected to a loop circuit 169, and the local oscillating block 165 is controlled by the loop circuit 169. In general communication, modulation is done by data, and therefore, in order to reduce the data component, a Costas loop or a square loop is necessary. However, in this embodiment, non-modulated wave is transmitted as is apparent from the equations of $B'_1$ and $B'_2$ described above, and therefore it is possible to provide a loop by extracting an output of the non-modulated side only, from the correlated outputs of the correlators 167 and 151. In this embodiment, it becomes unnecessary to provide the Q channel, as compared with the embodiment shown in FIG. 48.

Figure 44:
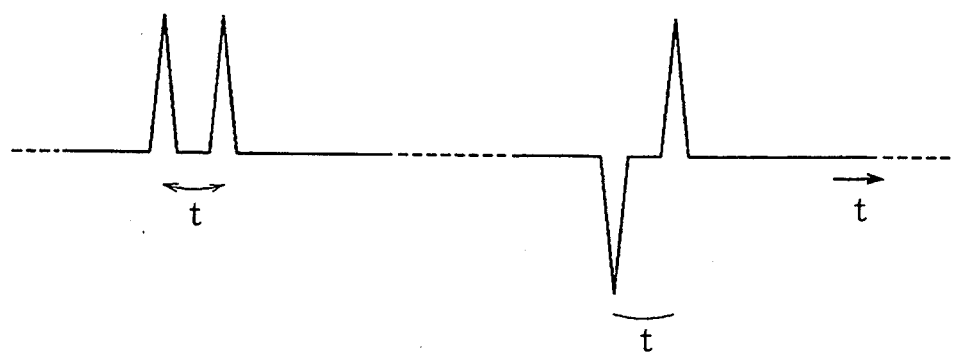
FIG. 44 is a diagram of output waveforms of a correlator and a multiplier shown in FIG. 43.
Figure 44:
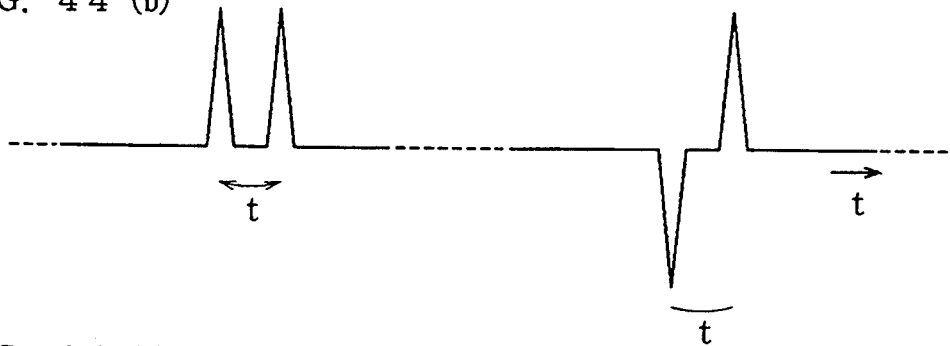
Figure 44:
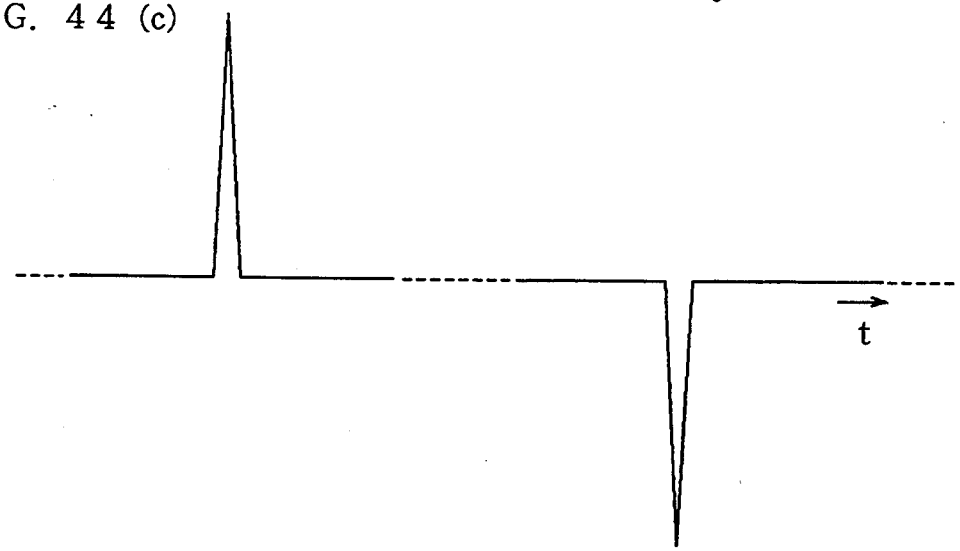
Figure 50:
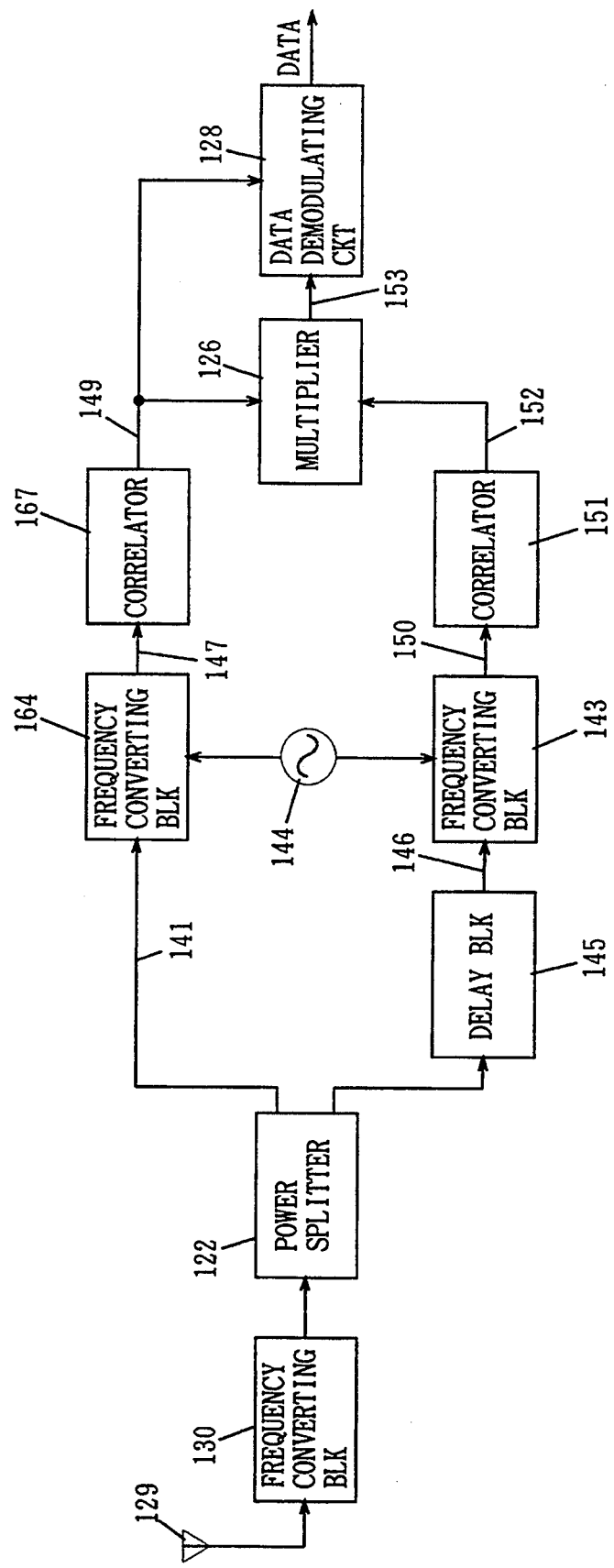
FIG. 50 is a schematic block diagram of a receiver in accordance with the nineteenth embodiment of the present invention.

FIG. 50 is a block diagram showing the nineteenth embodiment of the present invention. The embodiment shown in FIG. 50 is the same as the embodiment shown in FIG. 43 described above except that the output of correlator 167 on the receiver side is applied to data demodulating circuit 128. When there is a few multipath fading, the outputs from correlators 167 and 151 will be as shown in FIG. 44. However, when there is much multipath fading, the correlated output becomes not uniform as shown in FIG. 45, and therefore it is difficult to determine which region is to be integrated and at which timing should the point of determination be placed. In general sequential demodulating method, the value of integration and the amount of time are determined by using fixed parameters. However, in that method, optimal data can not be obtained.

In the embodiment shown in FIG. 50, z of the correlated waveform outputted before the time at data demodulation is sufficiently short, and therefore it can be considered to have the same correlated waveform as the data. Therefore, by monitoring this, it becomes possible to change integral value or to effectively add several correlated outputs called PDI as desired corresponding to the monitored waveform, which enables provision of optimal data. This embodiment can be applied to the sixteenth to eighteenth embodiments.

Generally, in multiple accessing of spread spectrum employing DS, discrimination is done by the PN code. However, if it is a m sequence of 127 chips, for example, there are only 18 types of codes, and therefore it is not available for larger number of users. Therefore, a function in which the detected signal is checked and determined to be a correct signal if there is a signal at the position of z thereafter and if not, demodulation is inhibited, should be added to the embodiment of FIG. 50. In this manner, users can be discriminated from each other by changing z even when the same code is used. Therefore, by the combination of the code and the amount of delay, the system becomes available for larger number of users. Therefore, the number of users, which has been 18 in the conventional art, can be significantly increased. This can be applied to all the embodiments described above.

Figure 51:
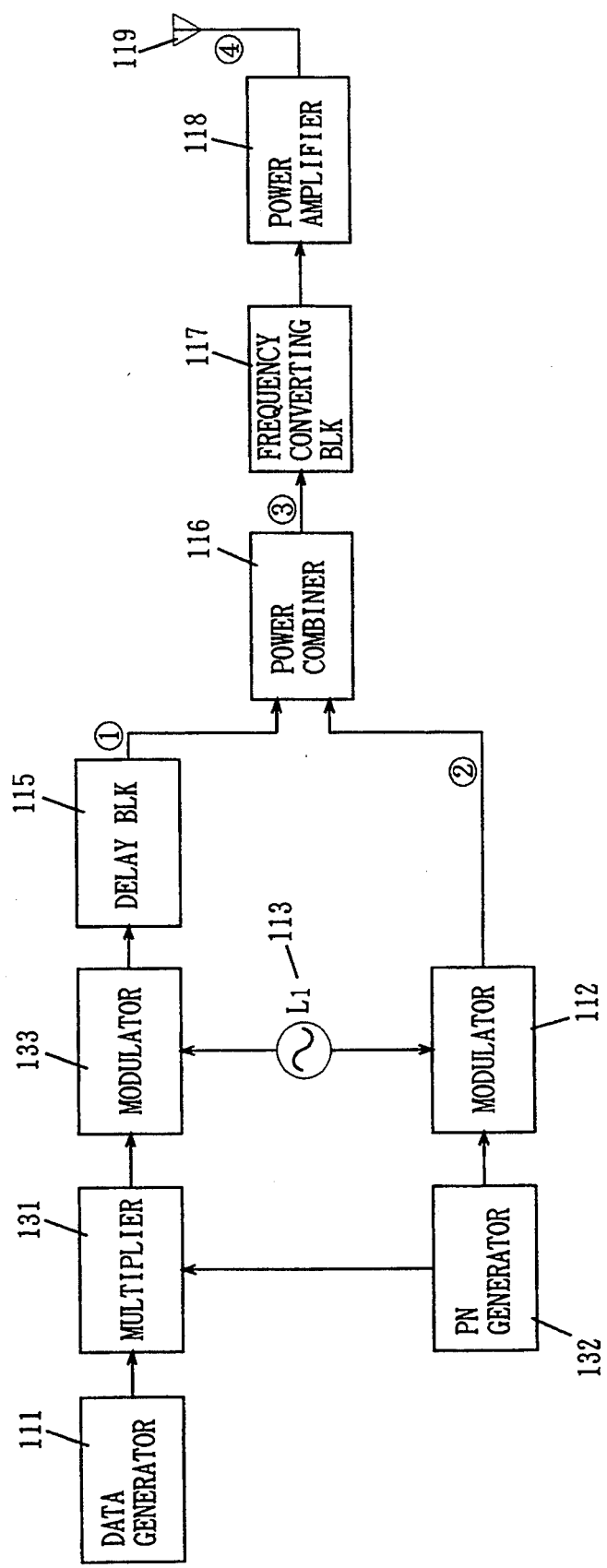
FIG. 51 is a schematic block diagram of a transmitter in accordance with the twentieth embodiment of the present invention.
Figure 52:
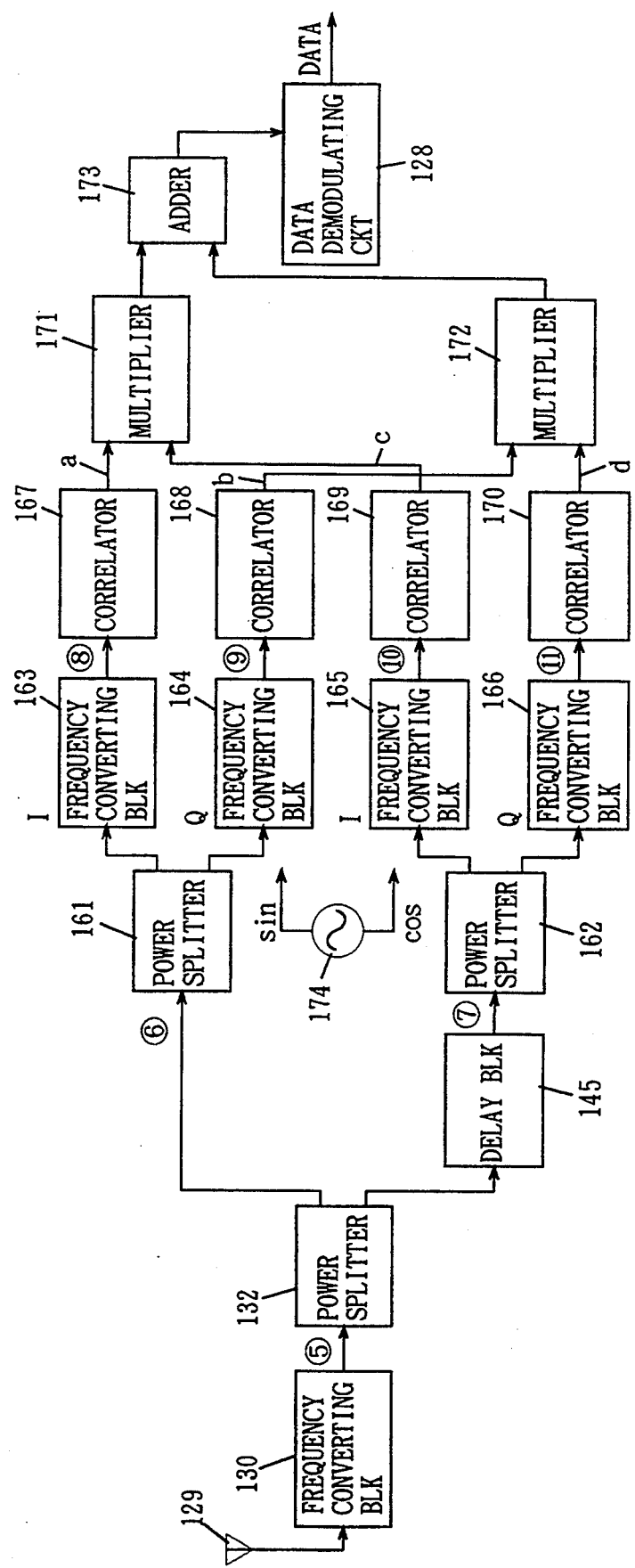
FIG. 52 is a schematic block diagram of a receiver in accordance with the twentieth embodiment of the present invention.

FIGS. 51 and 52 show the twentieth embodiment of the present invention in which FIG. 51 shows the transmitter and FIG. 52 shows the receiver.

The transmitter shown in FIG. 51 has approximately the same structure as that of FIG. 42. The signal generated from data generating block 111 is multiplied by a PN code generated by PN generator 132 at multiplier 13. Then, an output from multiplier 131 modulates a local signal L1 by a modulator 112, to be turned to a BPSK modulated wave, and then delayed by a desired time $\tau$ at the delay block 115. In modulator 133, a BPSK modulated wave which is modulated only by the PN code is generated. These two BPSK modulated waves are combined by power combiner 116, subjected to frequency conversion by frequency converting block 117, amplified by power amplifier block 118 and the result signal is transmitted from antenna 119.

In the receiver shown in FIG. 52, the signal is received by an antenna 129, then the signal has its frequency converted to an intermediate frequency by frequency converting block 130. The intermediate frequency signal is split by power splitter 132, one of which is applied directly to a power splitter 161 and the other is delayed by a delay element 145 to be applied to a power splitter 162. The splitter 161 splits the signal into two, one of which is applied to frequency converting block 163 and the other is applied to frequency converting block 164. The power splitter 162 splits the signal into two, one of which is applied to frequency converting block 165 and the other is applied to frequency converting block 166. Frequency converting blocks 163 and 165 each convert the frequency of the intermediate frequency signal by using sin component of the local signal 147 to provide an I component as an output. Frequency converting blocks 164 and 166 each convert the frequency of the intermediate frequency signal by using cos component of the local signal 147, and provides a Q component as an output. The I and Q components are approximately the baseband signals.

Thereafter, the four signals are input to correlators 167, 168, 169 and 170 which are correlated to the PN code generated by PN generator 132, and correlated outputs are provided. Thereafter, the I component which is not delayed, which is an output from correlator 167 is multiplied by the delayed I component which is the output from correlator 169 in multiplier 171, while the not-delayed Q component which is the output from correlator 168 is multiplied by the delayed Q component which is the output from correlator 170 in multiplier 172, and then outputs from multipliers 171 and 172 are added by an adder 173. The output from adder 173 is subjected to data demodulation by data demodulating circuit 128.

The flow of the signals mentioned above will be described. Now, data signal is represented as $A(t)$, the PN code is presented as $P(t)$, modulators 112 and 133 are assumed to carry out BPSK modulation, local signals $L_1$, $L_2$, $L_3$ and $L_4$ are represented as $\cos \omega_1 t$, $\cos \omega_2 t$, $\cos \omega_3 t$ and $\cos \omega_4 t$, respectively, and the delay amount is represented as $\tau$. Therefore, the signals 1), 2), 3) and 4) of FIG. 51 are represented by the following expressions.

1) $S_1(t) = A(t-\tau)P(t-\tau) \cos \omega_1(t-\tau)$

2) $S_2(t) = P(t) \cos \omega_1 t$

3) $S_3(t) = S_1(t) + S_2(t) = A(t-\tau)P(t-\tau) \cos \omega_1(t-\tau) + P(t) \cos \omega_1(t)$ 4) $S_4(t) = S_3(t) \times \cos \omega_2(t)$  (56)

Here, when RF term only is extracted, then $= \frac{1}{2}\{A(t-\tau)P(t-\tau) \cos ((\omega_1+\omega_2)t - \omega_1\tau) + P(t) \cos ((\omega_1+\omega_2)t)\}$  (57)

Therefore, the result is a sum signal of two waves delayed by $\tau$ in time.

The signals on the receiver side will be described.

5) $S_5(t) = S_4(t) \times \cos \omega_3 t$  (58)

(provided that there is no delay between the transmission and reception).

$= \frac{1}{2}\{A(t-\tau)P(t-\tau) \cos ((\omega_1+\omega_2)t - \omega_1\tau) \cdot \cos \omega_3(t) + P(t) \cos ((\omega_1+\omega_2)(t)) \cdot \cos \omega_3(t)\}$  (59)

When only the intermediate frequency signal is extracted, it is represented as $= \frac{1}{4}\{A(t-\tau)P(t-\tau) \cos ((\omega_1+\omega_2-\omega_3)t - \omega_1\tau) + P(t) \cos (\omega_1+\omega_2-\omega_3)t\}$ 6) $S_6(t) = S_5(t)$ $S_7(t) = \frac{1}{4}\{A(t-2\tau)P(t-2\tau) \cos ((\omega_1+\omega_2-\omega_3)(t-\tau) - \omega_1\tau) + P(t-\tau) \cos ((\omega_1+\omega_2-\omega_3)(t-\tau))\}$ 8) $S_8(t) = S_6(t) \times \cos \omega_4 \tau$  (60)

When the only the baseband signal is taken out, it is represented as $= \frac{1}{8}\{A(t-\tau)P(t-\tau) \cos ((\omega_1+\omega_2-\omega_3-\omega_4)t - \omega_1\tau) + P(t) \cos ((\omega_1+\omega_2-\omega_3-\omega_4)t)\}$  (61)

Further, when it is assumed that $\omega_1 + \omega_2 - \omega_3 - \omega_4 = \Delta\omega$, the base signal is represented as $= \frac{1}{8}\{A(t-\tau)P(t-\tau) \cos (\Delta\omega t - \omega_1\tau) + P(t) \cos (\Delta\omega t)\}$  (62)

Similarly, the signals 9), 10) and 11) are represented as follows.

9) $S_9(t) = \frac{1}{8}\{-A(t-\tau)P(t-\tau) \sin (\Delta\omega t - \omega_1\tau) P(t) \sin (\Delta\omega t)\}$ 10) $S_{10}(t) = \frac{1}{8}\{A(t-2\tau)P(t-2\tau) \cos (\Delta\omega t - (2\omega_1+\omega_2-\omega_3)\tau) + P(t-\tau) \cos (\Delta\omega t - (\omega_1+\omega_2-\omega_0)\tau)\}$ 11) $S_{11}(t) = \frac{1}{8}\{-A(t-2\tau)P(t-2\tau) \sin (\Delta\omega t - (2\omega_1+\omega_2-\omega_3)\tau) + P(t-\tau) \sin (\Delta\omega t - (\omega_1+\omega_2-\omega_0)\tau)\}$  (63)

Figure 53A:
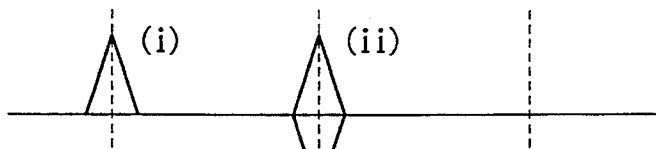
FIG. 53 is a diagram of output waveform of a correlator shown in FIG. 52.
Figure 53B:
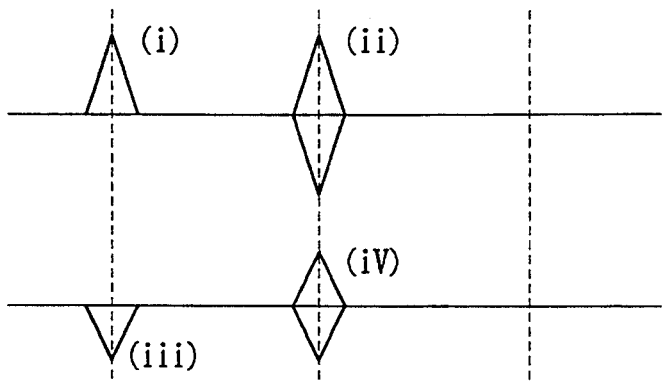
Figure 53D:
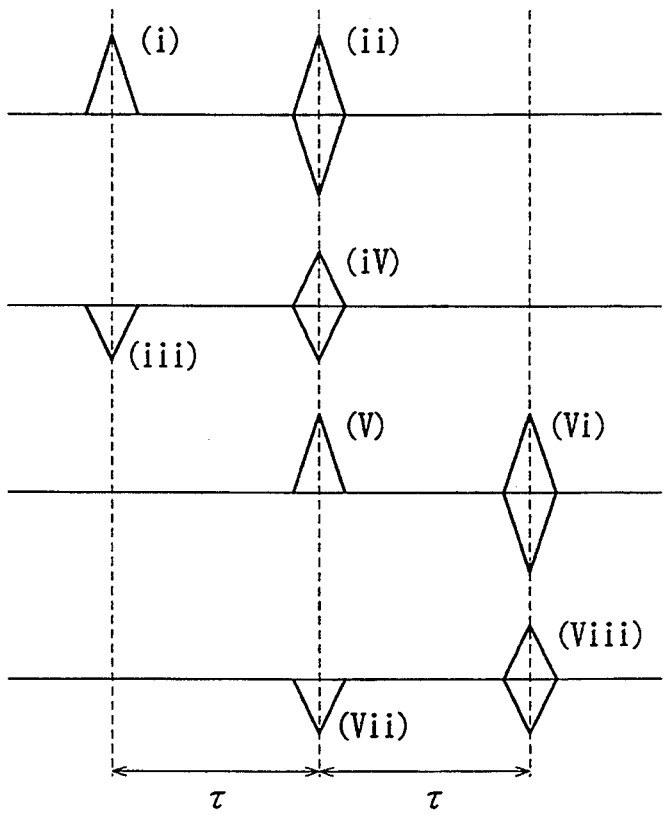

The above mentioned signals 8) to 11) are input to correlators 167, 168, 169 and 170. FIG. 53 shows waveforms of outputs from the correlators shown in FIG. 52. The output waveforms from correlators 167, 168, 169 and 170 shown in FIG. 52 are as shown by FIG. 53(a), (b), (c) and (d). Among these, the data component is included in the delayed signals, and therefore the data value assumes 1 or $-1$.

Figure 53E:
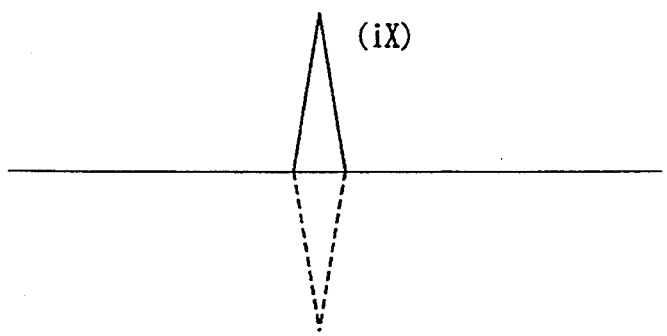
Figure 53F:
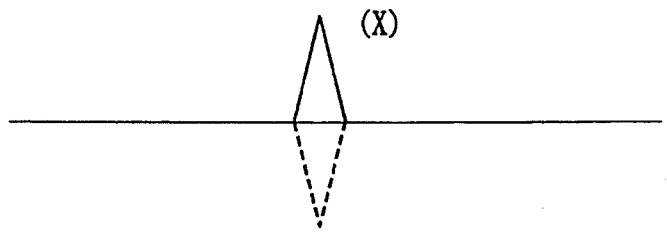

Since multiplier 171 multiplies the outputs a and c of correlators 167 and 169, the output therefrom is as shown in FIG. 53(e). Since multiplier 72 multiplies outputs b and d from correlators 168 and 170, the output therefrom is as shown in FIG. 53(f). If data is 1, the output will be as shown by the solid by of FIG. 53(a) and (b), while if the data is 0, the output will be as shown by the dotted line.

The outputs (i) to (viii) from the correlators shown in FIG. 53 are respectively represented by the following expressions, where the absolute value is normalized to 1.

(i) $\cos \Delta \omega t$ (ii) $A(t) \cos (\Delta \omega t - \omega_1 \tau)$ (iii) $-\sin \Delta \omega t$ (iv) $-A(t) \sin (\Delta \omega t - \Delta \omega_1 \tau)$ (v) $\cos (\Delta \omega t - (\omega_1 + \omega_2 - \omega_3)\tau)$ (vi) $A(t) \cos (\Delta \omega t - (2\omega_1 + \omega_2 - \omega_3)\tau$ (vii) $-\sin (\Delta \omega t - (\omega_1 + \omega_2 - \omega_3)\tau)$ (viii) $-A(t) \sin (\Delta \omega t - (2\omega_1 + \omega_2 - \omega_3)\tau)$ (ix) is (ii) x (iv), that is, (x) $A(t) \cos (\Delta \omega t - \omega_1 \tau) \times \cos (\Delta \omega - (\omega_1 + \omega_2 - \omega_3)\tau)$ (64)

When it is assumed that $\omega_2 - \omega_3 \simeq 0$, it holds $(\omega_1 + \omega_2 - \omega_3)\tau \simeq \omega_1 \tau$. Therefore, $$= A(t)\cos^2(\Delta \omega t - \omega_1 \tau) \quad (65)$$

(xi) $A(t)\sin(\Delta \omega t - \omega_1 t) \times$ $$\sin(\Delta \omega t - (\omega_1 + \omega_2 - \omega_3)\tau) = A(t)\sin^2(\Delta \omega t - \omega_1 t)$$

Therefore, when the outputs (x) and (xi) of multipliers 171 and 172 are added by the adder 173, the result will be as shown by the following expression.

(x)+(xi)=$A(t) \cos^2(\Delta \omega t - \omega_1 \tau) + A(t) \sin^2(\Delta \omega t - \omega_1 - \omega_1 \tau) = A(t)(\cos^2(\Delta \omega t - \omega_1 \tau) + \sin^2(\Delta \omega t - \omega_1 \tau) = A(t)$ (66)

Accordingly, data component can be obtained as the output.

As described above, by the twentieth embodiment of the present invention, a carrier synchronization loop, which has been necessary in the prior art becomes unnecessary, and data can be demodulated without carrier synchronization. Therefore, the drawback of the prior art that data demodulation can not be done until carrier is recovered at the time of disconnection or reconnection of channels caused by multipath fluctuation can be solved as the time loss becomes 0 by this embodiment, and therefore interruption of data can be limited to the actual time of disconnection even in a channel in which disconnection occurs frequently.

Further, in the output data, unlike the prior art, there is no uncertainty of data caused by carrier phase, and therefore stable absolute data can be obtained.

FIGS. 54(a) to (f) show waveforms when there are multipath fading in the channels and correlated outputs are spread with delay. For each of FIGS. 54(a) to (f), since the delay time can be regarded as identical as it is quite short, outputs such as shown in FIGS. (e) and (f) can be obtained. At this time, since all signals generated by multipaths are demodulated, it can be seen that there is the effect of PDI.

Further, prior to FIGS. 54(e) and (f), the waveforms of the (i) and (iii) outputs of FIGS. 54(a) and (b) can be predicted, and therefore conditions for filtering and time window for data demodulation of the outputs (ix) and (x) can be made optimal in accordance with the prediction, which provides improved bit error rate.

Figure 54:
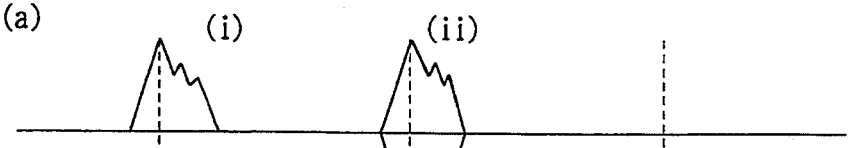
FIG. 54 is a diagram of waveforms of various portions of the embodiment shown in FIG. 52.
Figure 54:
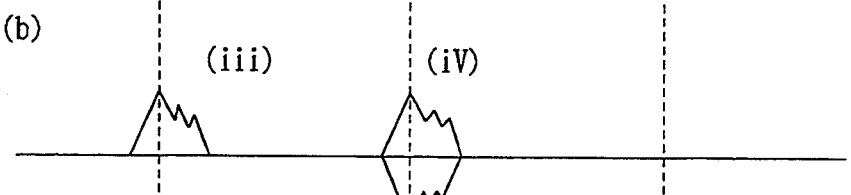
Figure 54:
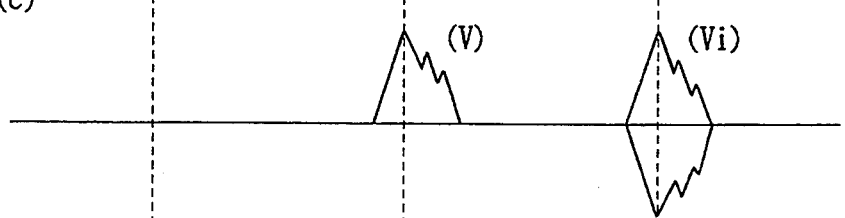
Figure 54:
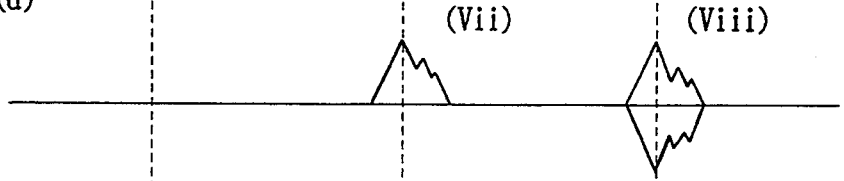
Figure 54:
Figure 54:
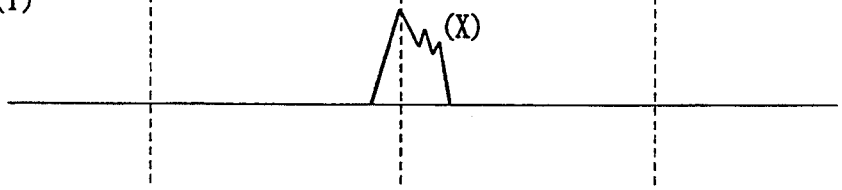

Further, in this embodiment, as is apparent from FIG. 53, correlation with respect to the codes and the timings of correlated outputs such as (a) and (c) and (b) and (d) coincide simultaneously, resulting in such outputs as shown in FIG. 54. In other words, if the code does not coincide or if the correlation timing does not coincide, there is no output. Therefore, by allotting these two as parameters to users, the number of channels can be increased as compared with the CDMA in which the code only is used as the parameter. Therefore, as compared with the prior art in which there are only 18 types of codes in 127 chips and only the corresponding number of users, the number of users can be match increased.

Figure 55:
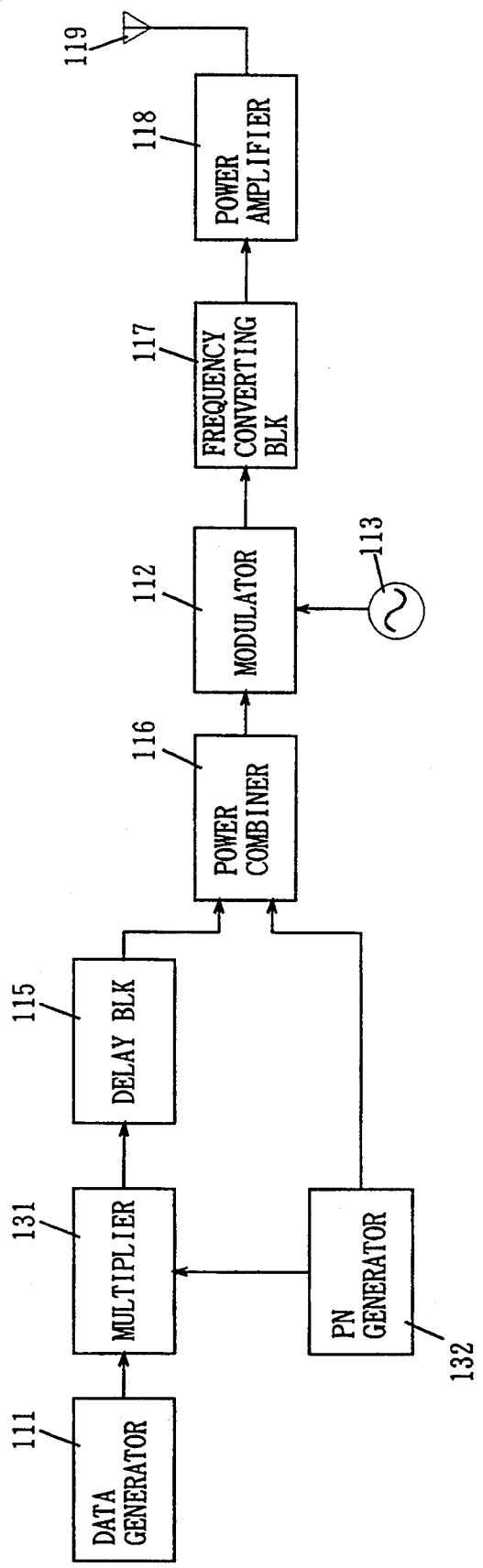
FIG. 55 is a schematic block diagram of a transmitter in accordance with the twenty-first embodiment of the present invention.
Figure 56:
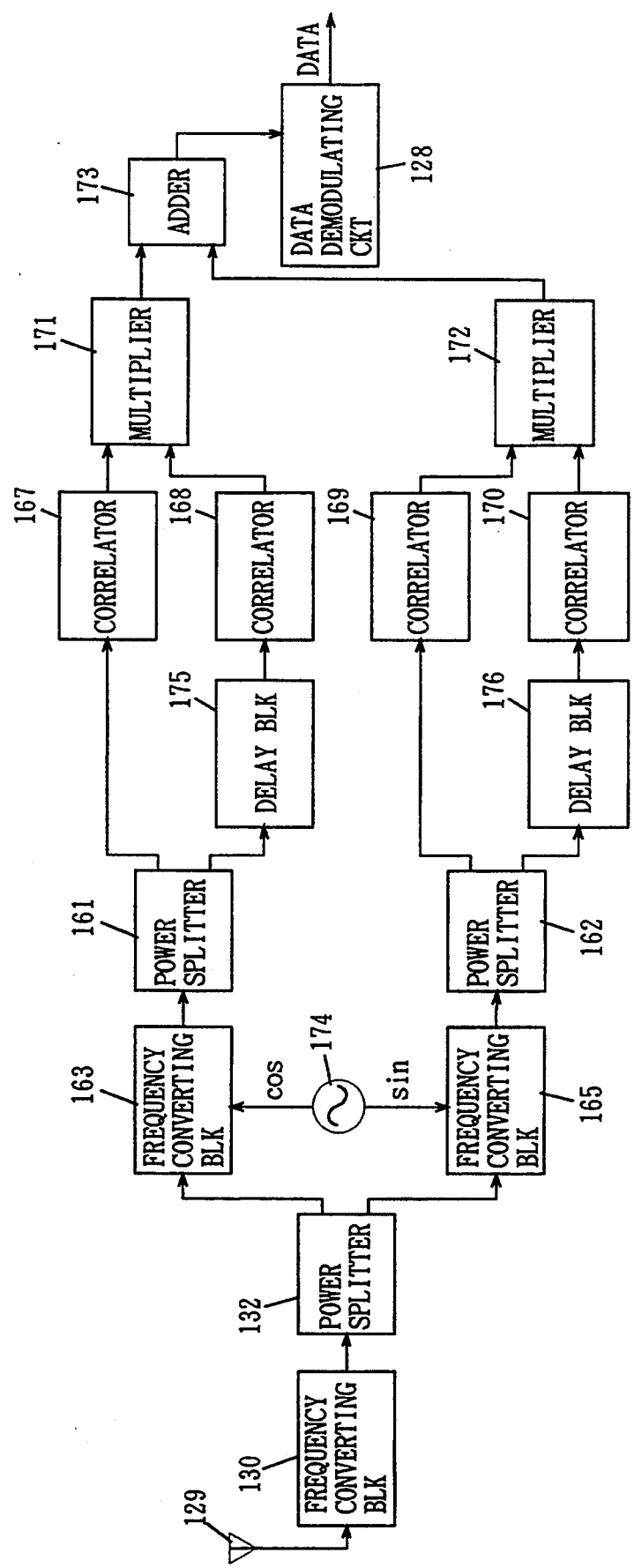
FIG. 56 is a schematic block diagram of a receiver in accordance with the twenty-first embodiment of the present invention.

FIGS. 55 and 56 shows the twenty-first embodiment of the present invention in which FIG. 55 shows the transmitter and FIG. 56 shows the receiver. The twenty-first embodiment differs from the twentieth embodiment described above in that the delay element 115 operates on the basis of the nearly baseband signal. More specifically, referring to FIG. 55, a signal generated by data generating block 111 is multiplied by a PN code generated in PN generator 132 at a multiplier 131. The output signal from multiplier 131 is delayed by delay element 115, while the PN code is combined with the output from delay element 115 by power combiner 116. Further, combined signal modulates a local signal 113 at modulator 112. The modulated signal has its frequency converted to the RF band by frequency converting block 117, amplified by power amplifier block 118, and is transmitted from antenna 119.

In the receiver, the signal is received by an antenna 129 and it is converted to an intermediate frequency signal by frequency converting block 130. The intermediate frequency signal is split by power splitter 132, and split signals have their frequencies converted by frequency converting blocks 163 and 165 using sin and cos components of local signal 174, respectively, and resulting signals are each split by splitters 161 and 162. One of the signals split by splitter 161 is directly input to correlator 167, while the other is input through delay element 175 to correlator 168, and thus correlated outputs are provided from correlators 167 and 168. One of the split signals split by the power splitter 162 is input to correlator 169, while the other is applied through delay element 176 to correlator 170. Thus, correlated signals are obtained from correlators 169 and 170. Thereafter, multipliers 171 and 172, adder 173 and data demodulating circuit 128 operate in the similar manner as described with reference to FIG. 52, and the data is demodulated. The flow of the above mentioned signals will be described. When data signals and local signals are represented in the similar manner as in the twentieth embodiment, the signals 1) to 5) of FIG. 55 are represented by the following equations.

1) $S_1(t) = A(t-\tau)P(t-\tau)$

2) $S_2(t) = P(t)$

3) $S_3(t)=S_1(t)+S_2(t)=A(t-\tau)P(t-\tau)+P(t)$

4) $S_4(t)=S_3(t) \cos \omega_1 t = A(t-\tau)P(t-\tau) \cos \omega_1 t + P(t) \cos \omega_1 t$ 5) $S_5(t)=S_4(t) \times \cos \omega_2 t$ (67)

Here, when only the RF term is taken out, it will be represented as $= \frac{1}{2}\{A(t-\tau)P(t-\tau) \cos (\omega_1+\omega_2)t + P(t) \cos (\omega_1+\omega_2)t\}$ The above equation represents the signal transmitted from the transmitter, the signals in the receiver will be described.

6) $S_6(t)=S_5(t) \times \cos \omega_3 t$ (69)

(provided that there is no delay between transmission and reception).

Here, when the intermediate frequency signal only is taken out, it is represented as $= \frac{1}{2}\{A(t-\tau)P(t-\tau) \cos (\omega_1+\omega_2-\omega_3) t + P(t) \cos (\omega_1+\omega_2-\omega_3)t\}$ 7) $S_7(t)=S_6(t) \times \cos \omega_4 t$ (70)

When the baseband signal only is taken out, it is represented as $= \frac{1}{2}\{A(t-\tau)P(t-\tau) \cos (\omega_1+\omega_2-\omega_3-\omega_4)t + P(t) \cos (\omega_1+\omega_2-\omega_3-\omega_4)t\}$ (71)

When we represent $\omega_1+\omega_2-\omega_3-\omega_4=\Delta\omega$, the baseband signal can be represented by the following equations.

$= \frac{1}{2}\{A(t-\tau)P(t-\tau) \cos \Delta\omega t + P(t) \cos \Delta\omega t\}$ 8) $S_8(t)=S_6(t) \times \sin \omega_4 t$ $= \frac{1}{2}\{-A(t-\tau)P(t-\tau) \sin \Delta\omega t - P(t) \sin \Delta\omega\}$ 9) $S_9(t)=\frac{1}{2}\{A(t-\tau)P(t-\tau) \cos \Delta\omega t + P(t) \cos \Delta\omega t\}$ 10) $S_{10}(t)=\frac{1}{2}\{A(t-2\tau)P(t-2\tau) \cos (\Delta\omega(t-\tau)+P(t-\tau) \cos \Delta\omega(t-\tau)\}$ 11) $S_{11}(t)=\frac{1}{2}\{-A(t-\tau)P(t-\tau) \sin \Delta\omega t - P(t) \sin \Delta\omega t\}$ 12) $S_{12}(t)=\frac{1}{2}\{-A(t-2\tau)P(t-2\tau) \sin \Delta\omega(t-\tau)-P(t-\tau) \sin \Delta\omega(t-\tau)\}$ (72)

Since signals based on the equations 9) to 12) above are input to correlators 167 to 170, the same output as in the twentieth embodiment above can be obtained.

The correlator outputs (i) to (viii) of FIG. 54 are represented as follows, where the absolute value is normalized to 1.

(i) $\cos \Delta\omega t$ (ii) $A(t-\tau) \cos \Delta\omega t$ (iii) $\cos \Delta\omega(t-\tau)$ (iv) $A(t-2\tau) \cos \Delta\omega(t-\tau)$ (v) $-\sin \Delta\omega t$ (vi) $-A(t-\tau) \sin \Delta\omega t$ (vii) $-\sin \Delta\omega(t-\tau)$ (viii) $-A(t-2\tau) \sin \Delta\omega(t-\tau)$ (73)

Here, in multiplier 171 of FIG. 56, (ii)×(iii) described above constitutes a main component, while in the output of multiplier 172, (vi)×(vii) becomes the main component.

(ii)×(iii)$=A(t-\tau) \cos \Delta\omega t + \cos \Delta\omega(t-\tau)$ (74)

When $\tau$ is small, it can be considered that $\cos \Delta\omega \approx \cos \Delta\omega(t-\tau)$, and therefore $= A(t - \tau)\cos^2 \Delta\omega t$ (75)

(vi) × (vii) =

$-A(t - \tau)\sin\Delta\omega t \times (-\sin\Delta\omega(t - \tau)) = A(t - \tau)\sin^2\Delta\omega t$ Since the output from adder 173 is (ii)×(iii)+(vi)×(vii), it can be represented as $= A(t - \tau) \{\sin^2\Delta\omega t + \cos\Delta\omega t\}$
$= A(t - \tau)$ (76)

Therefore, data component can be obtained as an output from data demodulating circuit 128.

As described above, in this twenty-first embodiment also, data can be demodulated in the similar manner as in the twentieth embodiment, and the same effect as in the twentieth embodiment can be obtained.

Figure 57:
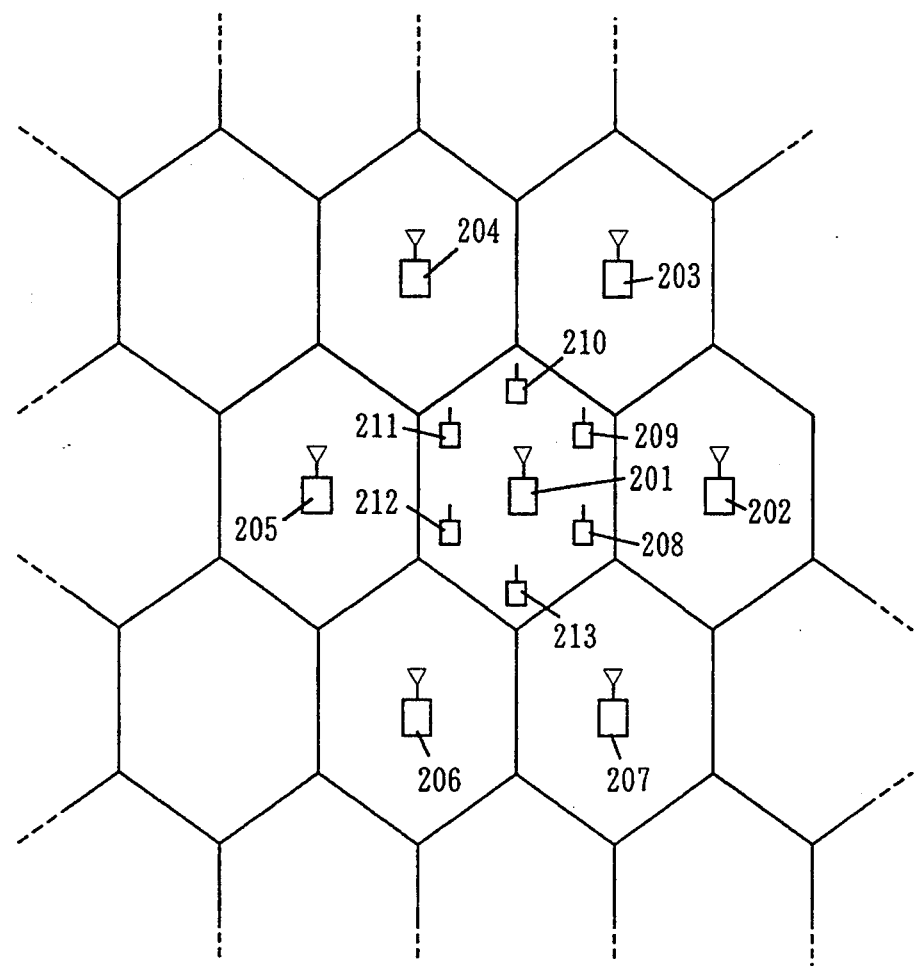
FIG. 57 shows the twenty-second embodiment of the present invention.

FIG. 57 shows the twenty-second embodiment of the present invention. Conventionary, radio communication system has been frequently used in the form of a network. In such a case, a service area is divided into cells as shown in FIG. 57, and for each cell, several terminal stations are provided. In other words, base stations 201 to 207 are provided for respective cells, and in the cell in which base station 201 is deposited, terminal stations to 213 are provided. There are similar terminal stations in other cells.

In this case, at the vicinity of border lines between cells, the electric field strength of the base station 201 which is required becomes approximately the same as that of the adjacent base station 202, causing interference. Therefore, in the conventional SS, it was necessary to use separate codes in adjacent cells. When there are 6 adjacent cells and each cell includes 6 terminals, then (6+1)×6=42 codes are necessary, which is impractical.

However, in the embodiment of the present invention, cells can be separated from each other by using separate codes in respective cells and the terminal stations can be discriminated from each other by using the difference in the amount of delay in each cell. In that case, the number of necessary codes is only 7, and therefore codes can be readily prepared even if the sequence has only 127 chips.

In addition, since terminals can be discriminated from each other by the amount of delay in the cell, management in the cell can be carried out independent from adjacent cells. Therefore, the terminal stations can be freely increased or decreased, which facilitates network management. Alternately, cells can be separated by using different amounts of delay and the terminals can be discriminated from each other by using different codes in each cell. In this manner, by this embodiment, radio communication system in the form of a network can be easily prepared, and flexible system can be realized.

Figure 58:
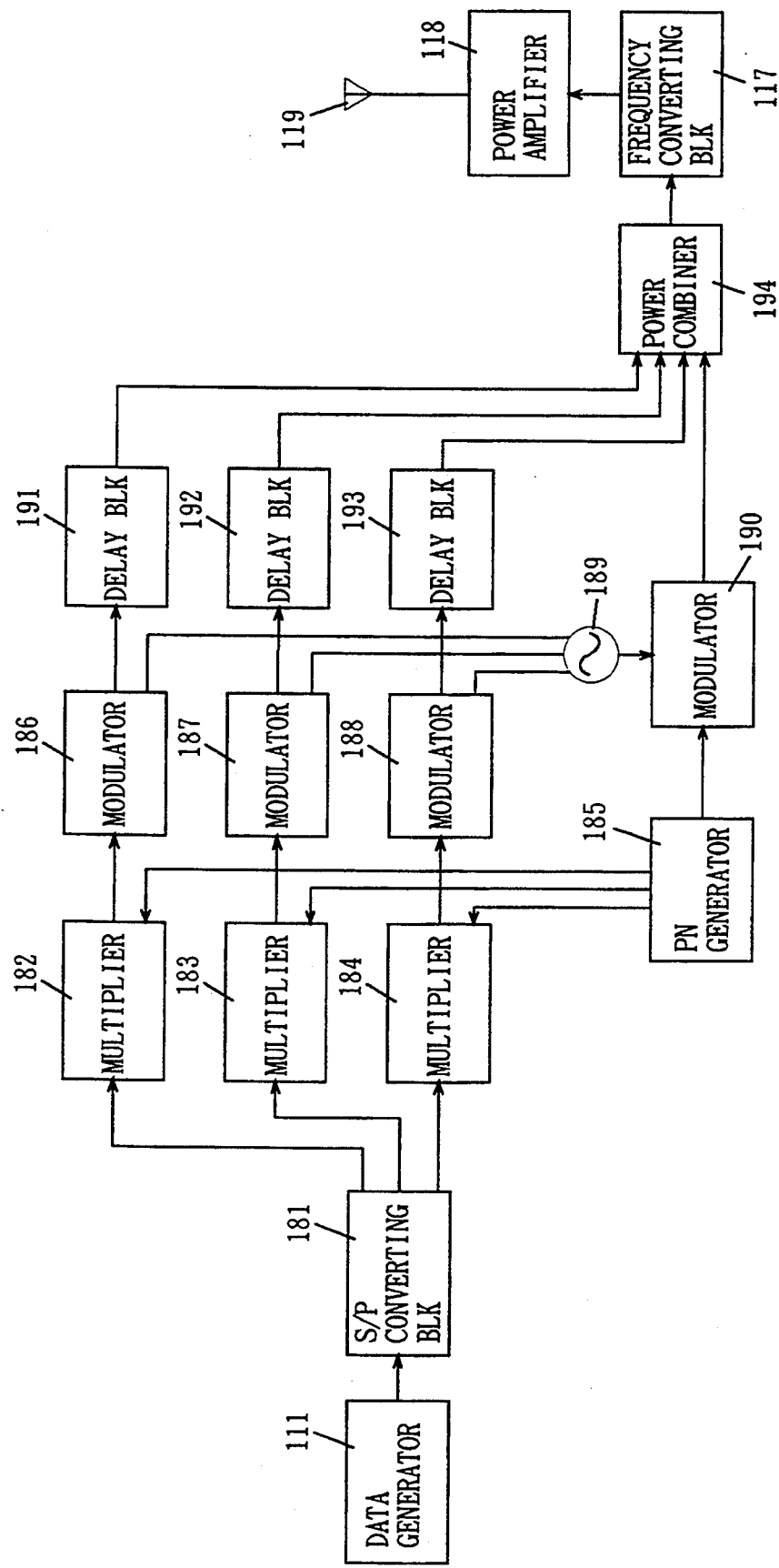
FIG. 58 is a schematic block diagram of a transmitter in accordance with the twenty-third embodiment of the present invention.
Figure 59:
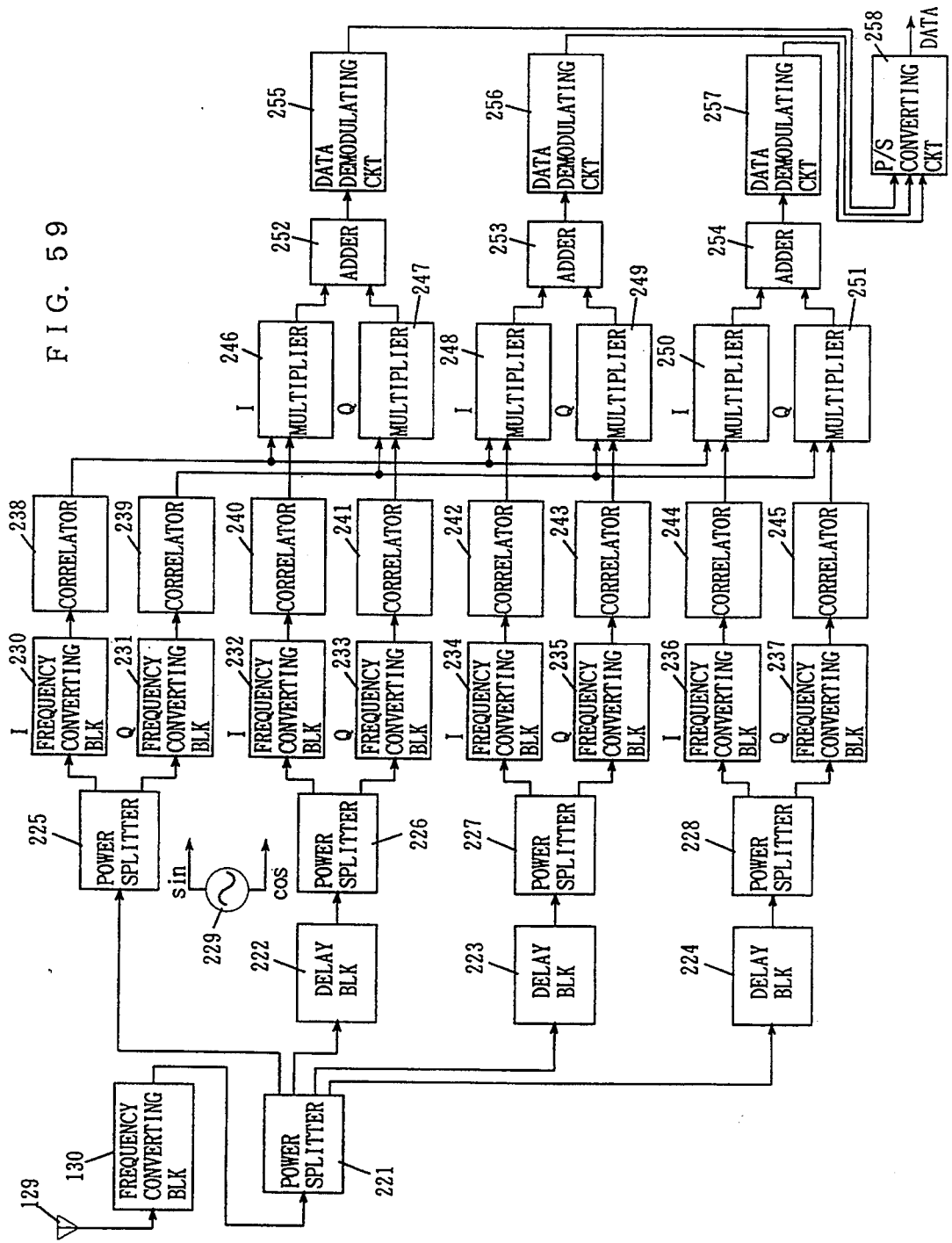
FIG. 59 is a schematic block diagram of a receiver in accordance with the twenty-third embodiment of the present invention.

FIGS. 58 and 59 are block diagrams showing the twenty-third embodiment of the present invention in which FIG. 58 shows the transmitter and FIG. 59 shows the receiver. As compared with the twentieth embodiment, the twenty-third embodiment is directed to increase of the amount of information to be transmitted. More specifically, referring to FIG. 58, data generated by data generating block 111 is converted, for example, to a parallel signal of 3 bits by a serial/parallel (S/P) converter 181. The parallel signals thus converted are multiplied by the same PN code from PN generator 185 by multipliers 182, 183 and 184, respectively, then the signals modulate carrier 189 by PSK modulation at modulators 186, 187 and 188, and the results are applied to power combiner 194 through delay elements 191, 192 and 193 having different delay times ($\tau_1$, $\tau_2$, $\tau_3$), respectively. The PN code is directly applied to modulator 190, PSK-modulates carrier 189, and combined with the outputs from delay elements 191, 192 and 193 by power combiner 194. The output from power combiner 190 has its frequency converted to be a RF signal by frequency converting block 117, amplified by power amplifier block 118, and then transmitted from antenna 119.

In the receiver shown in FIG. 59, the signal is received by an antenna 129, converted to an intermediate frequency signal by frequency converting block 130, and then it is split into four by power splitter 221. One of the split signals is directly applied to a power splitter 225, and other three split outputs are delayed by delay elements 222, 223 and 224 having the same delay times ($\tau_1$, $\tau_2$, $\tau_3$) as the delay elements 191, 192 and 193 on the transmitter side, to be applied to power splitters 226, 227 and 228, respectively. Split outputs from splitters 225, 226, 227 and 228 have their frequencies converted by frequency converting blocks 230, 231, 232, 233, 234, 235, 236 and 237 by using sin and cos components of the local signal 229, to be input to correlators 238, 239, 240, 241, 242, 243, 244 and 245. Those outputs from correlators 238 to 245 which are not delayed are multiplied by those which have been delayed by $\tau_1$, $\tau_2$, $\tau_3$, respectively for each of the I and Q components in multipliers 246 to 251, outputs from multipliers are added by adders 252 to 254, the results are subjected to data demodulation by data demodulating circuits 225 and 256, then the result is converted to a serial signal by a parallel/serial (P/S) converter 258, and thus data is obtained.

Figure 60:
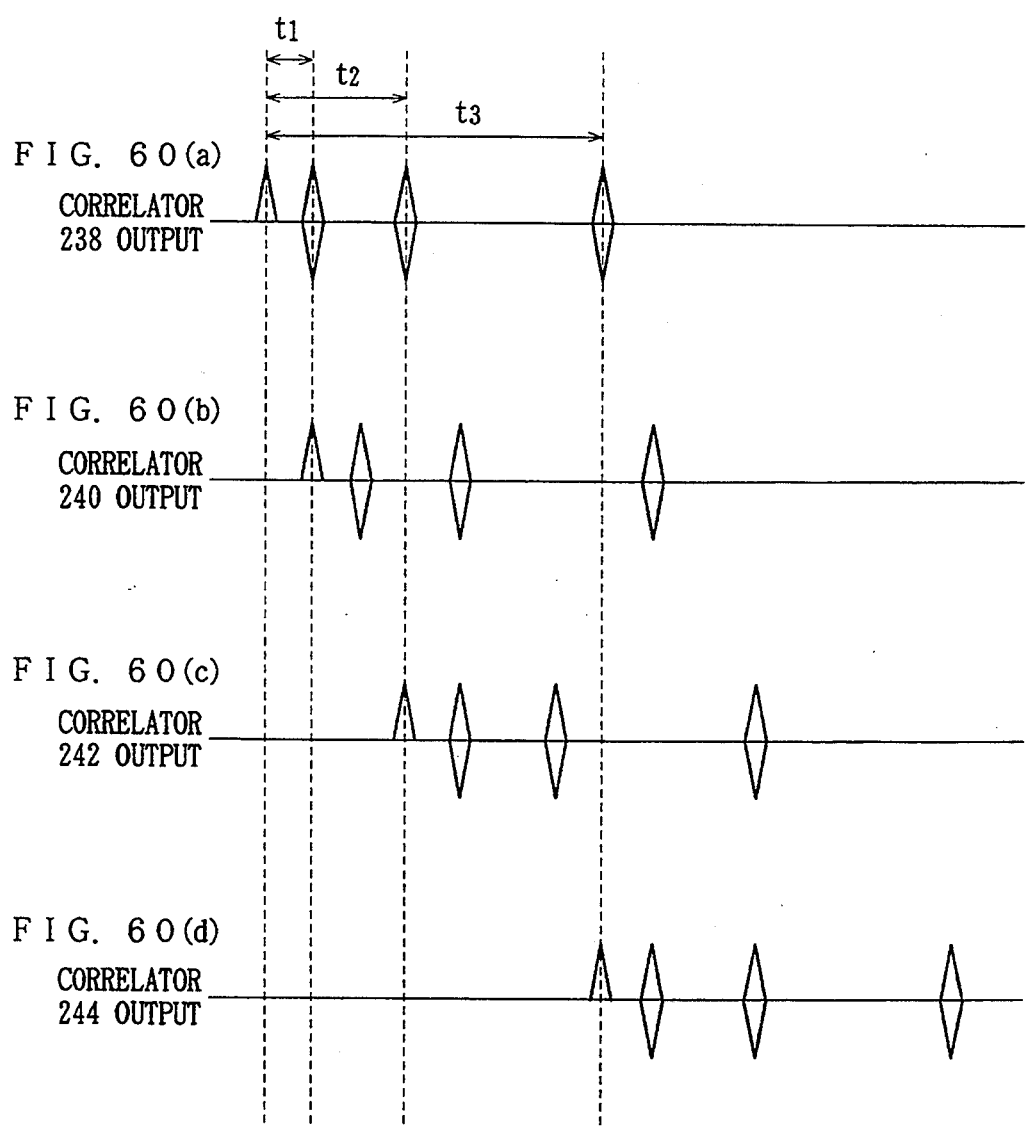
FIG. 60 is a diagram of waveforms at various portions of FIG. 59.

FIG. 60 shows only the I component of the output waveforms from the correlators of FIG. 59. With respect to the outputs from correlators shown in FIG. 60(a) to (t), multiplier 246 multiplies the outputs from correlators 238 and 240, multiplier 248 multiplies the outputs from correlators 238 and 242, and multiplier 250 multiplies the outputs from correlators 238 and 244. Consequently, data delayed by $\tau_1$ is output from multiplier 246, data delayed by $\tau_2$ is output from multiplier 248, and data delayed by $\tau_3$ is output from multiplier 258.

Similar data can be obtained for the Q component, and therefore by adding and demodulating the same, data can be obtained respectively, as in the twentieth embodiment described above. Thereafter, by P/S converter 258, serial data is output.

As described above, by this embodiment, three times as match information as compared with twentieth embodiment can be transmitted by occupying the same band. Further, since the amount of data can be changed from one to three times arbitrarily by using the same circuitry dependent on the quality of channel, a large amount of data can be transmitted when C/N is superior, while the amount of data can be reduced when C/N is degraded by some cause or other. Therefore, the amount of transmission can be flexibly changed by using the same transmission band, the same circuitry and the same power.

There are three parallel data in the twenty-third embodiment, the number of data is not limited thereto. Further, in this twenty-third embodiment also, the effect of PDI can be obtained when there are channel multipaths and correlated outputs are spread with delay as in the twentieth embodiment.

Further, in the similar manner as in the twentieth embodiment, by using correlator outputs which are output at earlier timing than the demodulation signal, integrators, filtering or time window of data demodulating circuits 255 to 257 can be controlled, thereby improving bit error rate.

Figure 61:
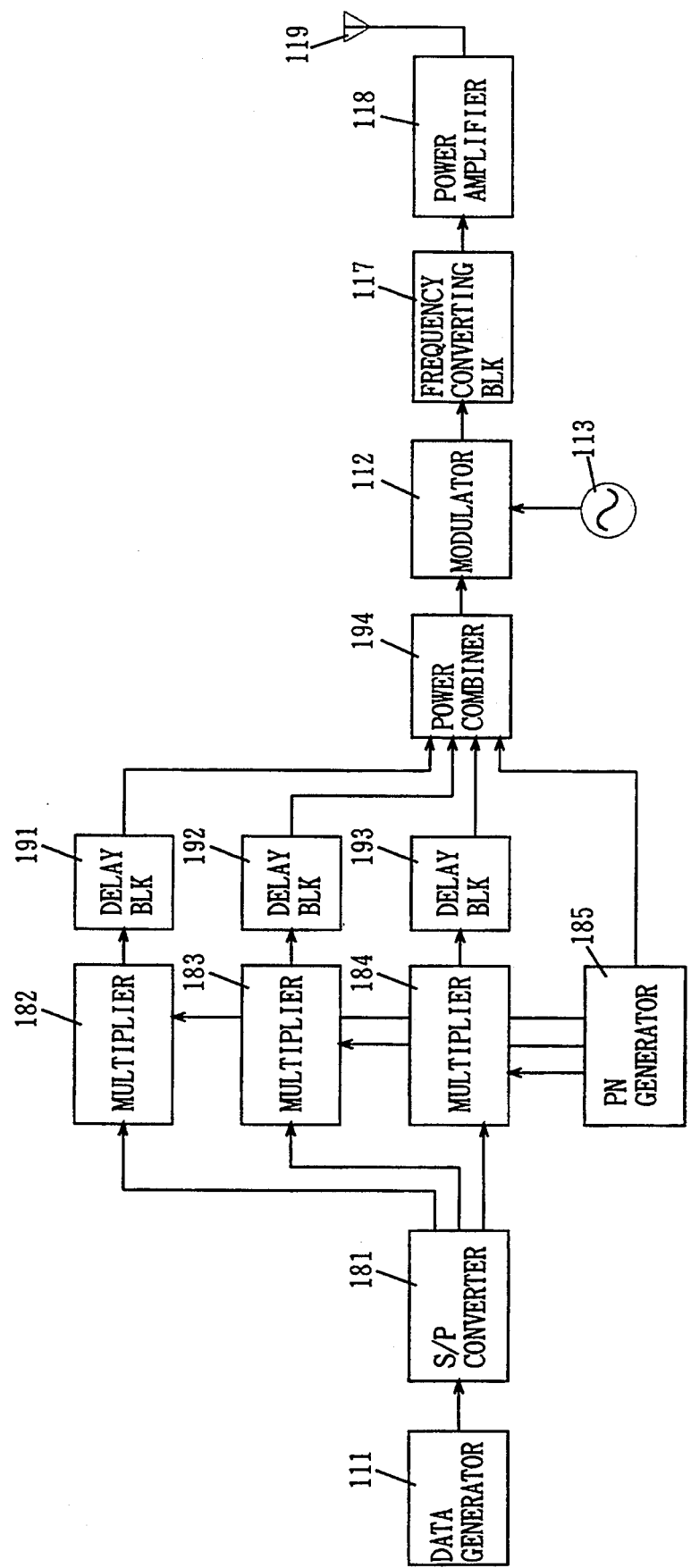
FIG. 61 is a schematic block diagram of a transmitter in accordance with the twenty-fourth embodiment of the present invention.
Figure 62:
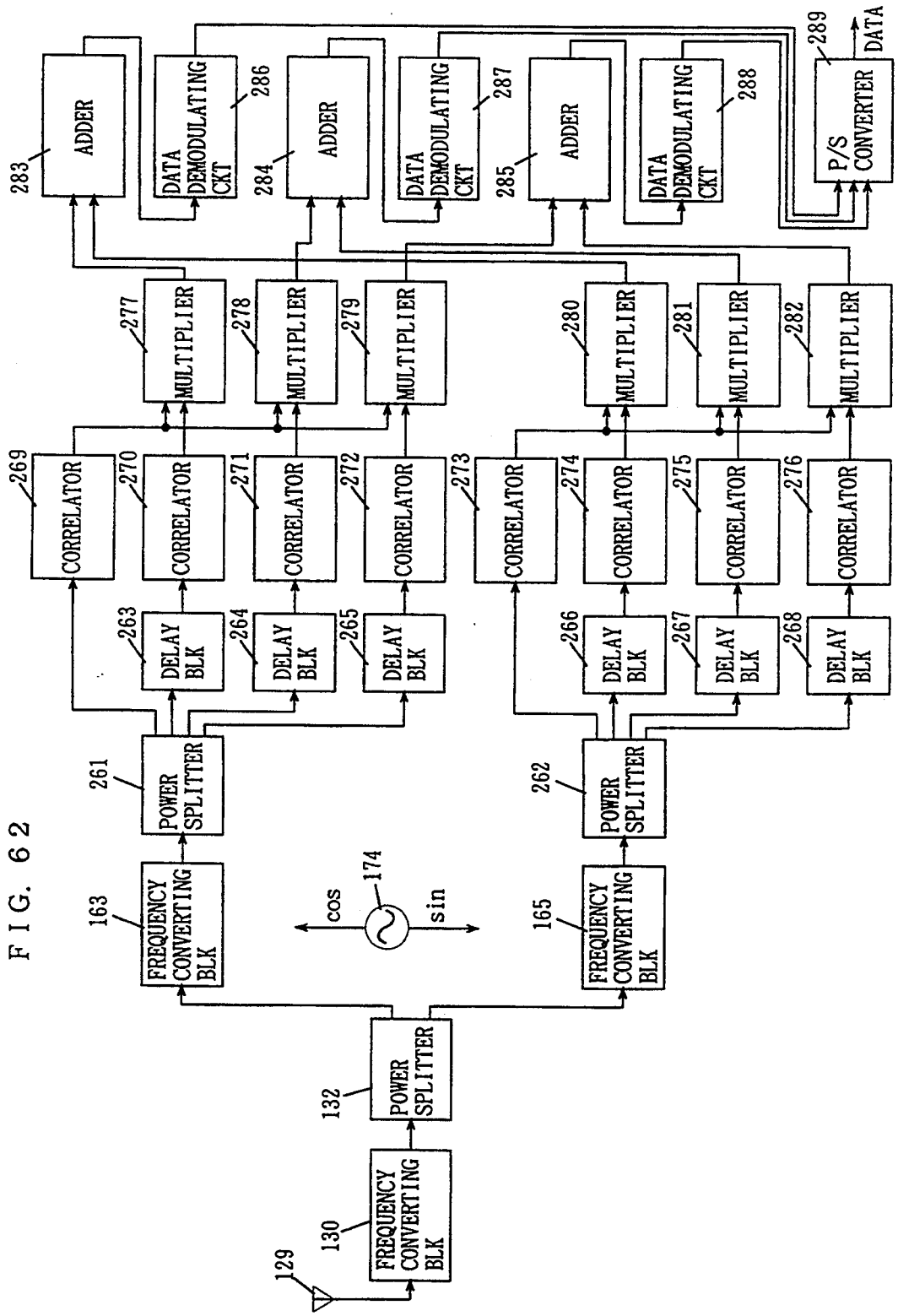
FIG. 62 is a schematic block diagram of a receiver in accordance with the twenty-fourth embodiment of the present invention.

FIGS. 61 and 62 shows the twenty-fourth embodiment of the present invention in which FIG. 61 shows the transmitter and FIG. 62 shows the receiver. As compared with the twenty-first embodiment shown in FIGS. 55 and 56, this embodiment is directed to increase of the amount of information to be transmitted. More specifically, as shown in FIG. 61, data generated by data generating block 111 is subjected to serial/parallel conversion by S/P converter 181 to be parallel data of 3 bits. These parallel data are multiplied by a PN code generated by PN generator 185 in multipliers 182, 183 and 184, applied through power combiner 194 to be combined through delay elements 191, 192 and 193 having different delay times $\tau_1$, $\tau_2$, $\tau_3$, modulated by modulator 112, converted to an RF signal by frequency converting block 117, amplified by power amplifier block 118, and the resulting signal is transmitted from antenna 119.

In the receiver shown in FIG. 62, the signal received by antenna 129 is converted to an intermediate frequency signal by frequency converting block 132, split by power splitter 132, and then converted to nearly baseband signal having I and Q components by frequency converting blocks 163 and 165. The nearly base signals having I and Q components are respectively split into four by splitters 261 and 262, one of which is directly input to correlators 268 and 273, and remaining signals are delayed by delay element 263, 264, 265, 266, 267 and 268 having the same delay times $\tau_1$, $\tau_2$ and $\tau_3$ as in the transmitter side to be input to correlators 270 to 272 and 274 to 276. At this time, outputs from correlators 269 to 272 and 273 to 275 are the same as those described with reference to FIG. 60. Outputs from correlators 269 to 272 are multiplied by multipliers 277 to 279, while outputs from correlators 273 to 276 are multiplied by multipliers 280 to 282. Further, outputs from multipliers 277 to 279 and 280 to 282 are added by adders 283, 284 and 285, subjected to data demodulation by data demodulating circuits 286, 287 and 288, thereafter converted to serial data by parallel/serial converter 289, and thus demodulated data can be obtained.

As described above, by the present embodiment, three times as much information can be transmitted by using the same occupation band as in the twenty-second embodiment described above. Further, since the amount can be changed from one to three times as desired dependent on the quality of channels, the amount of transmission can be flexibly controlled. In addition, the number of parallel data is not limited as in the twenty-second embodiment. In addition, the PDI effect is also obtained as in the above described embodiment, and means for improving bit error rate such as control of filtering time window or integrator of data demodulating circuits 286, 287 and 288 may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a spread spectrum communication system, a method comprising the steps of:
    transmitting, in combination, a first signal modulated by a PN code and data and a second signal modulated only by said PN code and thereafter delayed with respect to said first signal by a time period corresponding to at least one chip of said PN code;
    receiving and splitting into third and fourth signals said transmitted signals;
    delaying by said time period one of the third and fourth signals; and
    multiplying the delayed one of the third and fourth signals by the other to demodulate the data by despreading.

2. An apparatus for communication employing a spread spectrum communication system, comprising:
    a transmitter for transmitting, in combination, a first signal modulated by a PN code and data and a second signal modulated only by said PN code and thereafter delayed with respect to said first signal by a time period corresponding to at least one chip of said PN code;
    a receiver for splitting a received signal into third and fourth signals, delaying one of the third and fourth signals by said time period, and multiplying the delayed one of the third and fourth signals with the other to despread and demodulate the data.

3. The apparatus for communication according to claim 2, wherein
    said transmitter includes:
    PN code generating means for generating said PN code;
    multiplier means for multiplying input data by the PN code generated by said PN code generating means;
    first modulating means for modulating a carrier wave signal of a prescribed frequency by an output signal from said multiplier means;
    second modulating means for modulating said carrier wave signal of the prescribed frequency by the PN code generated by said PN code generating means;
    first delay means for delaying the modulated signal modulated by said second modulating means; and
    combining means for combining said signal modulated by said first modulating means and said signal delayed by said first delay means; and
    said receiver includes:
    frequency converting means for receiving the signal transmitted from said transmitter and converting frequency of the signal to provide an intermediate frequency signal;
    second delay means for delaying the intermediate frequency signal output from said frequency converting means; and
    data demodulating means for multiplying the intermediate frequency signal as the output from said frequency converting means by the output signal from said delay means to output an original data component.

4. The apparatus for communication according to claim 3, wherein
    said first and second modulating means includes BPSK modulating means.

5. The apparatus for communication according to claim 3, wherein
    said first modulating means includes first BPSK modulating means, and
    said second modulating means includes second BPSK modulating means.

6. The apparatus for communication according to claim 3, wherein said first and second modulating means include amplitude modulating means.

7. The apparatus for communication according to claim 3, wherein
    said PN code generating means includes means for generating repeatedly the PN code in a period at least twice that of the band of data to be transmitted.

8. The apparatus for communication according to claim 3, wherein
    said transmitter includes adding means for adding said input data to a reference signal to apply the result to said multiplier means, and
    said receiver includes a bandpass filter for separating and extracting data and the PN code from an output of said data demodulating means.

9. The apparatus for communication according to claim 3, wherein
    the intermediate frequency of said receiver, the delay time period of the delay means included in said transmitter and the delay time period of the delay means included in said receiver are selected to have values minimizing an unnecessary component of the output from data demodulating means represented as two variables of the intermediate frequency and the delay time period.

10. The apparatus for communication according to claim 3, wherein
    said receiver includes comb filter means connected parallel to said second delay means between said frequency converting means and said data demodulating means.

11. The apparatus for communication according to claim 5, wherein
    said transmitter includes carrier wave generating means for generating frequency hopped carrier wave signals and applying the same to said first and second BPSK modulating means.

12. An apparatus for communication according to claim 3, wherein
    said receiver includes:
    first filter means for filtering the intermediate frequency signal as the output from said frequency modulating means corresponding to a PN code generated by said PN code generating means; and
    second filter means for filtering an output signal from said second delay means corresponding to said PN code.

13. The apparatus for communication according to claim 3, wherein said data includes plural sets of mutually different data;

said multiplier means includes a plurality of multiplier means for multiplying respective sets of different data by the PN code generating means;

said second modulating means includes a plurality of second modulating means for modulating said carrier wave signal by respective ones of said plurality of multiplier means;

said first delay means includes a plurality of first delay means through which modulated signals output from said plurality of second modulating means are passed respectively; and said combining means includes means for combining the signal modulated by said first modulating means and the signal delayed by said plurality of first delay means.

14. The apparatus for communication according to claim 3, wherein
said receiver includes:
first nearly baseband signal converting means for converting frequency of said intermediate frequency signal by a signal having the same frequency as said carrier wave signal of said transmitter to provide a nearly baseband signal;
second nearly baseband signal converting means for converting frequency of the output signal from said second delay means by a signal having the same frequency as said carrier wave signal to provide a nearly baseband signal;
first correlating means for outputting a signal correlated with said PN code to said data demodulating means based on said first nearly baseband signal; and
second correlating means for outputting a signal correlated to said PN code to said data demodulating means, based on said second nearly baseband signal.

15. The apparatus for communication according to claim 14, further comprising:
loop control means responsive to the correlated output from said first correlating means for generating a control voltage; and
local oscillation means responsive to the control voltage as the output of said loop control means for generating a carrier wave signal to be applied to said first and second nearly baseband signal converting means.

16. The apparatus for communication according to claim 15, wherein
said first nearly baseband signal converting means includes third and fourth nearly baseband signal converting means provided parallel to each other for converting said intermediate frequency signal to a nearly baseband signal by the carrier wave signal generated from said local oscillation means; and
said first correlating means includes third and fourth correlating means for applying output signals related to said PN code to said loop control means based on the outputs from said third and fourth nearly baseband signal converting means respectively, with one of the output signals being applied to said data demodulating means.

17. The apparatus for communication according to claim 3, wherein
said receiver includes:
baseband signal converting means for converting the frequency of said intermediate frequency signal by a signal having the same frequency as the carrier wave signal on said transmitter side to provide a nearly baseband signal to be applied to said delay means;
first correlating means for outputting a signal correlated to said PN code to the data demodulating means, based on said nearly baseband signal; and
second correlating means for outputting a signal correlated to said PN code to said data demodulating means, based on the output from said delay means.

18. The apparatus for communication according to claim 3, wherein
said receiver includes:
first splitting means for splitting said intermediate frequency signal into a plurality of signals;
second splitting means for splitting the output signal from said second delay means into a plurality of signals;
carrier wave signal generating means for generating a carrier wave signal including first and second components;
a plurality of first nearly baseband signal converting means for multiplying a plurality of intermediate frequency signals split by said first splitting means by the first and second components included in said carrier wave signal, and for converting the multiplied outputs to the first nearly baseband signal;
a plurality of second nearly baseband signal converting means for multiplying the plurality of delay signals split by said second splitting means by the first and second components included in said carrier wave signal, and for converting the multiplied output to the second nearly baseband signal;
correlating means for outputting a plurality of correlated signals correlated with said PN code based on said plurality of first and second nearly baseband signals;
first multiplier means for multiplying a correlated output signal which is obtained by multiplying the delayed signal and said first component by a correlated output signal which is obtained by multiplying not-delayed signal by said first component, among said output signals from said correlating means;
second multiplying means for multiplying a correlated output signal which is obtained by multiplying the delayed signal by said second component, and a correlated output signal which is obtained by multiplying the not-delayed signal and said second component, among the output signals from said correlating means; and
adding means for adding outputs from said first and second multiplier means and for applying the result to said data demodulating means.

19. The apparatus for communication according to claim 18, wherein
said data includes a plurality of serial data;
said transmitter includes S/P converting means for converting said serial data to a plurality of parallel data;
multiplier means of said transmitter includes a plurality of multiplier means for multiplying respective ones of the plurality of parallel data by said PN code;

the first modulation means of said transmitter includes a plurality of first modulating means for modulating respective ones of output signals from said plurality of multiplier means;

the first delay means of said transmitter includes a plurality of first delay means for delaying output signals from said plurality of first modulating means, respectively;

said combining means includes means for combining output signals from said plurality of first delay means with the output signals from said first modulating means;

the first splitting means of said receiver includes splitting means for splitting the intermediate frequency signal into the same number as said serial data; and said receiver includes P/S converting means for converting parallel data output from said data demodulating means to serial data.

20. The apparatus for communication according to claim 2, wherein
said receiver includes:
first splitting means for splitting said intermediate frequency signal into a plurality of signals;
carrier wave signal generating means for generating a carrier wave signal including first and second components;
first nearly baseband signal converting means for multiplying one of the intermediate frequency signal split by said first splitting means by the first component included in said carrier wave signal and converting the multiplied output to a first nearly baseband signal;
second nearly baseband signal converting means for multiplying the other one of the intermediate frequency signals split by said first splitting means by the second component included in said carrier wave signal and converting the multiplied output to a second nearly baseband signal;
first delay means for delaying the output signal from said first nearly baseband signal converting means;
second delay means for delaying the output signal from said second nearly baseband signal converting means;
first correlating means for outputting a first correlated signal correlated with said PN code based on the output signal from said first nearly baseband signal converting means;
second correlating means for outputting a second correlated signal correlated with said PN code based on the output signal from said first delay means;
third correlating means for outputting a third correlated signal correlated with said PN code based on the output signal from said second nearly baseband signal converting means;
fourth correlating means for outputting a fourth correlated signal correlated with said PN code based on the output signal from said second delay means;
first multiplier means for multiplying output signals from said first and second correlating means;
second multiplier means for multiplying output signals from said third and fourth correlating means; and
demodulating means for adding output signals from said first and second multiplier means for demodulating the original data.

21. The apparatus for communication according to claim 20, wherein
said data includes a plurality of serial data;
said transmitter includes
S/P converting means for converting said serial data to a plurality of parallel data,
PN code generating means for generating a plurality of PN codes,
a plurality of multiplier means for multiplying the plurality of parallel data as the outputs from said S/P converting means by respective PN codes generated from said PN code generating means,
a plurality of first delay means for delaying respective output signals from said plurality of multiplier means,
combining means for combining respective output signals from said plurality of first delay means, and
transmitting means for modulating a carrier wave signal of a prescribed frequency by the output signal from said combining means; and
said receiver further includes
third splitting means for splitting said first nearly baseband signal corresponding to said plurality of serial data,
fourth splitting means for splitting said second nearly baseband signal corresponding to said plurality of serial data;
said first delay means includes a plurality of first delay means for delaying split signals except one as the output signals from said third splitting means;
said second delay means includes a plurality of second delay means for delaying split signals except one as the output signals from said fourth splitting means;
said second correlating means includes a plurality of second correlating means for outputting a plurality of said correlated signals correlated to said PN code based on the output signal from said plurality of first delay means;
said fourth correlating means includes a plurality of fourth correlating means for outputting a plurality of fourth correlated signals correlated to said PN code based on the output signal from said plurality of second delay means;
said first multiplier means includes a plurality of first multiplier means for multiplying said first correlated signal with the plurality of second correlated signals, respectively;
said second multiplier means includes a plurality of second multiplier means for multiplying said first correlated signal by said plurality of fourth correlated signals;
said demodulating means includes means for demodulating data by adding output signals respectively from said plurality of first multiplier means and from said plurality of second multiplier means; said apparatus further including
a P/S converting means for transmitting the parallel data demodulated by said data demodulating means to a serial data.

22. A spread spectrum communication system, comprising the steps of:

generating a first modulated signal modulated by binary digital data and a first PN code and a second modulated reference signal modulated by a second PN code having the same chip rate and the same code length as but different sequence from said first PN code, transmitting said first and second signals in combination;

receiving and splitting into third and fourth signals said transmitted signals;

filtering one of the split signals corresponding to said first PN code ;

filtering the other one of said split signals corresponding to said second PN code and multiplying respective filtered outputs to demodulate said binary digital data.

23. An apparatus for communication transmitting binary digital data employing spread spectrum communication system, comprising:

a transmitter for generating a first modulated signal modulated by said binary digital data and by a first PN code and a second modulated signal modulated by a second PN code having the same chip rate and the same code length but different sequence from said first PN code for transmitting said first and second modulated signals in combination; and a receiver receiving and splitting into two said transmitted signal, filtering one of the split signals corresponding to said first PN code, filtering the other one of said split signals corresponding to said second PN code and for multiplying respective filtered outputs to demodulate said binary digital data.

24. The apparatus for communication according to claim 23, wherein said transmitter includes
first PN code generating means for generating said first PN code,
second PN code generating means for generating said second PN code,
multiplier means for multiplying said binary digital data by the first PN code generated by said first PN code generating means,
first modulating means for modulating a carrier wave signal having a prescribed frequency by an output signal from said multiplier means,
second modulating means for modulating said carrier wave signal having the prescribed frequency by the second PN code generated by said second PN code generating means, and
combining means for combining output signals from said first and second modulating means; and said receiver includes
frequency converting means receiving a signal transmitted from said transmitter for converting its frequency to provide an intermediate frequency signal,
splitting means for splitting the output signal from said frequency converting means,
first filtering means for filtering one of the split signals split by said splitting means corresponding to said first PN code,
second filter means for filtering the other one of the split signals split by said splitting means corresponding to said second PN code, and demodulating means for multiplying output signals from said first and second filter means for demodulating the original binary digital data.

25. The apparatus for communication according to claim 24, wherein
said transmitter includes first delay means for delaying an output signal from said first modulating means to apply the same to said combining means, and
said receiver includes second delay means for delaying an output signal from said first filter means.

26. The apparatus for communication according to claim 24, wherein
said binary digital data includes a plurality of binary digital data;
said multiplier means includes a plurality of multiplier means for multiplying respective ones of said plurality of binary digital data by said first PN code;
said first modulating means includes a plurality of first modulating means for modulating said carrier wave signal having the prescribed frequency respectively by the output signals from said plurality of multiplier means;
said apparatus further comprising
a plurality of delay means for delaying modulated signals as outputs from said plurality of first modulating means, wherein
said combining means includes means for combining output signals from said plurality of delay means and a modulated signal as an output from said second modulating means.

27. Spread spectrum communication system employing frequency hopping, comprising the steps of:
(a) multiplying a PN code with a multibit data signal to provide a spread data signal;
(b) generating a frequency hopping (FH) carrier signal having a frequency that changes every preset number of data bits;
(c) modulating the FH carrier signal with the PN code and delaying the modulated signal by an arbitrary time delay longer than a time duration between carrier frequency changes;
(d) modulating the spread data signal with the FH carrier signal;
(e) combining and transmitting the modulated signals from steps (c) and (d);
(f) receiving said transmitted signal;
(g) splitting into two the received signal;
(h) delaying one of the split signals by the by the preset delay; and
(i) despreading and demodulating the delayed signal and the other one of the split signals.

28. An apparatus for transmitting data in a spread spectrum communication system employing frequency hopping, comprising:
a transmitter including:
a multiplier for multiplying a PN code with a multibit data signal to provide a spread data signal;
a carrier generator for generating a frequency hopping (FH) carrier signal having a frequency that changes every preset number of data bits;
a first modulator for modulating the FH carrier signal with the PN code and delaying the modulated signal by an arbitrary time delay longer than a time duration between carrier frequency changes;
a second modulator for modulating the spread data signal with the FH carrier signal;

a combiner for combining and transmitting the signals from the first and second modulators;

a receiver including:
  means for receiving the transmitted signals and splitting into two the received signal;
  a delay for delaying one of the split signals by the preset delay; and
  means for despreading the delayed signal and the other one of the split signals to demodulate the multi-bit data data.

29. The apparatus for communication according to claim 28, wherein
said receiver includes
frequency converting means for receiving and converting said transmitted signal to an intermediate frequency signal;
second delay means for delaying said intermediate frequency signal by the same period of time as the delay time by said delay means on said transmitter side,
multiplier means for multiplying said intermediate frequency signal and an output signal from said second delay means, and
demodulating means for filtering an output signal from said multiplier means for despreading and demodulating the original data.

30. The apparatus for communication according to claim 29, wherein
said transmitter includes
local oscillation signal generating means for generating a local oscillation signal, and
means for converting frequency of said frequency hopping signal or of the signal obtained by modulating the data frequency hopping signal by said data by the local oscillation signal from said local oscillation signal generating means and applying the signal having its frequency converted to said combining means.

31. The method according to claim 1, wherein
a communication area is divided into a plurality of areas, a plurality of channels are discriminated from each other by varying said delay time in the same area and by varying said PN code between different areas.

32. The method according to claim 1, wherein
a communication area is divided into a plurality of areas, a plurality of channels are discriminated from each other by varying said PN code in the same area and by varying said delay time between different areas.

33. The method according to claim 1, wherein said time period may be arbitrarily set between one chip of said PN code and one bit width of said data.

34. The spread spectrum communication system according to claim 2, wherein said time period may be arbitrarily set between one chip of said PN code and one bit width of said data.

35. The method according to claim 1, wherein said data is multipled by said PN code to produce a modulating signal such that the first signal is modulated by multiplication with said modulating signal.

36. An apparatus for communication in accordance with claim 2, wherein said data is multipled by said PN code to produce a modulating signal such that the first signal is modulated by multiplication with said modulating signal.

* * * * *